(12) United States Patent
Nagasaka et al.

(10) Patent No.: US 12,167,305 B2
(45) Date of Patent: Dec. 10, 2024

(54) INFORMATION PROCESSING SYSTEM, INFORMATION PROCESSING METHOD, AND RECORDING MEDIUM FOR ENABLING A PLURALITY OF USERS TO EXPERIENCE A SAME TYPE OF SERVICE

(71) Applicant: Sony Group Corporation, Tokyo (JP)

(72) Inventors: Hideo Nagasaka, Tokyo (JP); Shouichi Doi, Tokyo (JP); Ryu Aoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 362 days.

(21) Appl. No.: 17/624,580

(22) PCT Filed: Jun. 26, 2020

(86) PCT No.: PCT/JP2020/025165
§ 371 (c)(1),
(2) Date: Jan. 4, 2022

(87) PCT Pub. No.: WO2021/006065
PCT Pub. Date: Jan. 14, 2021

(65) Prior Publication Data
US 2022/0272502 A1    Aug. 25, 2022

(30) Foreign Application Priority Data

Jul. 11, 2019 (JP) .................................. 2019-128972

(51) Int. Cl.
*H04W 4/21* (2018.01)
*G06F 16/435* (2019.01)
(Continued)

(52) U.S. Cl.
CPC ............ *H04W 4/21* (2018.02); *G06F 16/435* (2019.01); *G06F 16/487* (2019.01); *G06Q 50/01* (2013.01);
(Continued)

(58) Field of Classification Search
CPC ......... H04W 4/21; H04W 4/021; H04W 4/24; G06F 16/435; G06F 16/487; H04L 65/75; G06Q 50/01
(Continued)

(56) References Cited

U.S. PATENT DOCUMENTS

2001/0027111 A1* 10/2001 Motegi ................... H04W 4/08
455/414.1
2002/0010734 A1*  1/2002 Ebersole .................. H04L 9/40
709/201
(Continued)

FOREIGN PATENT DOCUMENTS

| JP | 2001-184292 A | 7/2001 |
| JP | 2001-346267 A | 12/2001 |

(Continued)

OTHER PUBLICATIONS

International Search Report and Written Opinion mailed on Sep. 24, 2020, received for PCT Application PCT/JP2020/025165, Filed on Jun. 26, 2020, 13 pages including English Translation.

(Continued)

*Primary Examiner* — Mark G. Pannell
(74) *Attorney, Agent, or Firm* — XSENSUS LLP

(57) ABSTRACT

An information processing system including processing circuitry configured to set a plurality of users who is currently acting together as a plurality of users belonging to a specific community, and perform control so as to enable the plurality of users to experience a same type of service at substantially same timing by each wireless device corre-
(Continued)

sponding to each user according to the same type of service available to the each user.

25 Claims, 49 Drawing Sheets

(51) Int. Cl.
  *G06F 16/487* (2019.01)
  *G06Q 50/00* (2024.01)
  *H04L 65/75* (2022.01)
  *H04W 4/021* (2018.01)
  *H04W 4/24* (2024.01)

(52) U.S. Cl.
  CPC ............ *H04L 65/75* (2022.05); *H04W 4/021* (2013.01); *H04W 4/24* (2013.01)

(58) Field of Classification Search
  USPC .................................................... 370/310
  See application file for complete search history.

(56) References Cited

U.S. PATENT DOCUMENTS

| | | | | |
|---|---|---|---|---|
| 2005/0237382 | A1* | 10/2005 | White | G03B 15/10 348/E7.08 |
| 2006/0160573 | A1* | 7/2006 | Montvay | H04H 60/66 455/563 |
| 2007/0155346 | A1* | 7/2007 | Mijatovic | H04W 84/08 455/90.2 |
| 2007/0244880 | A1* | 10/2007 | Martin | G06F 16/48 707/999.005 |
| 2007/0276735 | A1 | 11/2007 | Naito | |
| 2008/0021851 | A1* | 1/2008 | Alcalde | G06Q 30/0603 706/21 |
| 2008/0125172 | A1* | 5/2008 | Leon | H04L 67/10 455/557 |
| 2008/0140664 | A1* | 6/2008 | Hao | G06F 16/48 707/999.009 |
| 2008/0162712 | A1* | 7/2008 | Fu | H04N 21/2541 709/231 |
| 2009/0264114 | A1* | 10/2009 | Virolainen | H04M 3/56 455/416 |
| 2012/0036523 | A1* | 2/2012 | Weintraub | H04N 7/173 725/9 |
| 2014/0095965 | A1* | 4/2014 | Li | H04N 21/43076 715/203 |
| 2014/0156582 | A1* | 6/2014 | Cornelius | G06Q 30/0251 706/50 |
| 2014/0258414 | A1 | 9/2014 | Kitano | |
| 2016/0021249 | A1* | 1/2016 | Govande | H04W 4/16 455/414.1 |
| 2016/0343037 | A1* | 11/2016 | Nicholas | G06Q 30/0269 |
| 2020/0099792 | A1* | 3/2020 | Nguyen | H04N 7/147 |

FOREIGN PATENT DOCUMENTS

| | | |
|---|---|---|
| JP | 2002-244676 A | 8/2002 |
| JP | 2002-278572 A | 9/2002 |
| JP | 2004-343320 A | 12/2004 |
| JP | 2005108013 A | 4/2005 |
| JP | 2006-100988 A | 4/2006 |
| JP | 2007013407 A | 1/2007 |
| JP | 2008-11395 A | 1/2008 |
| JP | 2008-72558 A | 3/2008 |
| JP | 2010205278 A | 9/2010 |
| JP | 2011-228848 A | 11/2011 |
| JP | 2013-254305 A | 12/2013 |
| JP | 2014-505280 A | 2/2014 |
| JP | 2014-164112 A | 9/2014 |
| JP | 2015-504613 A | 2/2015 |
| JP | 2017-524194 A | 8/2017 |
| JP | 2018-97694 A | 6/2018 |
| WO | 2006/085383 A1 | 8/2006 |
| WO | 2008/107984 A1 | 9/2008 |
| WO | WO-2014129042 A1 | 8/2014 |
| WO | 2016108262 A | 7/2016 |
| WO | 2018/155354 A1 | 8/2018 |

OTHER PUBLICATIONS

ETRI South Korea:OMA-CD-MOBSOCNET-2013-SNEW1 .1-INP_Dynamic_Social_Group, Open Mobile Alliance (OMA), 4330 La Jolla Village Dr., Suite 110 San Diego, CA 92122; USA, Feb. 14, 2013, pp. 1-10, XP064138297.

* cited by examiner

FIG. 9

S121
<OCCURRENCE OF EVENT>

[COMMUNITY EVENT]
・MEMBERS HAVE MET
・EVERYONE IS PRESENT
・BROKEN UP
・MEMBER IS AWAY
・WHICH MEMBERS ARE NOW TOGETHER
[ACTION EVENT]
・PAYMENT
・PICTURE TAKING

S122
<EXECUTION PROCESSING>

| WHEN HAVING MET | MUSIC PLAYBACK |
| WHEN PAID | BILL-SPLITTING |
| WHEN HAVING TAKEN PICTURE | PICTURE SHARING |

S126
<EXECUTION MANAGEMENT>

[MUSIC PLAYBACK]
・MUSIC DISTRIBUTION SERVICE A
・MUSIC DISTRIBUTION SERVICE B
・MUSIC DISTRIBUTION SERVICE C
[BILL-SPLITTING]
・SETTLEMENT SERVICE A
・SETTLEMENT SERVICE B
[PICTURE SHARING]
・SNS SERVICE A
・SNS SERVICE B
・SNS SERVICE C

S127
<EXECUTION PROCESSING>

[BILL-SPLITTING]
・SETTLEMENT SERVICE A

FIG. 11

S134
<OCCURRENCE OF EVENT>

[COMMUNITY EVENT]
· MEMBERS HAVE MET
· EVERYONE IS PRESENT
· BROKEN UP
· MEMBER IS AWAY
· WHICH MEMBERS ARE NOW TOGETHER

[ACTION EVENT]
· PAYMENT
· PICTURE TAKING

S136
<EXECUTION PROCESSING>

| WHEN HAVING MET | MUSIC PLAYBACK |
| WHEN PAID | BILL-SPLITTING |
| WHEN HAVING TAKEN PICTURE | PICTURE SHARING |

S136
<EXECUTION MANAGEMENT>

[MUSIC PLAYBACK]
· MUSIC DISTRIBUTION SERVICE A
· MUSIC DISTRIBUTION SERVICE B
· MUSIC DISTRIBUTION SERVICE C

[BILL-SPLITTING]
· SETTLEMENT SERVICE A
· SETTLEMENT SERVICE B

[PICTURE SHARING]
· SNS SERVICE A
· SNS SERVICE B
· SNS SERVICE C

S138
<EXECUTION PROCESSING>

[PICTURE SHARING]
· SNS SERVICE A

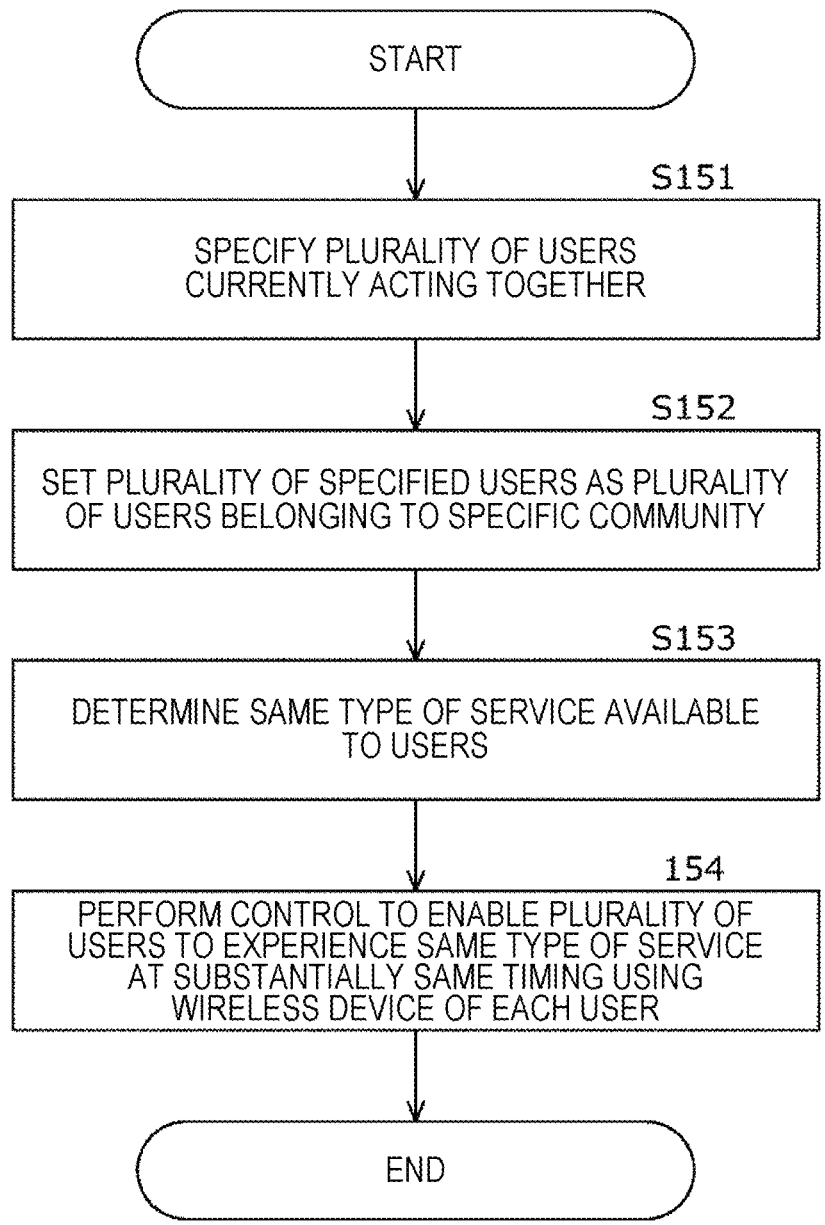

FIG. 13

| | | HELD RIGHT | PROCESSING CONTENT |
|---|---|---|---|
| 1 | USER A | MUSIC DISTRIBUTION SERVICE A (PAY PLAN) | DISTRIBUTE SONG TO BOTH USERS USING BOTH RIGHTS BECAUSE BOTH SUBSCRIBE TO PAY PLAN. |
| | USER B | MUSIC DISTRIBUTION SERVICE A (PAY PLAN) | |
| 2 | USER A | MUSIC DISTRIBUTION SERVICE A (PAY PLAN) | USER SIDE HAVING ACCOUNT OF PAY PLAN GIVES INSTRUCTION ON PLAYBACK AND PERFORMS TEMPORARY BILLING PROCESSING (FOR PAIR LISTENING) (FREE PLAN SIDE CANNOT SPECIFY AND PLAY BACK SPECIFIED SONG). |
| | USER B | MUSIC DISTRIBUTION SERVICE A (FREE PLAN) | |
| 3 | USER A | MUSIC DISTRIBUTION SERVICE A (PAY PLAN) | SAME AS ABOVE (NOTE THAT INDIVIDUAL TREATMENT IS NEEDED BECAUSE THERE IS NO APPLICATION FOR PLAYBACK) |
| | USER B | NO USE | |
| 4 | USER A | MUSIC DISTRIBUTION SERVICE A (PAY PLAN) | 1. SAME AS ABOVE<br>2. PLAY BACK SONG WITH EACH ACCOUNT RIGHT.<br>*PERFORM PROCESSING FOR PLAYING BACK SAME SONG. |
| | USER B | MUSIC DISTRIBUTION SERVICE B (PAY PLAN) | |
| 5 | USER A | MUSIC DISTRIBUTION SERVICE A (FREE PLAN) | PERFORM FREE TRIAL OR THE LIKE. |
| | USER B | MUSIC DISTRIBUTION SERVICE A (FREE PLAN) | |
| 6 | USER A | MUSIC DISTRIBUTION SERVICE A (FREE PLAN) | PERFORM FREE TRIAL OR THE LIKE. |
| | USER B | MUSIC DISTRIBUTION SERVICE B (FREE PLAN) | |

# INFORMATION PROCESSING SYSTEM, INFORMATION PROCESSING METHOD, AND RECORDING MEDIUM FOR ENABLING A PLURALITY OF USERS TO EXPERIENCE A SAME TYPE OF SERVICE

CROSS-REFERENCE TO RELATED APPLICATIONS

The present application is based on PCT filing PCT/JP2020/025165, filed Jun. 26, 2020, which claims priority to JP 2019-128972, filed on Jul. 11, 2019, the entire contents of each are incorporated herein by reference.

TECHNICAL FIELD

The present technology relates to an information processing system, an information processing method, and a recording medium, and particularly relates to an information processing system, an information processing method, and a recording medium capable of providing better user experience.

BACKGROUND ART

In recent years, with the spread of information devices, various services and functions utilizing characteristics of the devices have been provided (see, for example, Patent Documents 1 to 6).

CITATION LIST

Patent Document

Patent Document 1: Japanese Patent Application Laid-Open No. 2002-278572
Patent Document 2: Japanese Patent Application Laid-Open No. 2002-244676
Patent Document 3: Japanese Patent Application Laid-Open No. 2001-184292
Patent Document 4: International Publication No. 2008/107984
Patent Document 5: Japanese Patent Application Laid-Open No. 2008-072558
Patent Document 6: Japanese Patent Application Laid-Open No. 2013-254305

SUMMARY OF THE INVENTION

Problems to be Solved by the Invention

Meanwhile, in a case where a plurality of users is acting together, it is required to provide a better user experience when providing a service to the plurality of users using a device possessed by each user.

The present technology has been made in view of such a situation, and is intended to provide better user experience.

Solutions to Problems

An information processing system according to one aspect of the present technology is an information processing system including a control unit configured to set a plurality of users who is currently acting together as a plurality of users belonging to a specific community, and perform control so as to enable the plurality of users to experience a same type of service at substantially same timing by each wireless device corresponding to each user according to the same type of service available to the each user.

An information processing method according to one aspect of the present technology is an information processing method including, by an information processing system, setting a plurality of users who is currently acting together as a plurality of users belonging to a specific community, and performing control so as to enable the plurality of users to experience a same type of service at substantially same timing by each wireless device corresponding to each user according to the same type of service available to the each user.

A recording medium according to one aspect of the present technology is a recording medium recording a program for causing a computer to function as a control unit configured to set a plurality of users who is currently acting together as a plurality of users belonging to a specific community, and perform control so as to enable the plurality of users to experience a same type of service at substantially same timing by each wireless device corresponding to each user according to the same type of service available to the each user.

In the information processing system, the information processing method, and the recording medium according to one aspect of the present technology, a plurality of users who is currently acting together is set as a plurality of users belonging to a specific community, and control is performed so as to enable the plurality of users to experience a same type of service at substantially same timing by each wireless device corresponding to each user according to the same type of service available to the each user.

BRIEF DESCRIPTION OF DRAWINGS

FIG. 9 is a diagram illustrating the second example of information processing in the first embodiment.
FIG. 11 is a diagram illustrating the third example of information processing in the first embodiment.
FIG. 12 is a flowchart for describing a whole image of the information processing in the first embodiment.
FIG. 13 is a diagram illustrating an example of a use state and right processing of a music distribution service of a user.

MODE FOR CARRYING OUT THE INVENTION

Hereinafter, embodiments of the present technology will be described with reference to the drawings. Note that the description will be given in the following order.
1. First Embodiment: Basic Configuration
2. Second Embodiment: Configuration Corresponding to Music Distribution Service
3. Third Embodiment: Configuration Corresponding to Selection of Recommended Content
4. Fourth Embodiment: Configuration Corresponding to Automatic Formation of Community
5. Fifth Embodiment: Configuration Corresponding to Community Support
6. Sixth Embodiment: Configuration Corresponding to Playback Control Adapted to External Environment
7. Seventh Embodiment: Configuration Corresponding to Slideshow or the like
8. Eighth Embodiment: Configuration Corresponding to Content Evaluation Result
9. Ninth Embodiment: Configuration Corresponding to Separation of Members
10. Tenth Embodiment: Configuration Corresponding to Display of AR Information
11. Eleventh Embodiment: Configuration Corresponding to Generation of Playlist by Member
12. Modification
13. Configuration of Computer
(Representative Diagram)

Figure 1:
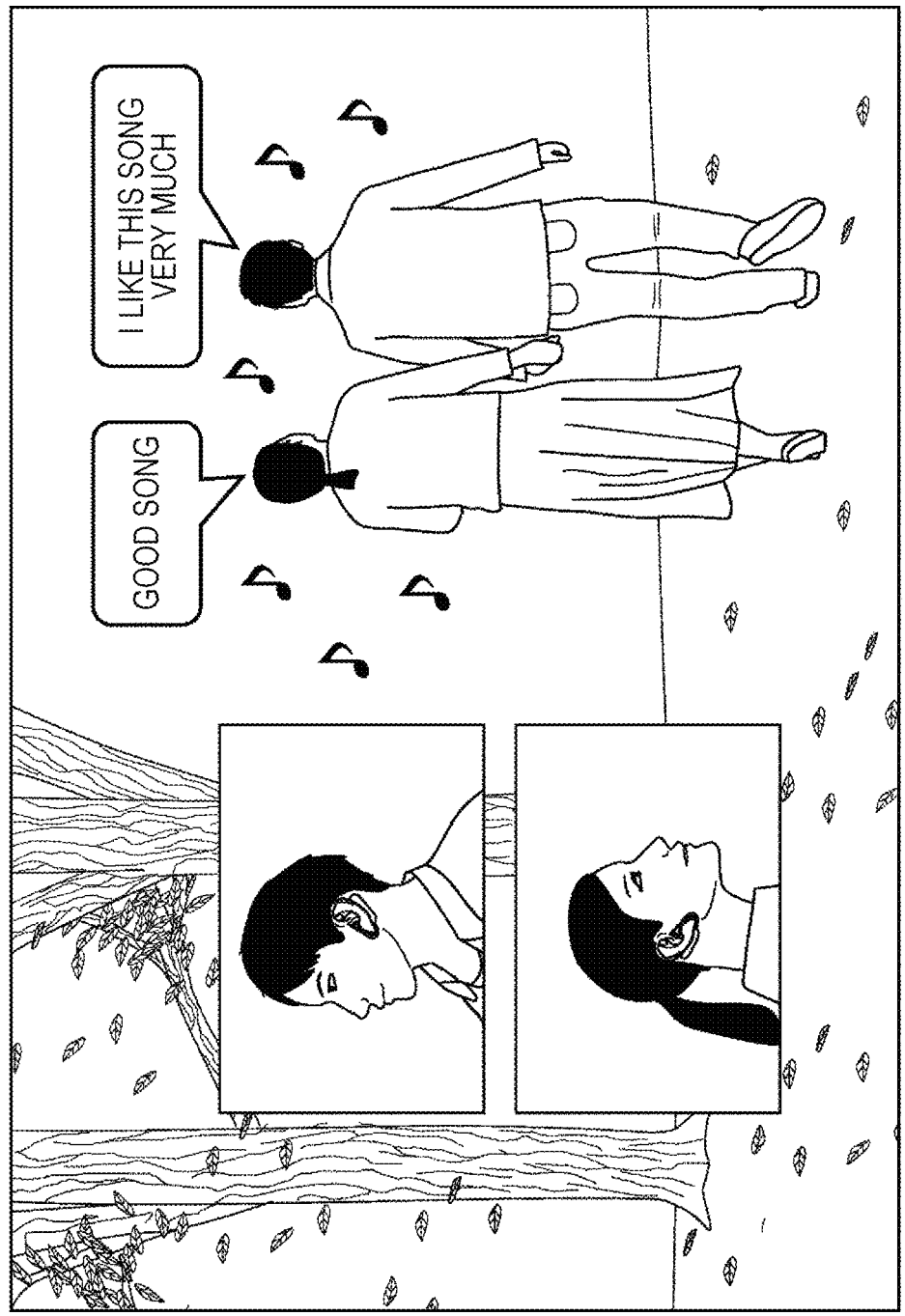
FIG. 1 is a representative diagram illustrating an outline of the present technology.

FIG. 1 is a representative diagram illustrating an outline of the present technology.

The present technology provides better user experience by enabling a plurality of users acting together to experience the same type of service at substantially the same timing by each wireless device of each user according to the same type of service available to each user.

In FIG. 1, lovers on a date are walking while listening to music. At this time, each of a male and a female wears an earphone enabling each user to listen to music as well as an external sound such as an open-ear type earphone that does not block the ear, and listens to an ambient sound or enjoys a conversation with the partner while listening to music.

Here, although the male and the female listen to the same music, each of the male and the female plays back a song (music) with their own devices such as smartphones, and the devices playing back the song (music) are different. Furthermore, each of the male and the female subscribes to a music distribution service.

The present technology enables lovers on a date who are acting together to experience a music distribution service at substantially the same timing by their own devices such as smartphones (by open-ear type earphones or the like connected to the devices by wireless communication) according to the music distribution service available to the male and the female.

Thereby, it is possible to provide a better user experience such that music that only the two people can listen to produces a space for only the two people or music sets the mood for a date.

1. First Embodiment (Configuration Example of System)

Figure 2:
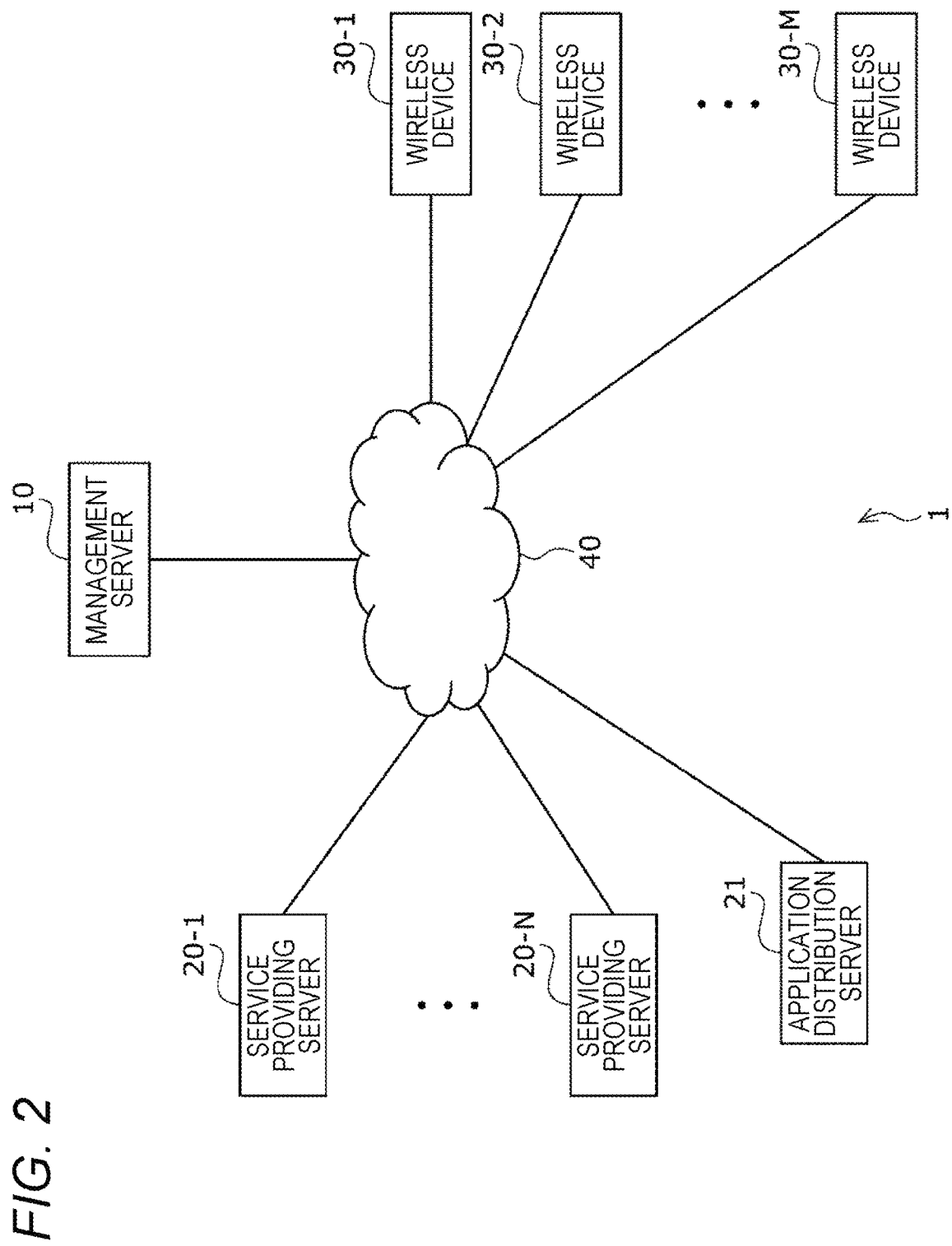
FIG. 2 is a diagram illustrating an example of a configuration of an information processing system to which the present technology is applied.

FIG. 2 illustrates an example of a configuration of an information processing system to which the present technology is applied.

An information processing system 1 includes a management server 10, service providing servers 20-1 to 20-N (N: an integer of 1 or more), an application distribution server 21, and wireless devices 30-1 to 30-M (M: an integer of 1 or more).

Furthermore, in the information processing system 1, the service providing servers 20-1 to 20-N, the application distribution server 21, and the wireless devices 30-1 to 30-M are connected to one another via a network 40.

The management server 10 includes one or a plurality of server devices for managing data of a database or the like, and is installed in a data center or the like. The management server 10 manages information regarding a community and its members. The management server 10 provides managed information in response to requests from the wireless devices 30-1 to 30-M.

The service providing server 20-1 includes one or a plurality of server devices for providing various services such as a music distribution service, and is installed in a data center or the like. The service providing server 20-1 provides various services in response to requests from the wireless devices 30-1 to 30-M.

The service providing servers 20-2 to 20-N provide various services in response to requests from the wireless devices 30-1 to 30-M, similarly to the service providing server 20-1. Note that, in the following description, the service providing servers 20-1 to 20-N will be referred to as service providing server(s) 20 in a case where there is no need to distinguish them.

The application distribution server 21 includes one or a plurality of server devices for distributing applications for providing various services, and is installed in a data center or the like. The application distribution server 21 distributes applications in response to requests from the wireless devices 30-1 to 30-M.

The wireless device 30-1 includes an information device such as a smartphone, a mobile phone, a tablet terminal, a wearable device, a portable music player, a game machine, or a personal computer.

The wireless device 30-1 performs processing related to a community and its members on the basis of information managed by the management server 10. Furthermore, the wireless device 30-1 performs processing according to various services provided from the service providing server 20. Furthermore, the wireless device 30-1 accesses the application distribution server 21 to download an application.

Similarly to the wireless device 30-1, the wireless devices 30-2 to 30-M exchange various data with the management server 10, the service providing server 20, and the application distribution server 21 to perform various types of processing. Note that, in the following description, the wireless devices 30-1 to 30-M will be referred to as wireless device(s) 30 in a case where there is no need to distinguish them.

(Configuration Example of Management Server)

Figure 3:
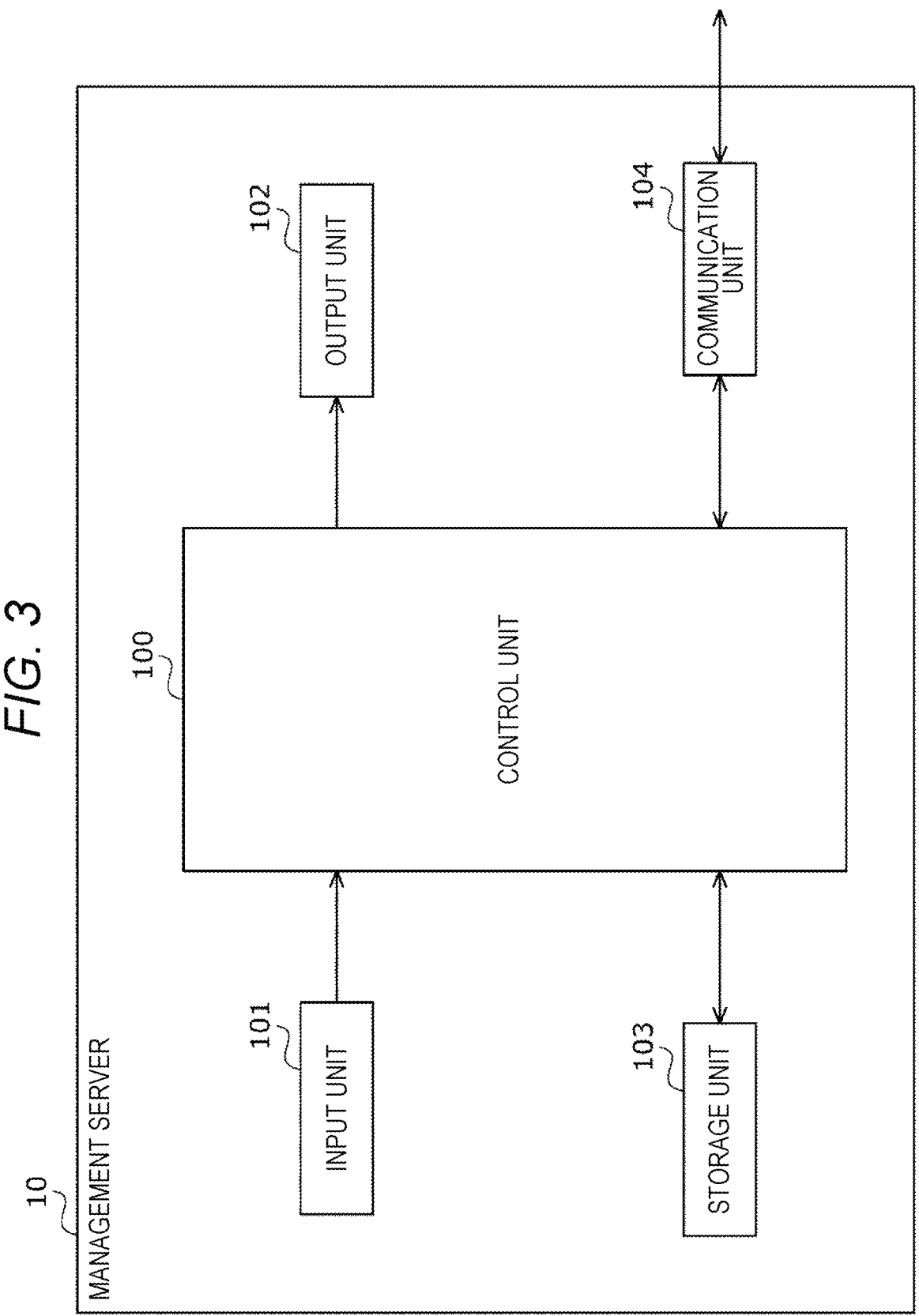
FIG. 3 is a diagram illustrating an example of a configuration of a management server of FIG. 2.

FIG. 3 illustrates an example of a configuration of the management server 10 of FIG. 2.

In FIG. 3, the management server 10 includes a control unit 100, an input unit 101, an output unit 102, a storage unit 103, and a communication unit 104.

The control unit 100 includes, for example, a processor such as a central processing unit (CPU). The control unit 100 is a main processing device that controls the operation of each unit and performs various types of arithmetic processing.

The input unit 101 includes an input device such as a mouse or a keyboard. The input unit 101 supplies an operation signal corresponding to a user's operation to the control unit 100.

The output unit 102 includes an output device such as a display or a speaker. The output unit 102 outputs video, audio, and the like under the control of the control unit 100.

The storage unit 103 includes a large-capacity storage device such as a semiconductor memory including a nonvolatile memory or a volatile memory, or a hard disk drive (HDD). The storage unit 103 stores various data under the control of the control unit 100.

The communication unit 104 includes a communication module or the like compatible with wireless communication or wired communication conforming to a predetermined standard. The communication unit 104 communicates with other devices via the network 40 under the control of the control unit 100.

(Configuration Example of Service Providing Server)

Figure 4:
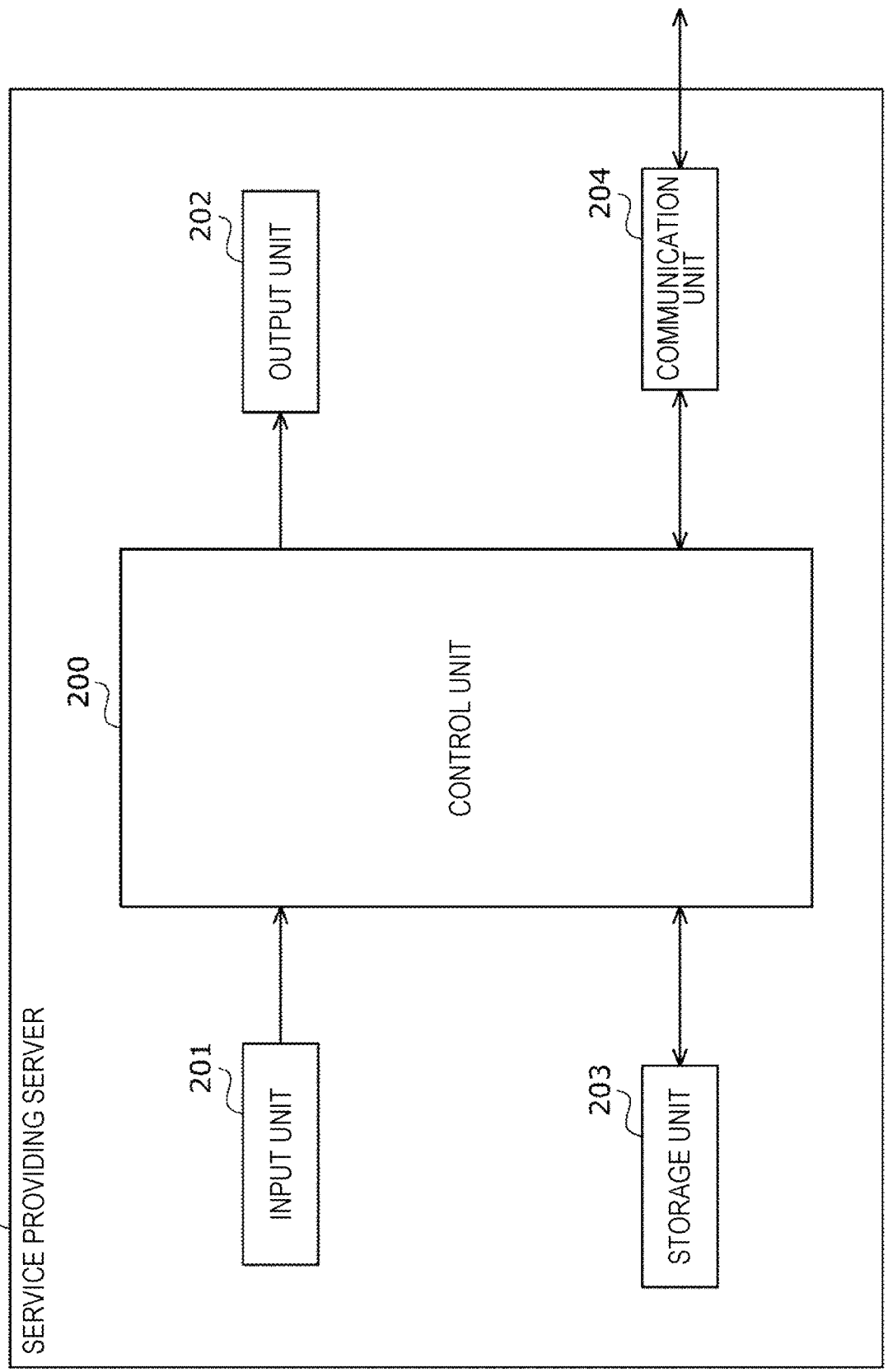
FIG. 4 is a diagram illustrating an example of a configuration of a service providing server of FIG. 2.

FIG. 4 illustrates an example of a configuration of the service providing server 20 of FIG. 2.

In FIG. 4, the service providing server 20 includes a control unit 200, an input unit 201, an output unit 202, a storage unit 203, and a communication unit 204.

The control unit 200 includes a processor such as a CPU. The control unit 200 is a main processing device that controls the operation of each unit and performs various types of arithmetic processing.

The input unit 201 includes an input device such as a mouse or a keyboard. The input unit 201 supplies an operation signal corresponding to a user's operation to the control unit 200.

The output unit 202 includes an output device such as a display or a speaker. The output unit 202 outputs information according to various data under the control of the control unit 200.

The storage unit 203 includes a semiconductor memory such as a nonvolatile memory. The storage unit 203 stores various data under the control of the control unit 200.

The communication unit 204 includes a communication module or the like compatible with wireless communication or wired communication conforming to a predetermined standard. The communication unit 204 communicates with other devices via the network 40 under the control of the control unit 200.

(Configuration Example of Wireless Device)

Figure 5:
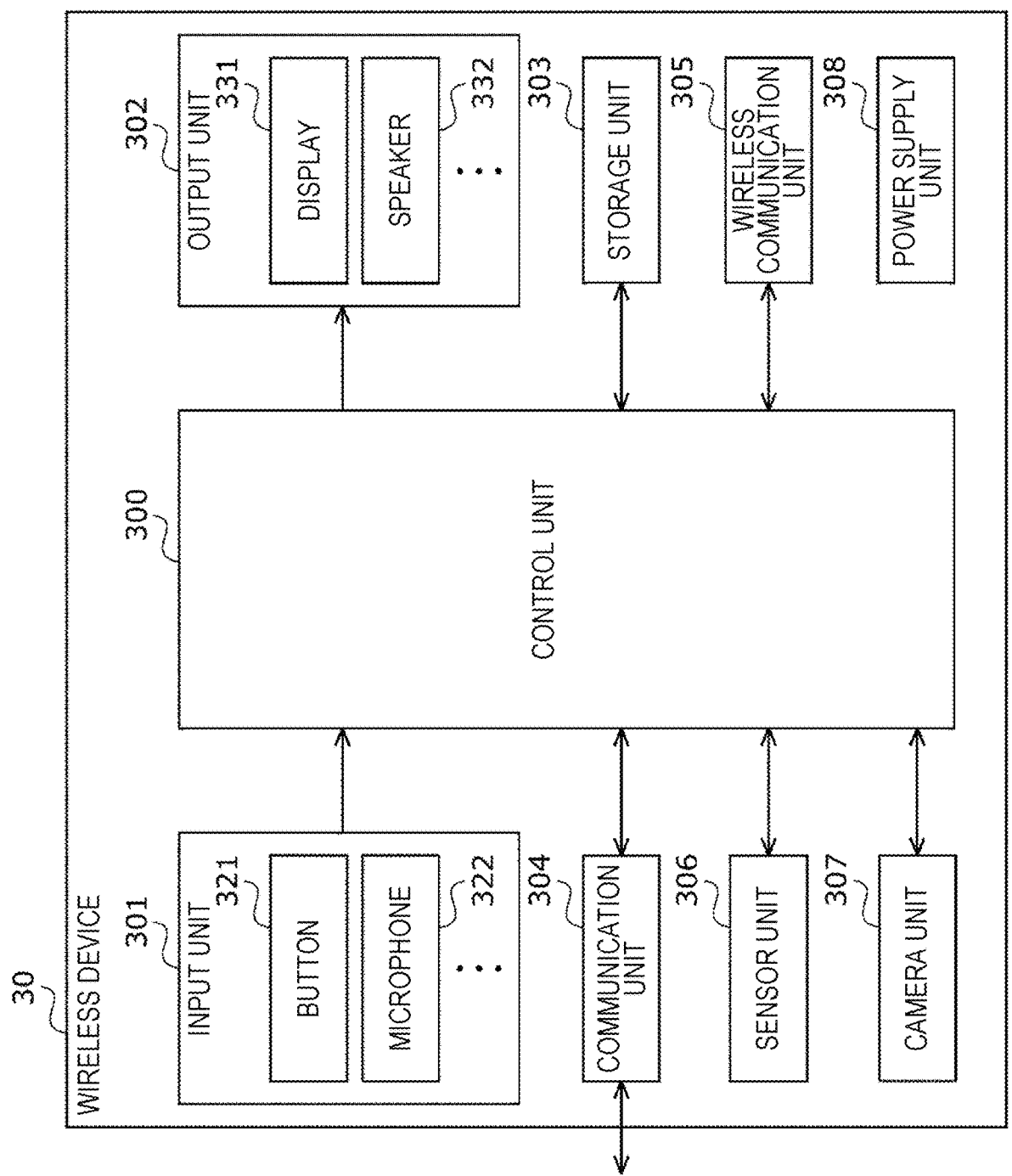
FIG. 5 is a diagram illustrating an example of a configuration of a wireless device of FIG. 2.

FIG. 5 illustrates an example of a configuration of the wireless device 30 of FIG. 2.

In FIG. 5, the wireless device 30 includes a control unit 300, an input unit 301, an output unit 302, a storage unit 303, a communication unit 304, a wireless communication unit 305, a sensor unit 306, a camera unit 307, and a power supply unit 308.

The control unit 300 includes a processor such as a CPU. The control unit 300 is a main processing device that controls the operation of each unit and performs various types of arithmetic processing.

The input unit 301 includes input devices such as a physical button 321 and a microphone 322. The input unit 301 supplies an operation signal corresponding to a user's operation or action to the control unit 300. The control unit 300 controls the operation of the units on the basis of an operation signal from the input unit 301.

The output unit 302 includes output devices such as a display 331 and a speaker 332. The output unit 302 outputs information according to various data under the control of the control unit 300.

The display 331 displays a video corresponding to video data from the control unit 300 having a video playback function such as decoding of the video data. The speaker 332 outputs a sound (music or the like) corresponding to sound data (song data or the like) from the control unit 300 having a sound playback function such as decoding of sound data.

The storage unit 303 includes a semiconductor memory such as a nonvolatile memory. The storage unit 303 stores various data under the control of the control unit 300.

The communication unit 304 is configured as a communication module compatible with wireless communication such as wireless local area network (LAN) or cellular communication (for example, LTE-Advanced, 5G, or the like). The communication unit 304 communicates with other devices via the network 40 under the control of the control unit 300.

The wireless communication unit 305 is connected to an earphone 31 by wireless communication corresponding to a standard such as Bluetooth (registered trademark), and can output music (sound) from the earphone 31 worn on the user's ear.

The earphone 31 can be an open-ear type earphone that does not block the ear, an earphone having a function to take in an external sound such as an ambient sound or a human voice with a microphone and superimpose the external sound on music, or the like. By using the open-ear type earphone or the earphone enabling the user to listen to an external sound such as the earphone having the function to take in an external sound and superimpose the external sound on music, the user can listen to an ambient sound or a conversation with a partner while listening to music.

Note that the earphone 31 is not limited to be connected wirelessly, and may be connected to the wireless device 30 by wired means. Furthermore, not only the earphone but also an electroacoustic transducer such as a headphone can be used.

The sensor unit 306 includes various sensor devices and the like. The sensor unit 306 performs sensing of the user, the surroundings thereof, and the like, and supplies sensor data corresponding to a sensing result to the control unit 300. The control unit 300 performs various types of processing on the basis of the sensor data from the sensor unit 306.

Here, the sensor unit 306 can include an acceleration sensor that measures an acceleration, a gyro sensor that measures an angle (posture), an angular velocity, and an angular acceleration, a biological sensor that measures information such as a heart rate, a body temperature, or a posture of an organism, a magnetic sensor that measures magnitude and a direction of a magnetic field (magnetic field), a proximity sensor that measures a proximity object, or the like.

The camera unit 307 includes an optical system, an image sensor, a signal processing circuit, and the like. The camera unit 307 supplies image data obtained by capturing an object to the control unit 300. The control unit 300 records the image data from the camera unit 307 in the storage unit 303 and displays the image data on the display 331.

The power supply unit 308 includes a battery such as a secondary battery and a power supply management circuit, and supplies power to each unit including the control unit 300.

Note that the configurations of the management server 10, the service providing server 20, and the wireless device 30 described above are merely examples, and some components may be removed or other components may be added.

The information processing system 1 is configured as described above. Hereinafter, specific content of information processing executed by the information processing system 1 will be described.

First Example

First, a first example of information processing in the first embodiment will be described with reference to FIGS. 6 and 7.

The first example illustrates a case where music play is performed by the wireless devices 30-1 and 30-2 of users A and B when the user A and the user B belonging to a community A have met. Note that it can also be said that the user A and the user B are members of the community A. At this time, it is desirable that music is played back according to the same playlist so that the user A and the user B have the same experience.

Figure 6:
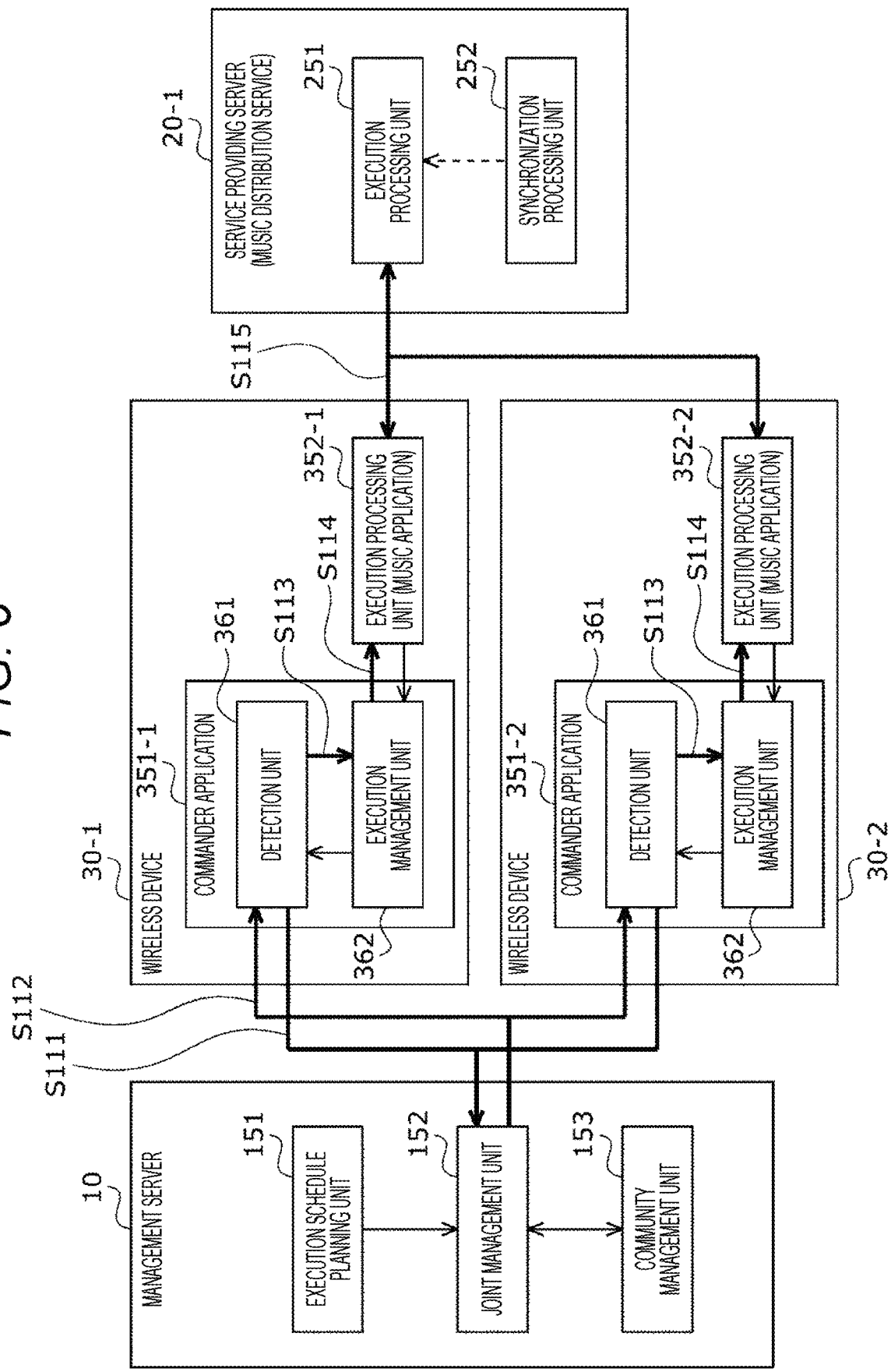
FIG. 6 is a diagram illustrating a first example of information processing in a first embodiment.

In FIG. 6, (the control unit 100 of) the management server 10 includes an execution schedule planning unit 151 that plans an execution schedule or the like of the community, a joint management unit 152 that manages an event or the like, and a community management unit 153 that manages the community or the like.

The service providing server 20-1 is a server that provides a music distribution service. (The control unit 200 of) the service providing server 20-1 includes an execution processing unit 251 that executes processing related to the music distribution service and a synchronization processing unit 252 that performs synchronization processing with another music distribution service. Note that the synchronization processing unit 252 is unnecessary in a case where synchronization with another music distribution service is not necessary.

(The control unit 300 of) the wireless device 30-1 corresponding to the user A includes a commander application 351-1 that functions as a commander, and an execution processing unit 352-1 that executes a music application or the like. The commander application 351-1 includes a detection unit 361 that detects an event and an execution management unit 362 that manages execution of an application.

Furthermore, (the control unit 300 of) the wireless device 30-2 corresponding to the user B includes a commander application 351-2 and an execution processing unit 352-2, similarly to (the control unit 300 of) the wireless device 30-1. Note that the commander applications 351-1 and 351-2 may be installed in advance in the wireless devices 30-1 and 30-2 or may be downloaded from the application distribution server 21 via the network 40.

Here, in a case where an event is detected, the wireless device 30-1 and the wireless device 30-2 transmit a request including the detected event to the management server 10 via the network 40 (S111).

Note that the event may be detected on the management server 10 side. That is, the sensor data acquired by the sensor unit 306 mounted on the wireless device 30-1 or the wireless device 30-2, the implemented application, information from the management server 10, the service providing server 20-1, and the like are collected and analyzed, and an event can be detected when a condition set for each event such as "members have met" or "picture taking" is satisfied.

In the case where an event registered in advance occurs on the basis of the detection event from the wireless devices 30-1 and 30-2, the management server 10 performs processing corresponding to the event.

Figure 7:
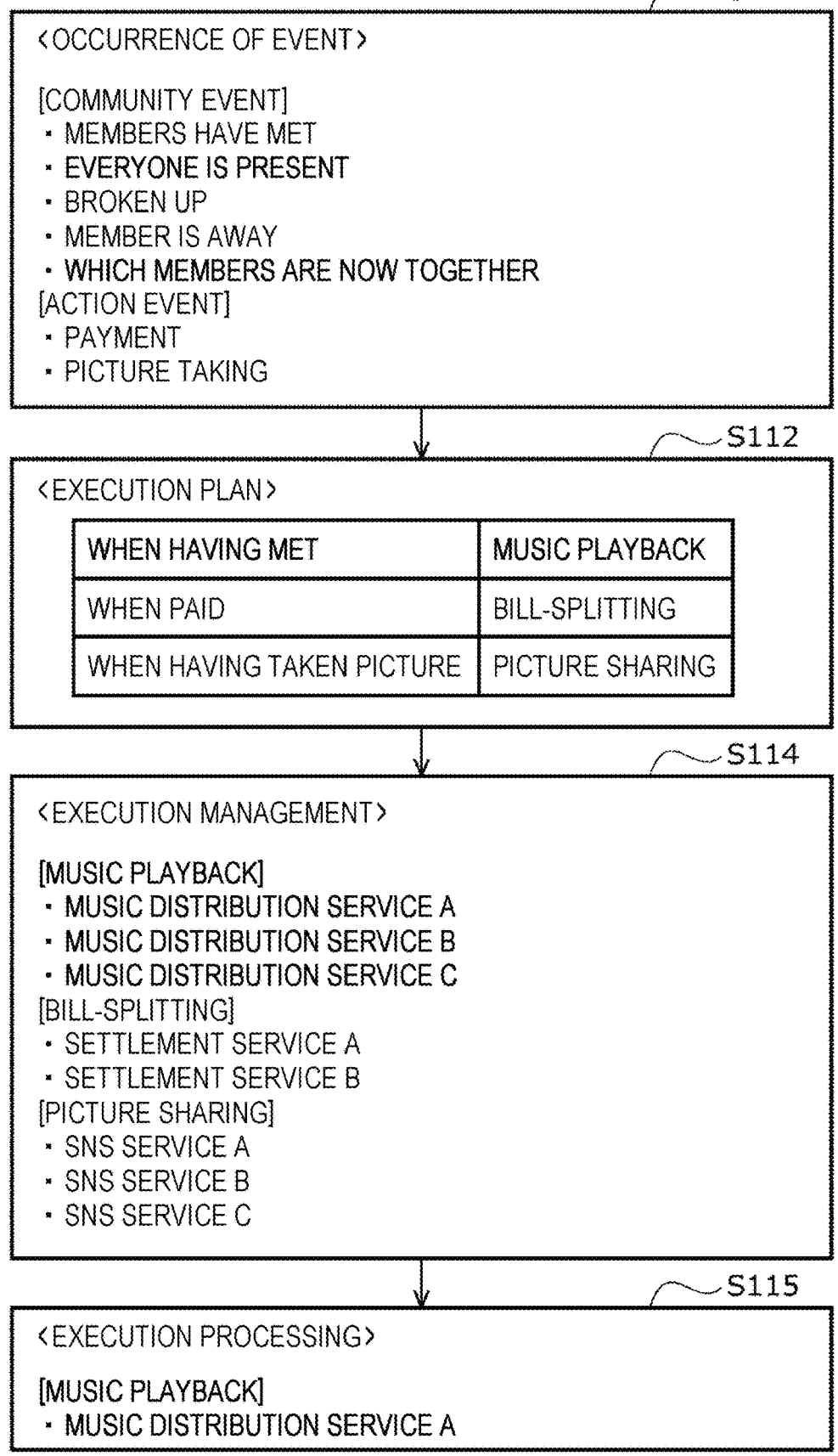
FIG. 7 is a diagram illustrating the first example of information processing in the first embodiment.

Here, as illustrated in FIG. 7, an event such as an event related to the community (community event) or an event related to an action of the user belonging to the community (action event) occurs (S111).

In the first example, an event of "everyone is present" has occurred as a community event on the basis of the detection event. Furthermore, at this time, information regarding "which members are now together" such as the user A and the user B being together is managed.

Furthermore, as illustrated in FIG. 7, "music play" associated with "when having met" corresponding to the event (community event) that has occurred is selected on the basis of an execution plan registered in advance (S112).

Returning to the description of FIG. 6, the management server 10 transmits a response including the selection event to the wireless device 30-1 and the wireless device 30-2 via the network 40 (S112).

In the wireless device 30-1, the selection event from the management server 10 is supplied from the detection unit 361 to the execution management unit 362 by the commander application 351-1 (S113). The execution management unit 362 controls the execution processing unit 352-1 on the basis of the selection event (S114).

Here, as illustrated in FIG. 7, the music distribution service A to which the user A subscribes is selected from music distribution services A to C according to the selection event of "music play", and the operation of a music application provided by the music distribution service A is controlled (S114).

Returning to the description of FIG. 6, the execution processing unit 352-1 executes the music application of the music distribution service A under the control of the commander application 351-1 (S115). When this music application is executed, a song A distributed from the service providing server 20-1 of the music distribution service A is played back. As a result, the user A can listen to the song A played back by the wireless device 30-1.

Meanwhile, in the wireless device 30-2, the commander application 351-2 controls the execution processing unit 352-2, so that the music application plays back the song A distributed from the service providing server 20-1, similarly to the wireless device 30-1. As a result, the user B can listen to the song A (the same music as the music the user A is listening to) played back by the wireless device 30-2.

At this time, it is desirable that the song is played back according to the same playlist and the same song is sequentially played back after the song A so that the user A and the user B have the same experience.

In this manner, the user A and the user B belonging to the community A can experience the substantially same music distribution service A by the wireless device 30-1 of the user A and the wireless device 30-2 of the user B according to the available music distribution service A while acting together.

Second Example

Next, a second example of the information processing in the first embodiment will be described with reference to FIGS. 8 and 9.

The second example illustrates a case in which when payment is performed by one of the user A and the user B who belong to the community A and act together, the wireless devices 30 of the users A and B performs bill-splitting processing.

Figure 8:
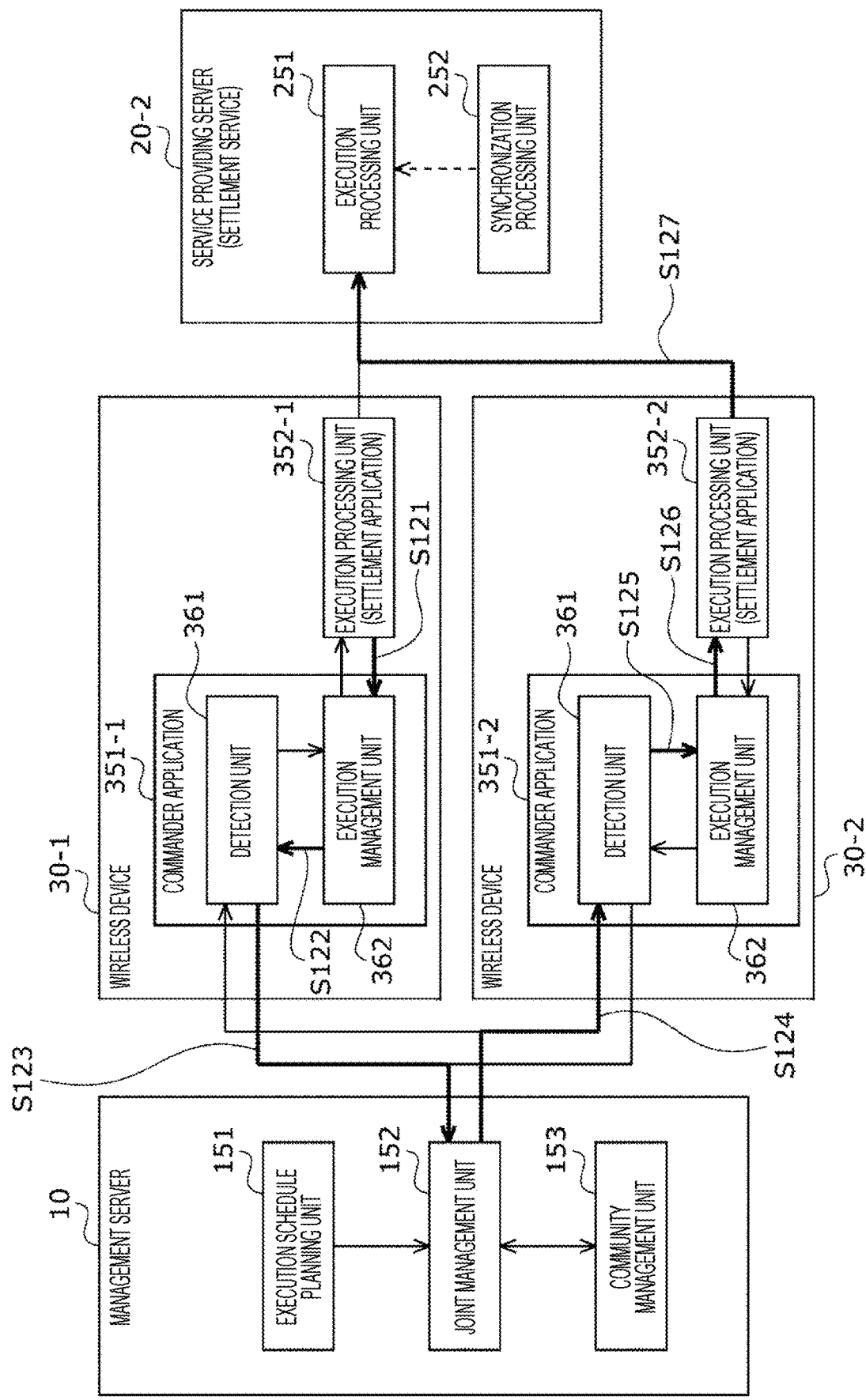
FIG. 8 is a diagram illustrating a second example of information processing in the first embodiment.

In FIG. 8, the service providing server 20-2 is a server that provides a settlement service. (The control unit 200 of) the service providing server 20-2 includes the execution processing unit 251 that executes processing related to a settlement service and the synchronization processing unit 252 that performs synchronization processing with another settlement service.

(The control unit 300 of) the wireless device 30-1 corresponding to the user A includes the commander application 351-1 and the execution processing unit 352-1, and the execution processing unit 352-1 can execute a settlement application. Furthermore, (the control unit 300 of) the wireless device 30-2 corresponding to the user B is similarly configured to (the control unit 300 of) the wireless device 30-1.

Here, a case is assumed in which the user A and the user B belonging to the community A have a meal together, and the user A collectively pays a meal fee using the settlement application and charges the user B for a split amount.

In the wireless device 30-1, the execution processing unit 352-1 notifies the commander application 351-1 of an action event according to the settlement processing by the settlement application (S121). The commander application 351-1 performs processing according to the action event from the execution processing unit 352-1.

Here, as illustrated in FIG. 9, the action event of "payment" has occurred (S121). Note that, at this time, information regarding "which members are now together" such as the user A and the user B being together may be managed.

Furthermore, as illustrated in FIG. 9, "bill-splitting" is selected corresponding to "when paid" according to the event that has occurred (action event) (S122).

Returning to the description of FIG. 6, in the commander application 351-1, notification of a selection event is provided from the execution management unit 362 to the detection unit 361 (S122). Then, the wireless device 30-1 transmits a request including the selection event to the management server 10 via the network 40 (S123). Note that information regarding the split amount and a payment destination is added to the request including the selection event.

The management server 10 receives the selection event transmitted from the wireless device 30-1. The management server 10 grasps that the user A and the user B belonging to the community A are together, and transmits a response including the selection event from the wireless device 30-1 to the wireless device 30-2 via the network 40 (S124). Note that the information regarding the split amount and the payment destination is added to the response including the selection event.

In the wireless device 30-2, the selection event from the management server 10 is supplied from the detection unit 361 to the execution management unit 362 by the commander application 351-2 (S125). The execution management unit 362 controls the execution processing unit 352-2 on the basis of the selection event (S126).

Here, as illustrated in FIG. 9, a settlement service A to which the user B subscribes is selected from settlement services A and B according to the selection event of "bill-splitting", and the operation of a settlement application provided by the settlement service A is controlled (S126).

Returning to the description of FIG. 8, the execution processing unit 352-2 executes the settlement application of the settlement service A under the control of the commander application 351-2 (S127). By executing the settlement application, the charged split amount is paid from the user B to the user A. As a result, payment by bill-splitting can be easily performed. Here, it is desirable that the settlement processing from the user B to the user A be executed after approval by the user B.

In this manner, the user A and the user B belonging to the community A can experience the settlement service (bill-splitting service) by the wireless device 30-1 of the user A and the wireless device 30-2 of the user B according to the available settlement service (bill-splitting service).

Note that, for example, if the number of members for bill-splitting increases, the payment amount may increase. In such a case, there is a case where the amount of money is insufficient when making a payment to a store or the like. In such a case, it is possible to cope with the case by performing post-settlement processing to complete the payment or by performing settlement after making a bill-splitting request to all the members.

Third Example

Next, a third example of the information processing in the first embodiment will be described with reference to FIGS. 10 and 11.

The third example illustrates a case where, when any of the wireless devices 30-1 and 30-2 of the users A and B belonging to the community A captures an image, a captured image (a moving image, a still image, or the like) is shared.

The service providing server 20-3 is a server that provides a social networking service (SNS) service. (The control unit 200 of) the service providing server 20-3 includes the execution processing unit 251 that executes processing related to an SNS service.

(The control unit 300 of) the wireless device 30-1 corresponding to the user A includes the commander application 351-1 and execution processing units 352-11 and 352-12, and the execution processing units 352-11 and 352-12 can execute a camera application and an SNS application.

Furthermore, (the control unit 300 of) the wireless device 30-2 corresponding to the user B includes the commander application 351-2, but at least the camera application and the SNS application are not installed.

Here, it is assumed that the user A belonging to the community A captures an image with the wireless device 30-1 and posts the captured image on the SNS of the community A.

In the wireless device 30-1, the execution processing unit 352-11 notifies the commander application 351-1 of an action event according to capture processing by the camera application (S131). In the commander application 351-1, the action event from the execution processing unit 352-11 is supplied from the execution management unit 362 to the detection unit 361 (S132).

The wireless device 30-1 transmits a request including the action event to the management server 10 via the network 40 (S133).

The management server 10 performs processing according to the action event on the basis of the action event from the wireless device 30-1.

Here, as illustrated in FIG. 11, the action event of "picture taking" occurs (S134). Note that, at this time, information regarding "which members are now together" such as the user A and the user B being together may be managed.

Figure 10:
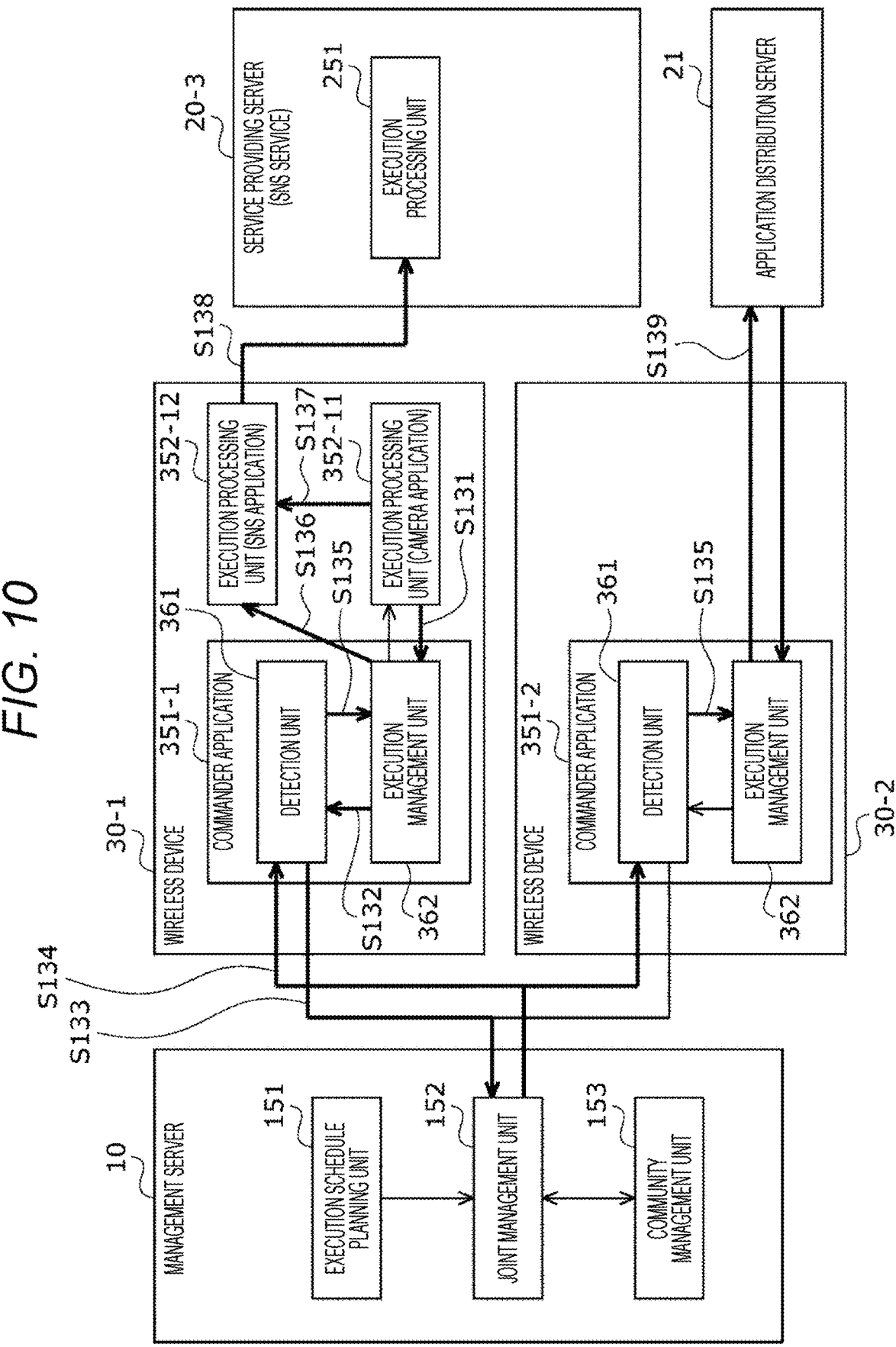
FIG. 10 is a diagram illustrating a third example of information processing in the first embodiment.

Returning to the description of FIG. 10, the management server 10 transmits a response including the action event to the wireless device 30-1 and the wireless device 30-2 via the network 40 (S134).

In the wireless device 30-1, the action event from the management server 10 is supplied from the detection unit 361 to the execution management unit 362 by the commander application 351-1 (S135). The execution management unit 362 controls the execution processing unit 352-12 on the basis of the action event (S136).

Here, as illustrated in FIG. 11, "picture sharing" is selected corresponding to "when having taken picture" according to the event that has occurred (action event) (S136). Furthermore, here, an SNS service A registered by the user A is selected from SNS services A to C according to the selection event of "picture sharing", and the operation of an SNS application provided by the SNS service A is controlled (S136).

Returning to the description of FIG. 10, the execution processing unit 352-12 controls the SNS application of the SNS service A according to the control from the commander application 351-1. When the SNS application is executed, the captured image captured by the camera application is transmitted to the service providing server 20-3 that provides the SNS service A (S137 and S138). As a result, the uploaded captured image is posted on the SNS service A, and the posted captured image (posted image) can be shared with other members.

Meanwhile, the wireless device 30-2 can grasp that the captured image is shared by the user A according to the action event from the management server 10, but the corresponding SNS application is not installed.

Therefore, the commander application 351-1 controls the communication unit 304 to access the application distribution server 21 via the network 40 and download the SNS application of the SNS service A in response to an SNS application installation request (S139). Accordingly, in the wireless device 30-2, the SNS application of the SNS service A is installed and activated, and the user B can view the posted image of the user A.

Here, in order for the user B to view the posted image of the user A, the user B needs to be invited to (a group of) the SNS service A. Here, the user A who can log in to the SNS service A may create a new group in the SNS service A and may invite the user B to the group.

However, since the user B does not have an account of the SNS service A, the following measures can be taken to invite the user B to the SNS service A. That is, a temporary number is issued to the user B on the basis of an ID managed by the community, and after the user B acquires the account of the SNS service A, the account is associated with the temporary number, and the user B is invited to the SNS service A again.

Note that, in the third example, the case where the SNS application of the SNS service A is not installed on the wireless device 30-2 has been described. However, in a case where the SNS application has already been installed and the user B has an account of the SNS service A, the posted captured image can be immediately presented using the installed SNS application.

Furthermore, in a case where there is a plurality of corresponding SNS applications, for example, an SNS application used by all members or many members of the community may be preferentially selected, or an SNS application prioritized by each individual may be selected. In the former case, the corresponding SNS application can be narrowed down using information regarding the service used by the community members.

As described above, while the user A and the user B belonging to the community A are acting together, a captured image is posted to the SNS service by the wireless device 30-1 of the user A and the wireless device 30-2 of the user B according to the available SNS service (a newly installed SNS service in a case where the SNS service is not installed), and the posted image can be shared with other members belonging to the community A.

(Whole Image of Processing)

Finally, a whole image of information processing in the first embodiment will be described with reference to a flowchart in FIG. 12.

The information processing illustrated in FIG. 12 is implemented by at least cooperation of (the control unit 100 of) the management server 10, (the control unit 200 of) the service providing server 20, and (the control unit 300 of) the wireless device 30 in the information processing system 1. That is, this information processing is executed by at least one of the control unit 100, the control unit 200, or the control unit 300.

As illustrated in FIG. 12, in the information processing system 1, the plurality of users (users A, B, etc.) who is currently acting together is specified (S151), and the specified plurality of users is set as a plurality of users belonging to the specific community (community A or the like) (S152).

Here, for example, position information of the user registered in the service can be managed by the management server 10, and a plurality of users (users A, B, etc.) who continues to move in a positional relationship in which the mutual distance is closer than a predetermined distance (for example, 3 m) for a certain period of time (for example, 5 minutes) can be specified as the plurality of users who is acting together.

Furthermore, in the information processing system 1, the same type of service (music distribution service, settlement service, SNS service, or the like) available to each user is determined (S153), and control is performed such that the plurality of users can experience the same type of service at substantially the same timing by the wireless devices 30 (the wireless devices 30-1 and 30-2 of the users A and B, and the like) of the users (S154).

As described above, in the information processing system 1, since a plurality of users who is acting together can experience the same type of service at substantially the same timing by each wireless device of each user according to the same type of service available to each user, a better user experience can be provided.

2. Second Embodiment

In recent years, subscription type services have become widespread. In particular, in music distribution services, subscription types have become mainstream. Furthermore, at present, even in the future, one music distribution service does not dominate all the users, and a plurality of music distribution services is provided. Therefore, a user selects a music distribution service suitable for the user from among the music distribution services.

Furthermore, in a music distribution service, various plans such as a pay plan and a free plan are prepared, and sound quality at the time of play back, usable functions, the presence or absence of advertisement, and the like are different depending on the plan.

In a wireless device 30, when an application (music application) provided by the music distribution service is installed and activated, and a user account is input to log in, provision of a service with low sound quality and limited functions by the free plan can be received. Meanwhile, when the user subscribes to the pay plan, the wireless device 30 can receive provision of a service with high sound quality and in which restriction of the functions is released.

For this reason, in a case where a plurality of users uses the music distribution service, various use states are assumed, and right processing according to a use state needs to be performed.

(Example of Service Use State and Right Processing)

FIG. 13 illustrates an example of a use state and right processing of a music distribution service of a user.

FIG. 13 illustrates a case in which a user A and a user B use one of a music distribution service A and a music distribution service B and there are a pay plan and a free plan, and examples of content of right processing according to combinations thereof.

In the first case, it is assumed that both the user A and the user B use the pay plan of the music distribution service A. In this case, since both users A and B subscribe to the pay plan in the same music distribution service A, songs may be simply distributed to both the users using rights of both the users.

In the second case, it is assumed that both the users A and B use the music distribution service A, but the user A uses the pay plan and the user B uses the free plan.

In this case, a playback instruction of a song is performed from the wireless device 30 of the user A having an account of the pay plan, and temporary (temporary) billing processing is performed. This billing processing can be said to be billing processing for pair listening. Furthermore, at this time, the wireless device 30 of the user B of the free plan cannot specify and play back a song.

In the third case, it is assumed that the user A subscribes to the pay plan of the music distribution service A, but the user B does not use the music distribution service.

In this case, similarly to the above-described second case, the playback instruction of a song is performed from the wireless device 30 of the user A having an account of the pay plan of the music distribution service A, and the temporary billing processing is performed.

However, since a music application of the music distribution service A is not installed in the wireless device 30 of the user B, individual treatment is needed, such as activating a web browser and playing back a song from a site of the music distribution service A.

In the fourth case, it is assumed that the user A subscribes to the pay plan of the music distribution service A and the user B subscribes to the pay plan of the music distribution service B. In this case, there are two coping processes.

First, similarly to the above-described second case, the playback instruction of a song is performed from the wireless device 30 of the user A having an account of the pay plan of the music distribution service A, and the temporary billing processing is performed. Note that, as described above, the wireless device 30 side of the user B needs individual treatment.

Second, the song is played back using the rights of the respective accounts of the pay plan of the music distribution service A of the user A and the pay plan of the music distribution service A of the user B. Note that processing for playing back the same song is required in the wireless device 30 of the user A and the wireless device 30 of the user B.

In the fifth case, it is assumed that both the user A and the user B use the free plan of the music distribution service A. In this case, a free trial provided by the music distribution service A is used. The content of the free trial is different for each music distribution service, but a free trial period such as one month may be used.

In the sixth case, it is assumed that the user A uses the free plan of the music distribution service A and the user B uses the free plan of the music distribution service B. In this case, similarly to the above-described fifth case, a free trial period or the like may be used.

(Flow Up to Playback)

Next, a flow up to song playback in the case where a plurality of users uses the same or different music distribution services will be described.

Figure 14:
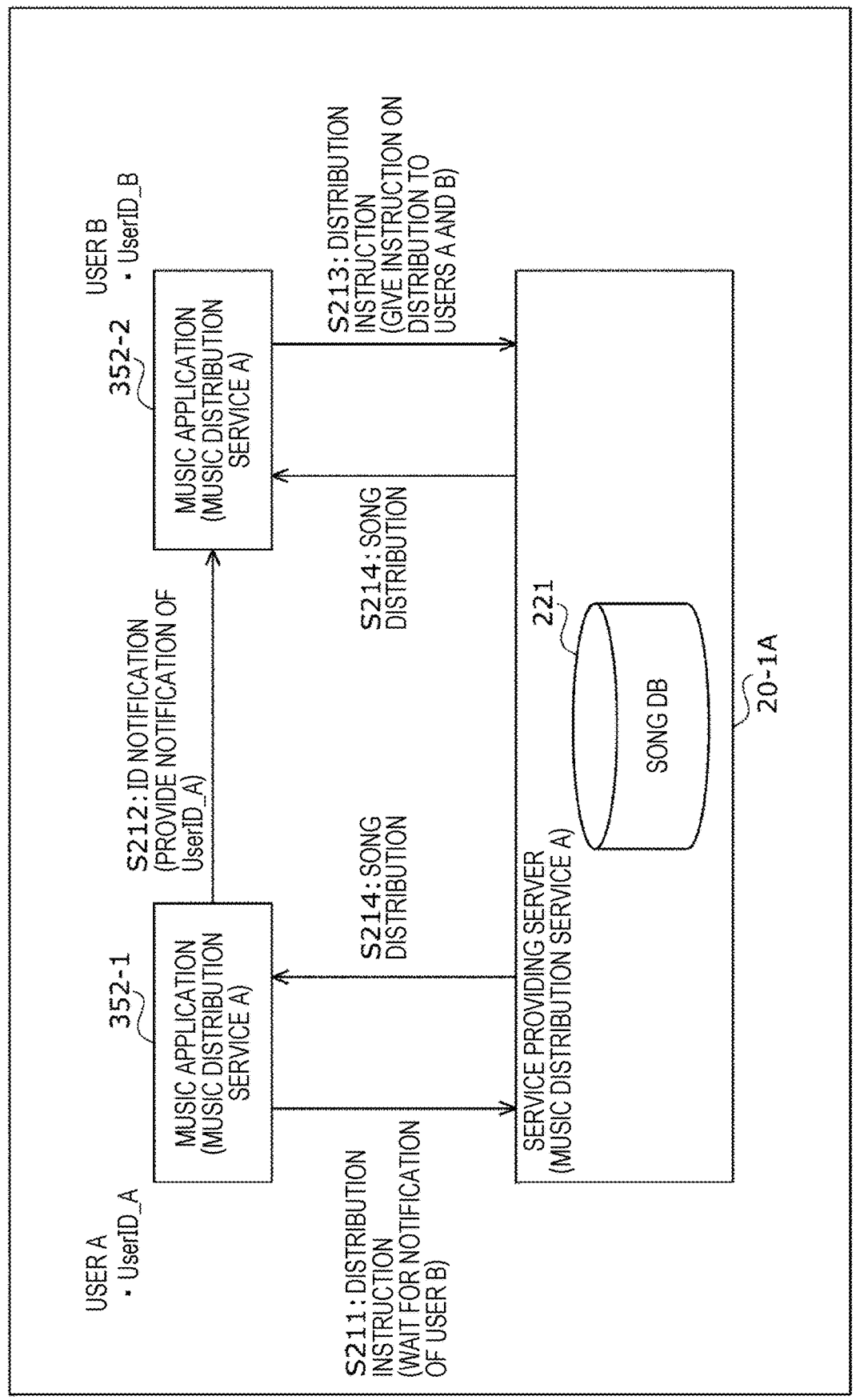
FIG. 14 is a diagram illustrating a flow of song playback in a case where the same music distribution service is used.

FIG. 14 illustrates a flow up to playback of the same song in the case where the two users A and B use the same music distribution service A. That is, the flow of playback illustrated in FIG. 14 corresponds to the first case of FIG. 13.

In FIG. 14, in the wireless device 30 of the user A, a music application 352-1 provided by the music distribution service A is activated, and the user is logged in with an account (UserID_A) of the user A. Furthermore, in the wireless device 30 of the user B, a music application 352-2 provided by the music distribution service A is activated, and the user is logged in with an account (UserID_B) of the user B.

At this time, the music application 352-1 transmits a request including a song distribution instruction to a service providing server 20-1 via a network 40 (S211). Note that this distribution instruction is waiting for notification from the user B.

Furthermore, the music application 352-1 notifies the music application 352-2 of the user ID (UserID_A) (S212). Then, upon receiving the notification of the ID from the music application 352-1, the music application 352-2 transmits the request including a song distribution instruction to the users A and B to the service providing server 20-1 via the network 40 (S213).

The service providing server 20-1 acquires data of the specified song from a song DB 221 according to the distribution instruction from the music application 352-1 and the distribution instruction from the music application 352-2. The service providing server 20-1 distributes data of the song to the music applications 352-1 and 352-2 via the network 40 (S214).

In this way, in the case where the users A and B use the same music distribution service A, the song to be played back is synchronized by one user notifying the other user of the user ID.

Figure 15:
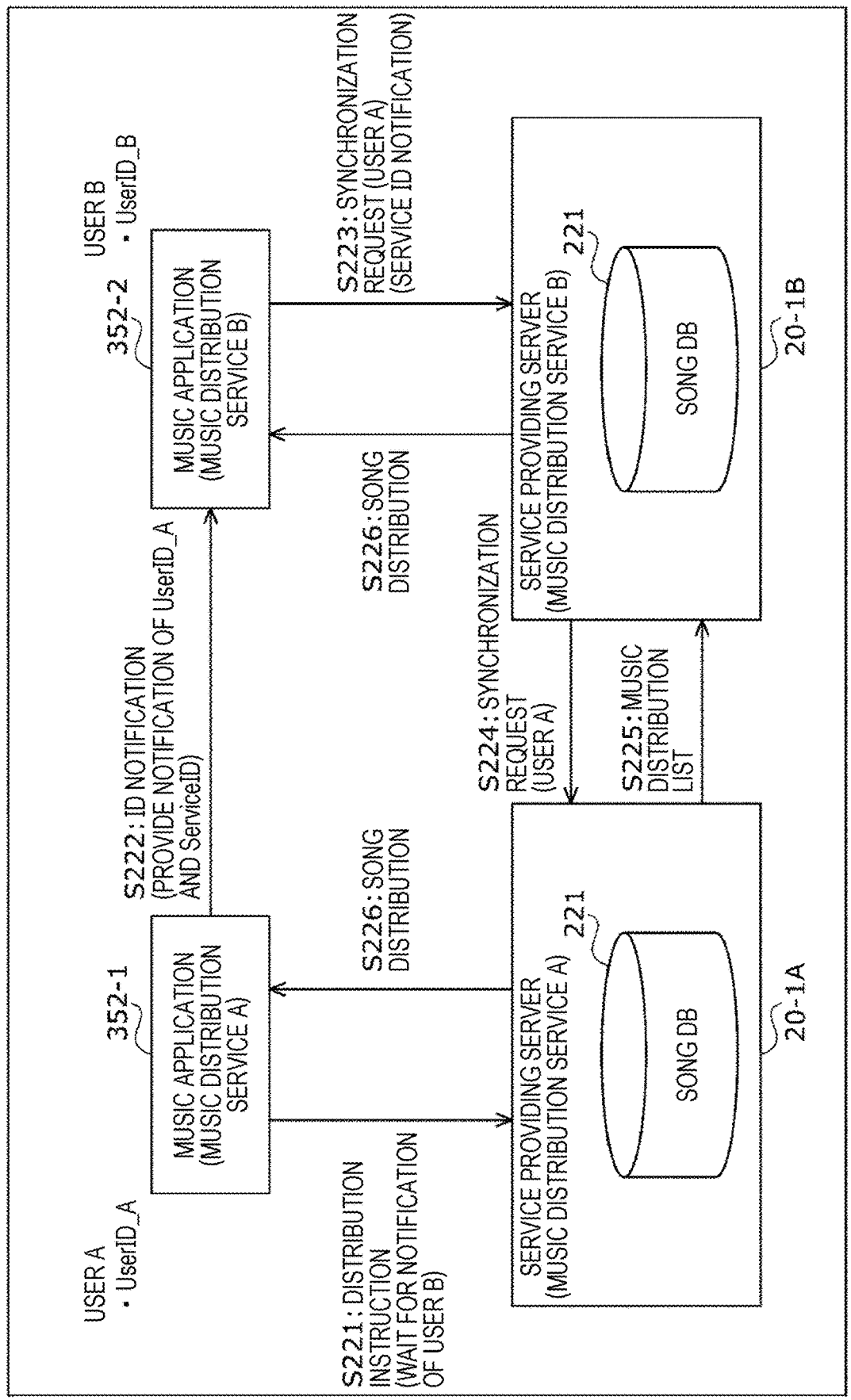
FIG. 15 is a diagram illustrating a flow of song playback in a case where different music distribution services are used.

FIG. 15 illustrates a flow up to playback of the same song in the case where the two users A and B use the different music distribution services A and B. That is, the flow of playback illustrated in FIG. 15 corresponds to the fourth case of FIG. 13.

In FIG. 15, in the wireless device 30 of the user A, the music application 352-1 provided by the music distribution service A is activated, and the user A (UserID_A) is logged in. Meanwhile, in the wireless device 30 of the user B, the music application 352-2 provided by the music distribution service B is activated, and the user B (UserID_B) is logged in.

At this time, the music application 352-1 transmits the request including the song distribution instruction to a service providing server 20-1A via the network 40 (S221). Note that this distribution instruction is waiting for notification from the user B.

Furthermore, the music application 352-1 notifies the music application 352-2 of the user ID (UserID_A) and a service ID (ServiceID_A) (S222). Then, upon receiving the notification of the IDs from the music application 352-1, the music application 352-2 transmits a request including a synchronization request with the user A and the service ID to a service providing server 20-1B via the network 40 (S223).

The service providing server 20-1B transmits the synchronization request with the user A to the service providing server 20-1A on the basis of the request from the music application 352-2 (S224). The service providing server 20-1A performs synchronization processing between the user A and the user B on the basis of the synchronization request from the service providing server 20-1B, and transmits a song distribution list obtained as a result to the service providing server 20-1B (S225).

Thereby, in the service providing servers 20-1A and 20-1B, the data of the same song is distributed to the music applications 352-1 and 352-2 via the network 40 (S226).

As described above, in the case where the users A and B use the different music distribution services A and B, one user notifies the other user of the user ID and the service ID, so that the music distribution services A and B are synchronized with each other and the song to be played back is synchronized.

(Overview of Community)

Although a community is not described in FIGS. 13 to 15, the second embodiment is given on the assumption that a concept of a community is incorporated and the two users A and B belong to a community A, similarly to the first embodiment. That is, the user A and the user B are members of the community A.

Here, an outline of the community will be described with reference to FIG. 16.

Figure 16:
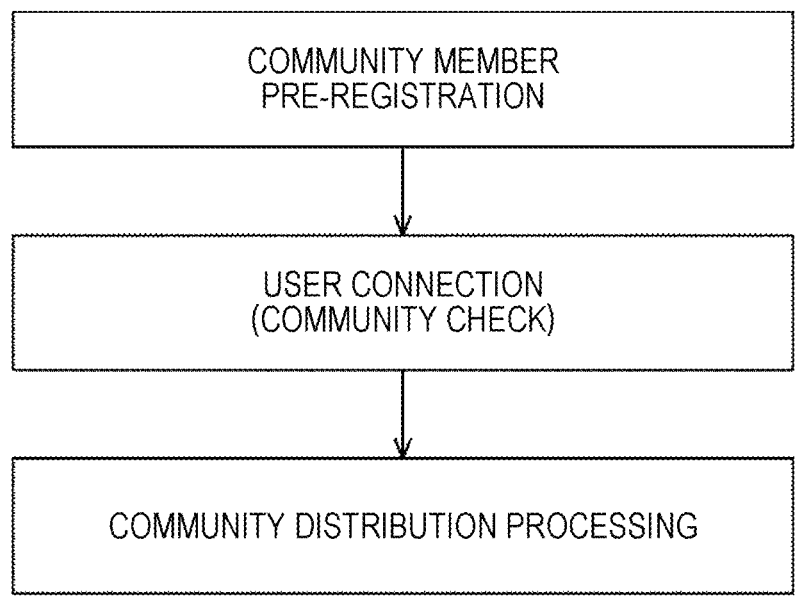
FIG. 16 is a diagram illustrating an outline of a community.

As illustrated in FIG. 16, in the present technology, as processing related to the community, processing is performed in order of pre-registration of community members, user connection (community check), and community distribution processing. Here, the pre-registration of community members is not essential, and a plurality of users who is acting together may be set as community members.

That is, in the pre-registration of community members, users having a certain relationship are pre-registered so as to belong to the same community. At the time of this registration, users who wish to create their own community can register each other using an application for the community activated on the wireless device 30 or the like.

Furthermore, a community is not only newly registered by users but also an already registered community is present. When the community has been already registered, the user can join the community by, for example, applying for registration as a member.

In the user connection, since it is not always necessary to synchronize with anyone, members of the community are registered in advance, and synchronization can be performed when a pre-registered member of the community is found.

Here, for example, IDs of members who listen to music together can be registered in advance, or a community connection mode can be prepared and functions such as a beacon search function can be turned on until members of the community are connected (connected by users). In the meantime, a community cancel mode may be prepared, and synchronization (user connection) may be canceled in a case where the users take individual actions or mutual positions are separated by a certain amount or more.

Furthermore, if there is a registered community (for example, a music community), a certain user on the spot may be invited to the registered community. In this invitation, the positions of the invited users may be detected, and only users within a predetermined range may be invited.

Moreover, the wireless device 30 of the user who has received the invitation is notified of a message indicating whether or not to receive the invitation, and only in a case of "OK", functions for members in the community such as a song playback function may be provided. At this time, the processing may be performed by the users holding and shaking the wireless devices 30 in their hands, in addition to a predetermined operation.

After the user connection is performed in this way, the community distribution processing is performed. For example, in the music community, the community distribution processing for allowing the members of the community to listen to the same music at the same time is performed, and people who listen to the music together are connected, so that so-called community listening is implemented. Hereinafter, community distribution processing (information processing) will be described in detail.

First Example

First, a first example of information processing in the second embodiment will be described with reference to FIG. 17.

The first example illustrates a case where the user A and the user B belonging to the community A can use a pay plan of the same music distribution service A.

Figure 17:
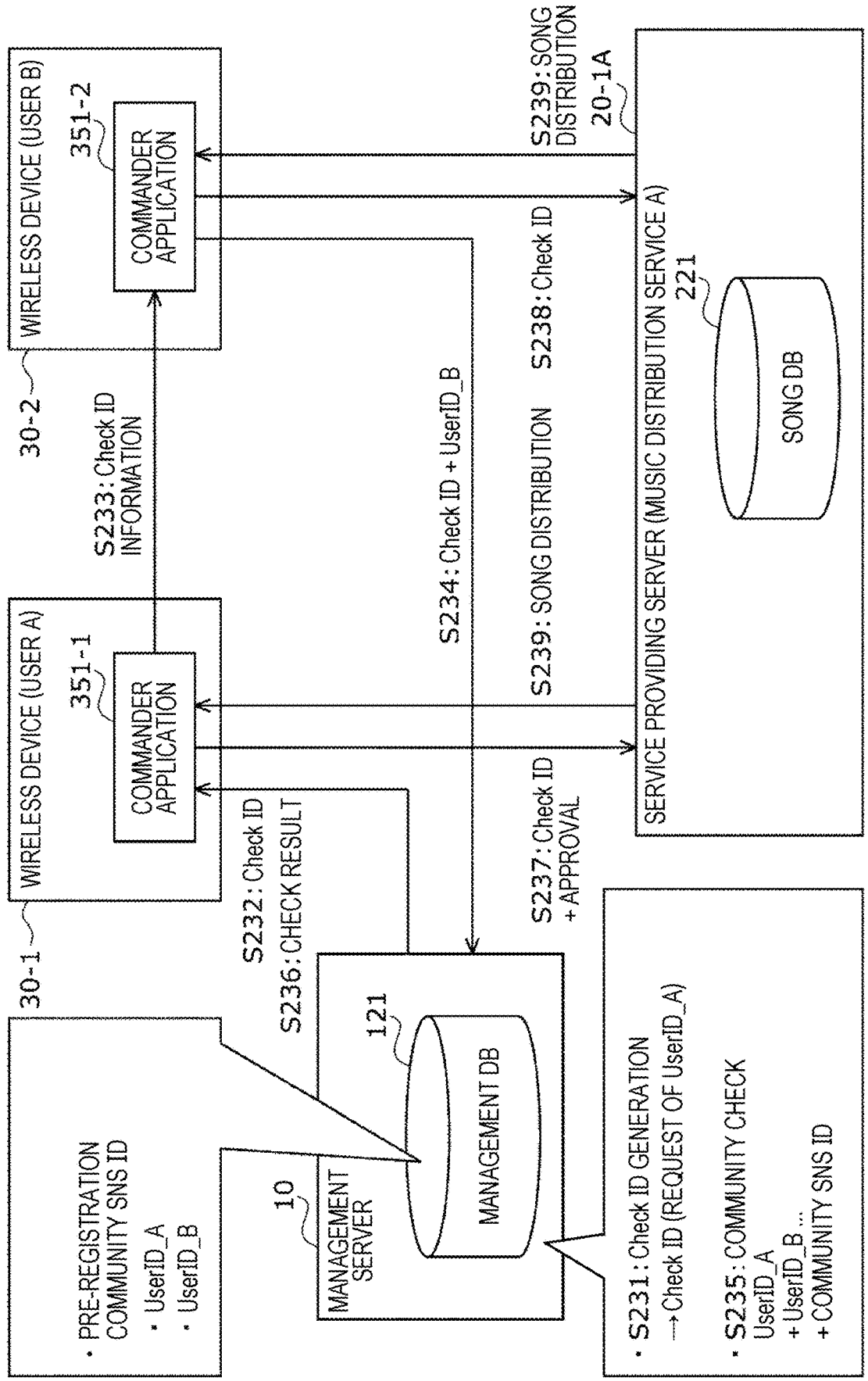
FIG. 17 is a diagram illustrating a first example of information processing in a second embodiment.

In FIG. 17, a commander application 351-1 is activated in a wireless device 30-1 of the user A, and a commander application 351-2 is activated in a wireless device 30-2 of the user B. Furthermore, in a management server 10, information regarding the community and the members (community SNS ID, user IDs, and the like) is registered in a management DB 121 in advance.

At this time, in the case of playing back the same song A, using music distribution services A available to the users A and B in cooperation, the management server 10 generates a check ID in response to a request from the commander application 351-1 (S231) and transmits the check ID to the commander application 351-1 via the network 40 (S232).

When receiving the notification of the check ID, the commander application 351-1 notifies the commander application 351-2 of check ID information including the check ID and the user ID (UserID_A) (S233). When receiving the notification of the check ID information, the commander application 351-2 acquires the check ID included in the check ID information, and transmits a request including the check ID and the user ID (UserID_B) to the management server 10 via the network 40 (S234).

The management server 10 checks the community on the basis of the information transmitted from the commander applications 351-1 and 351-2 and the information registered in advance (S235). Here, the presence of an SNS or the like of the community to which the users A and B belong is checked, and the check result is transmitted to the commander application 351-1 via the network 40 (S236).

The commander application 351-1 transmits a request including the check ID and approval to the service providing server 20-1A via the network 40 (S237). Furthermore, the commander application 351-2 transmits a request including the check ID to the service providing server 20-1A via the network 40 (S238).

The service providing server 20-1A streams the data of the song A to each of the wireless devices 30-1 and 30-2 via the network 40 on the basis of requests (distribution requests) from the commander application 351-1 and 351-2 (S239).

As described above, in the first example, when the user A and the user B belonging to the community A can use the pay plan of the same music distribution service A, (the commander application 351-1 of) the wireless device 30-1 of the user A transmits the distribution request of the song A specified by the user A to the service providing server 20-1A that provides the music distribution service A, and (the commander application 351-2 of) the wireless device 30-2 of the user B transmits the distribution request of the song A to the service providing server 20-1A.

Second Example

Figure 18:
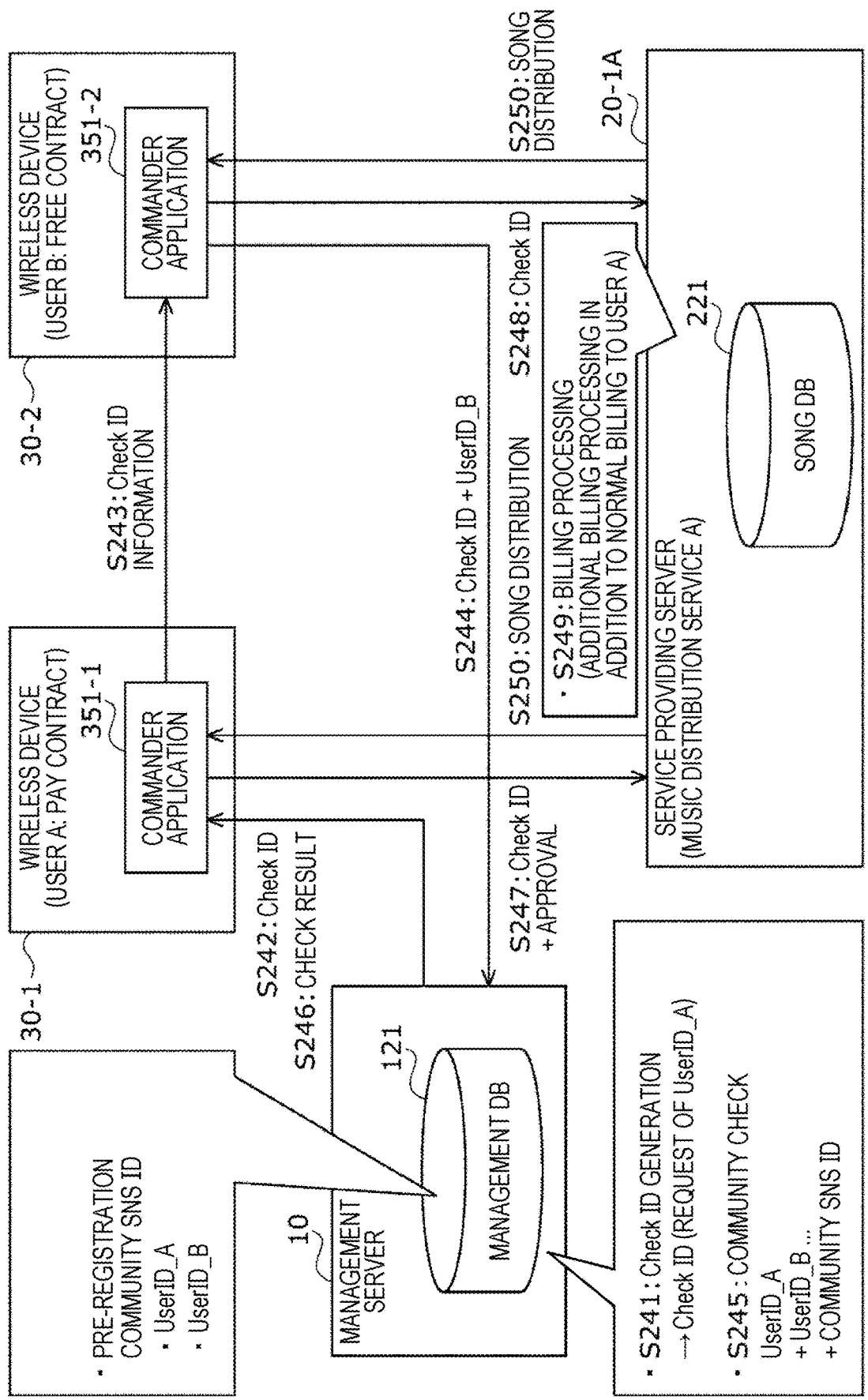
FIG. 18 is a diagram illustrating the second example of information processing in the second embodiment.

Next, a second example of the information processing in the second embodiment will be described with reference to FIG. 18.

The second example is common to the above-described first example in that the user A and the user B belonging to the community A can use the same music distribution service A but is different from the first example in that the user A uses the music distribution service A on the pay plan and the user B uses the music distribution service A on the free plan.

At this time, in the case of playing back the same song A, using the music distribution services A available to the users A and B in cooperation, the processing of steps S241 to S250 is executed.

Among the processing of steps S241 to S250, in the processing of steps S241 to S248, the distribution requests of the same song A are transmitted from the commander applications 351-1 and 351-2 by exchanging the check ID and the user IDs, similarly to the processing of steps S231 to S238 of FIG. 17.

When receiving the distribution requests from the commander applications 351-1 and 351-2, the service providing server 20-1A performs the billing processing (S249). In this billing processing, additional billing processing for pair listening is performed in addition to normal billing to the user A who subscribes to the pay plan.

Then, the service providing server 20-1A streams the data of the song A to each of the wireless devices 30-1 and 30-2 via the network 40 on the basis of the distribution requests from the commander application 351-1 and 351-2 (S250).

As described above, in the second example, when the user A and the user B who belong to the community A can use the same music distribution service A, and the user A uses the pay plan and the user B uses the free plan, (the commander application 351-1 of) the wireless device 30-1 of the user A performs not only the song distribution request but also the temporary billing processing, and transmits the song distribution request of (the commander application 351-2 of) the wireless device 30-2 of the user B to the service providing server 20-1A.

Third Example

Figure 19:
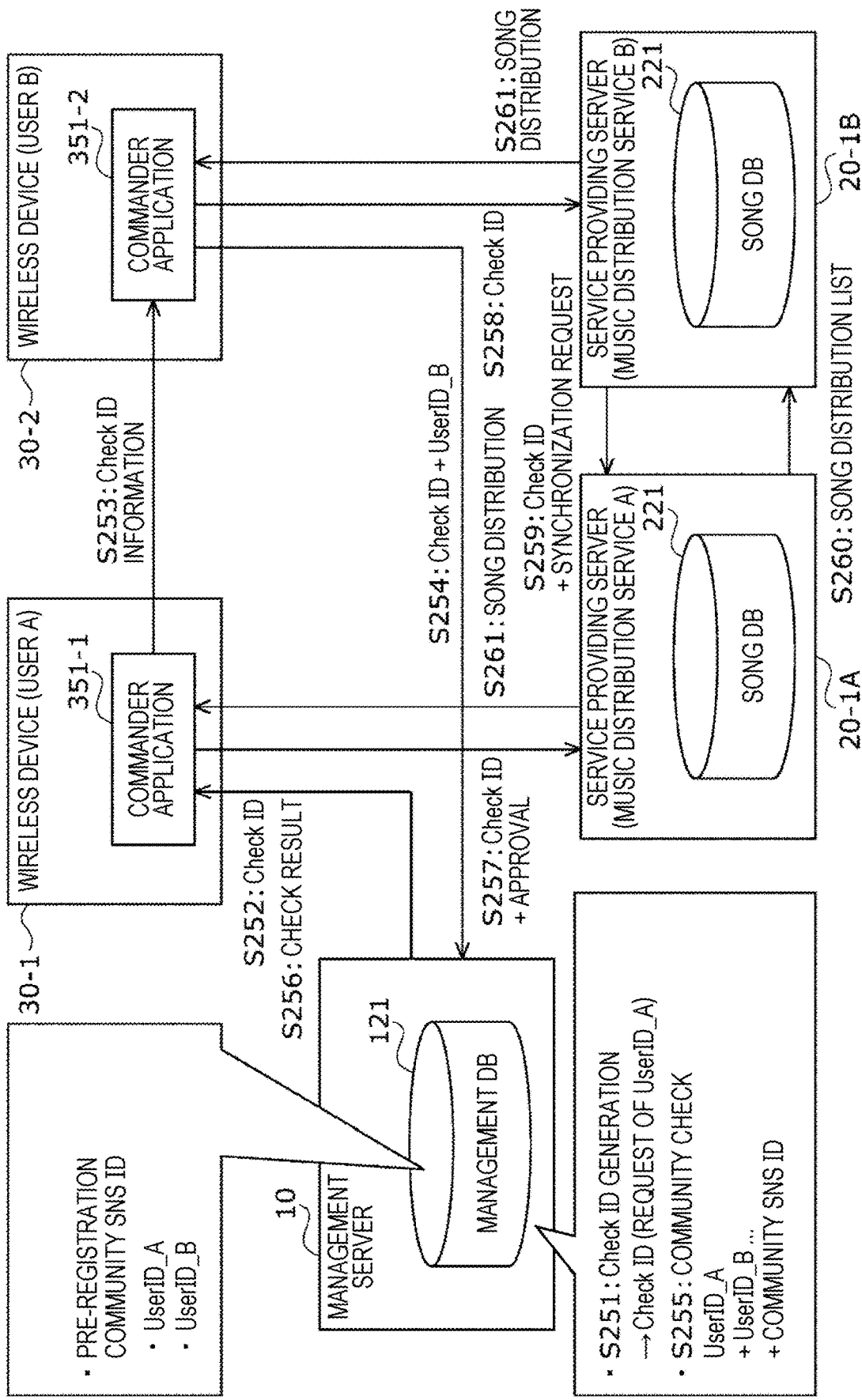
FIG. 19 is a diagram illustrating a third example of information processing in the second embodiment.

Next, a third example of information processing in the second embodiment will be described with reference to FIG. 19.

The third example illustrates a case where the user A and the user B belonging to the community A can use pay plans of different music distribution services A and B.

At this time, in the case of playing back the same song A, using (synchronizing) the music distribution service A available to the user A and the music distribution service B available to the user B in cooperation, the management server 10 generates the check ID in response to the request from the commander application 351-1 and transmits the check ID (S251 and S252).

The commander application 351-1 transmits check ID information including the check ID, the user ID, and the service ID to the commander application 351-2 according to the check ID from the management server 10 (S253). The commander application 351-2 notifies the management server 10 of a request including the check ID and the user ID in accordance with the check ID information from the commander application 351-1 (S254).

The management server 10 checks the community on the basis of the information transmitted from the commander applications 351-1 and 351-2 and the information registered in advance (S255), and transmits a check result to the commander application 351-1 (S256).

The commander application 351-1 transmits a request including the check ID and approval to the service providing server 20-1A (S257). Furthermore, the commander application 351-2 transmits a request including the check ID to the service providing server 20-1B (S258).

The service providing server 20-1B transmits a synchronization request with the user A together with the check ID to the service providing server 20-1A on the basis of the request from the commander application 351-2 (S259).

The service providing server 20-1A performs the synchronization processing between the user A and the user B on the basis of the request from the commander application 351-1 and the check ID and the synchronization request from the service providing server 20-1B, and transmits a song distribution list obtained as a result to the service providing server 20-2 (S260).

As a result, the data of the song A from the service providing server 20-1A and the data of the song A from the service providing server 20-1B are synchronized and streamed to each of the wireless devices 30-1 and 30-2 via the network 40 (S261).

As described above, in the third example, when the user A and the user B belonging to the community A can use the pay plans of the different music distribution services A and B, (the commander application 351-1 of) the wireless device 30-1 of the user A transmits the distribution request of the song A specified by the user A to the service providing server 20-1A that provides the music distribution service A, and (the commander application 351-2 of) the wireless device 30-2 of the user B transmits the distribution request of the song A to the service providing server 20-1B that provides the music distribution service B.

Fourth Example

Figure 20:
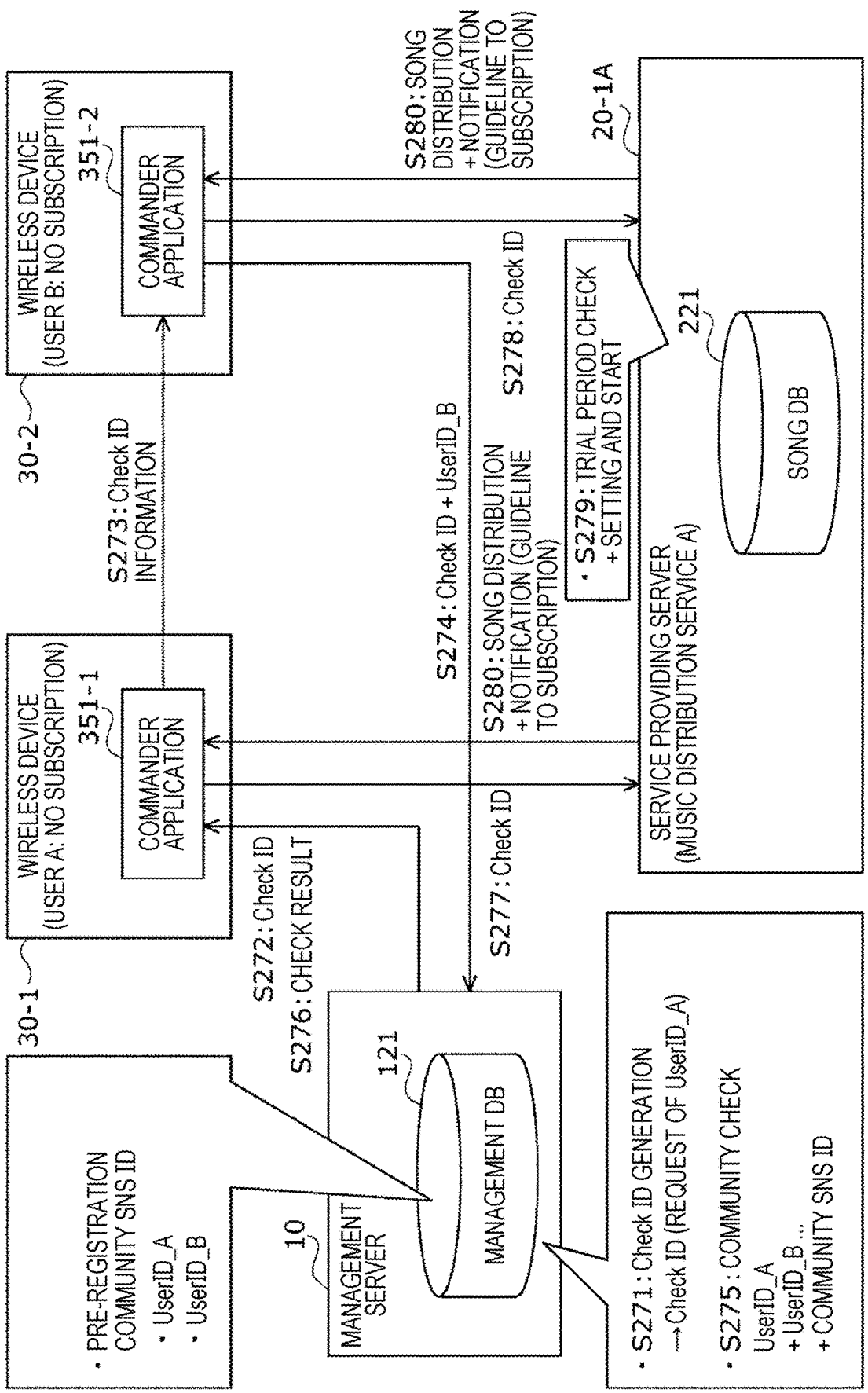
FIG. 20 is a diagram illustrating a fourth example of information processing in the second embodiment.

Next, a fourth example of the information processing in the second embodiment will be described with reference to FIG. 20.

The fourth example illustrates a case where both the user A and the user B belonging to the community A do not subscribe to the music distribution service.

At this time, in the case of playing back the same song, using the music distribution services A to which both the users A and B do not subscribe in cooperation, the processing of steps S271 to S280 is executed.

Among the processing of steps S271 to S280, in the processing of steps S271 to S278, the distribution requests of the same song A are transmitted from the commander applications 351-1 and 351-2 by exchanging the check ID and the user IDs, similarly to the processing of steps S231 to S238 of FIG. 17.

When the service providing server 20-1A is notified of the distribution requests from the commander applications 351-1 and 351-2, distribution preparation processing such as checking, setting, and starting of the trial period is performed (S279). That is, even in the case of the free plan, it is difficult to operate the service without using an account, and thus, here, the distribution preparation processing is performed regarding the operation as the trial period of the free plan.

Then, the service providing server 20-1A streams the data of the same song A to each of the wireless devices 30-1 and 30-2 via the network 40 (S280). At this time, notification of a subscription guideline to the music distribution service A may be performed. Specifically, notification for requesting download of the music application of the music distribution service A, issuing a temporary ID, or prompting transition to the pay service can be made.

As described above, in the fourth example, when both the user A and the user B who belong to the community A do not subscribe to the music distribution service A, the wireless device 30-1 of the user A transmits the free trial distribution request of the song A specified by the user A to the service providing server 20-1A that provides the music distribution service A, and the wireless device 30-2 of the user B transmits the free trial distribution request of the song A to the service providing server 20-1A.

(Event-Driven Song Switching)

In a case where the community distribution processing (information processing) of any one of the above-described first to fourth examples is performed, and the user A and the user B belonging to the community A listen to the same song A at substantially the same timing, the song A may be switched to the song B that matches a predetermined event when the event has occurred.

For example, in a case where the wireless device 30 such as a smartphone has a camera function, at the timing when the user captures an object using the wireless device 30, the captured image is analyzed and content of the event is analyzed, a song matching the event is searched for, and the matched song is played back.

Figure 21:
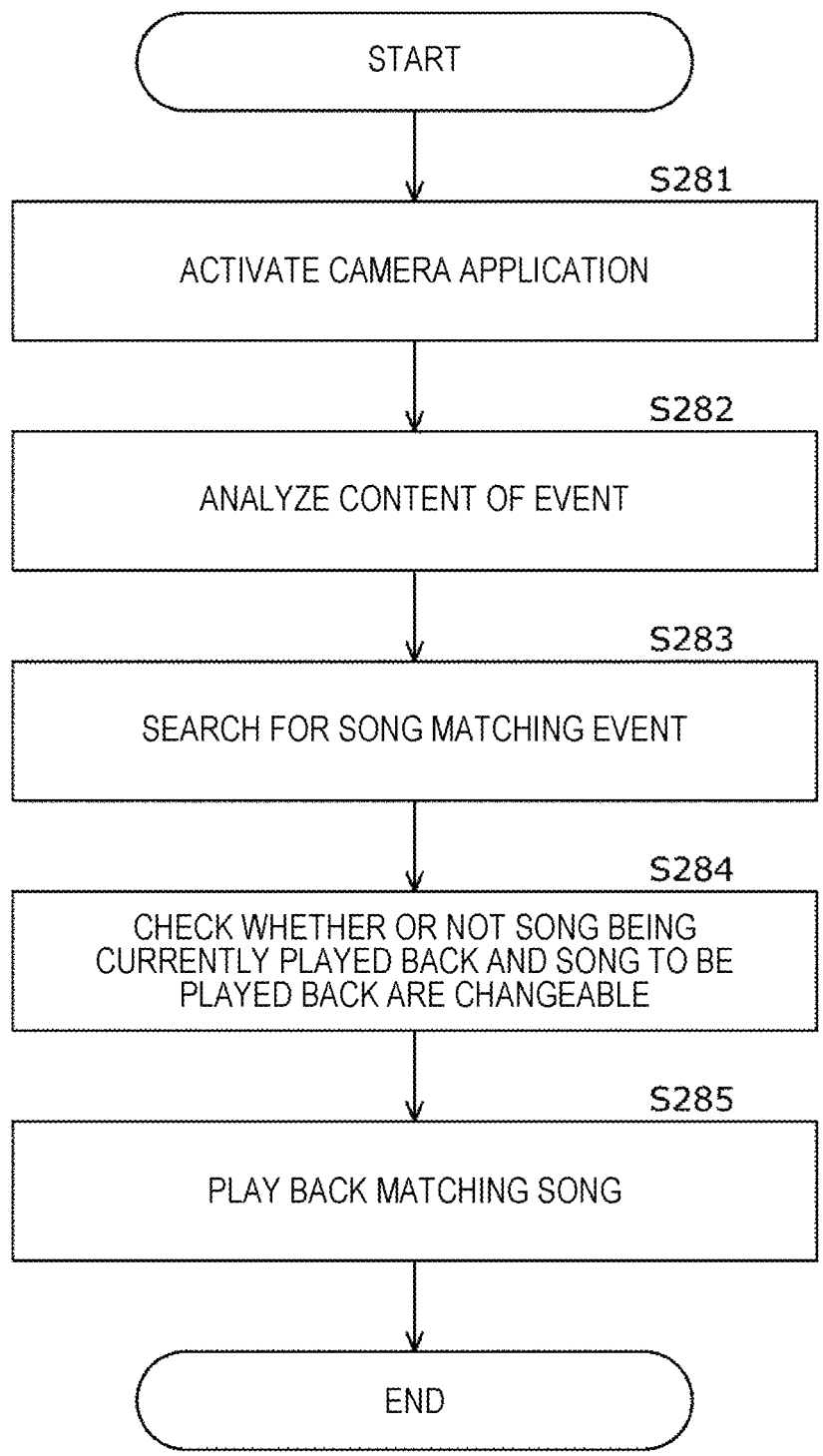
FIG. 21 is a flowchart for describing a flow of playback content switching processing corresponding to event driven.

Specifically, the song A that the user A and the user B belonging to the community A are listening to is switched to another song B in the flow of the processing illustrated in the flowchart in FIG. 21.

That is, in the information processing system 1, a camera application is activated by the wireless device 30-1 of the user A (S281), and when a shutter button is pressed by the user A, the content of the event is analyzed by analyzing the captured image obtained by capturing the object (S282). In this analysis processing, the object included in the captured image is analyzed, and the content of the event is specified.

Then, in the information processing system 1, the song matching the specified event is searched for (S283), and whether or not the song being currently played back and the song to be played back are changeable is checked (S284). Here, in a case where the target song A can be changed, the song A is switched to the searched song B, and the wireless device 30-1 plays back the song B matching the specified event (S285).

As a result, for example, in a case where Tokyo Sky Tree is captured as the object, a song related to "Tokyo Sky Tree" is searched for, and the song can be changed to the song more matching the event.

Furthermore, in a case where there is a song directly specified by the users A and B, the playback is not changed to the matched song. For example, in a case where a song specification has been made, such as playing a song related to "Tokyo Tower" when the users come near the Tokyo Tower, playback of a matched song is not performed. However, in a case where the playback of the specified song has been completed and another song is being played back, the playback may be changed to the matched song.

Note that the song to be played back may be changed at timing when the wireless device 30 having the camera function faces the object on the basis of an analysis result (capture location, capture time, the object, and the like) of the captured image. Moreover, the trigger of the event is not limited to the activation of the camera application, and a specific place specified from global positioning system (GPS) information, timing of payment with electronic money at a store, a ticket gate, or the like, spot information obtained by a beacon function, or the like can be used.

As described above, in the above-described first to fourth examples, when the user A and the user B belonging to the community A are listening to the same music A at substantially the same timing, the song A being played back can be switched to the song B matching the event at the timing when the wireless device 30 of the user A or the user B captures an object with the camera.

(Whole Image of Processing)

Finally, a whole image of the information processing in the second embodiment will be described with reference to flowcharts in FIGS. 22 and 23. Note that, in FIGS. 22 and 23, for convenience of description, the wireless device 30-1 of the user A is referred to as a "wireless device A", and the wireless device 30-2 of the user A is referred to as a "wireless device B".

Figure 22:
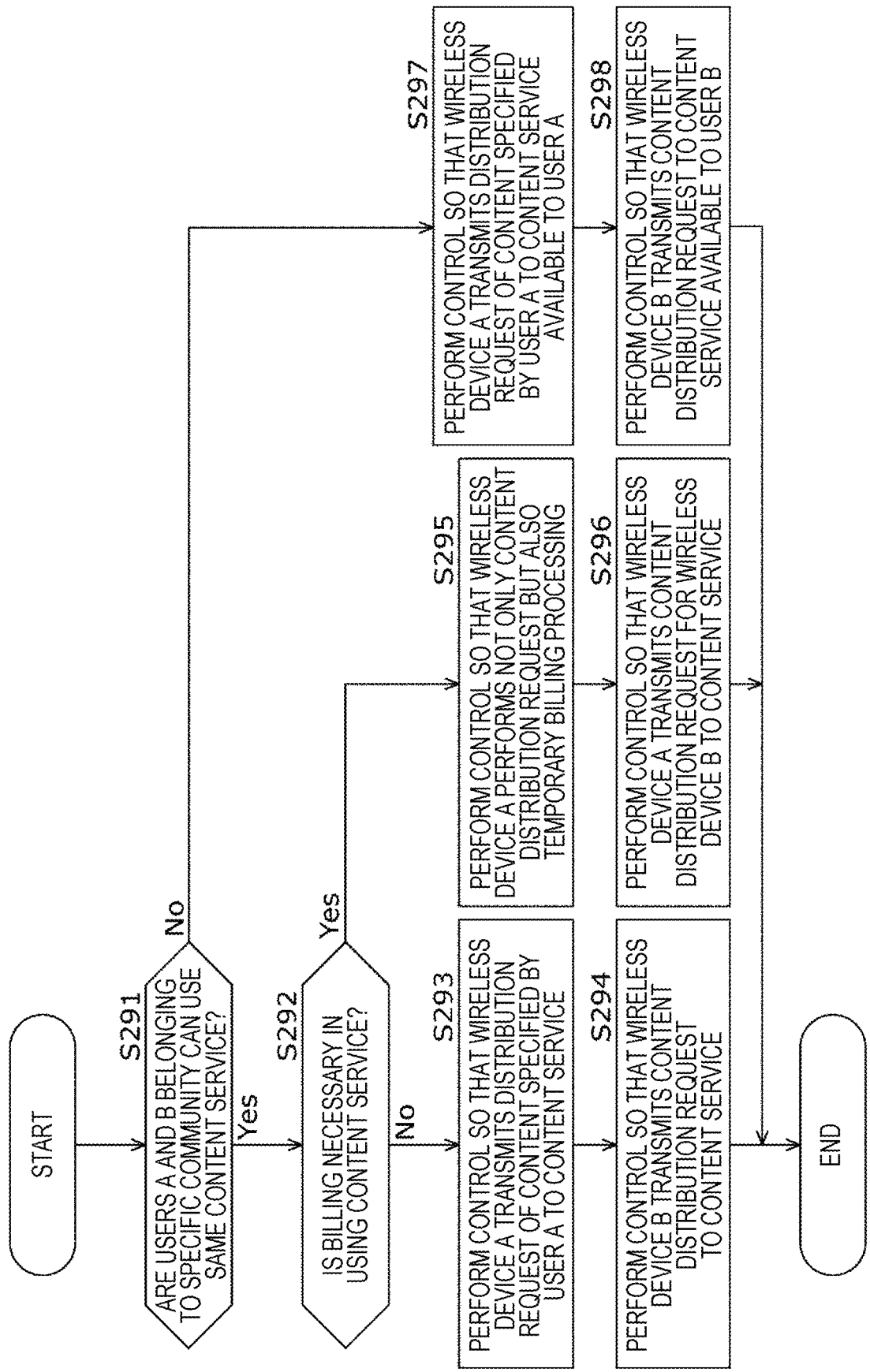
FIG. 22 is a flowchart for describing a whole image of the information processing in the second embodiment.
Figure 23:
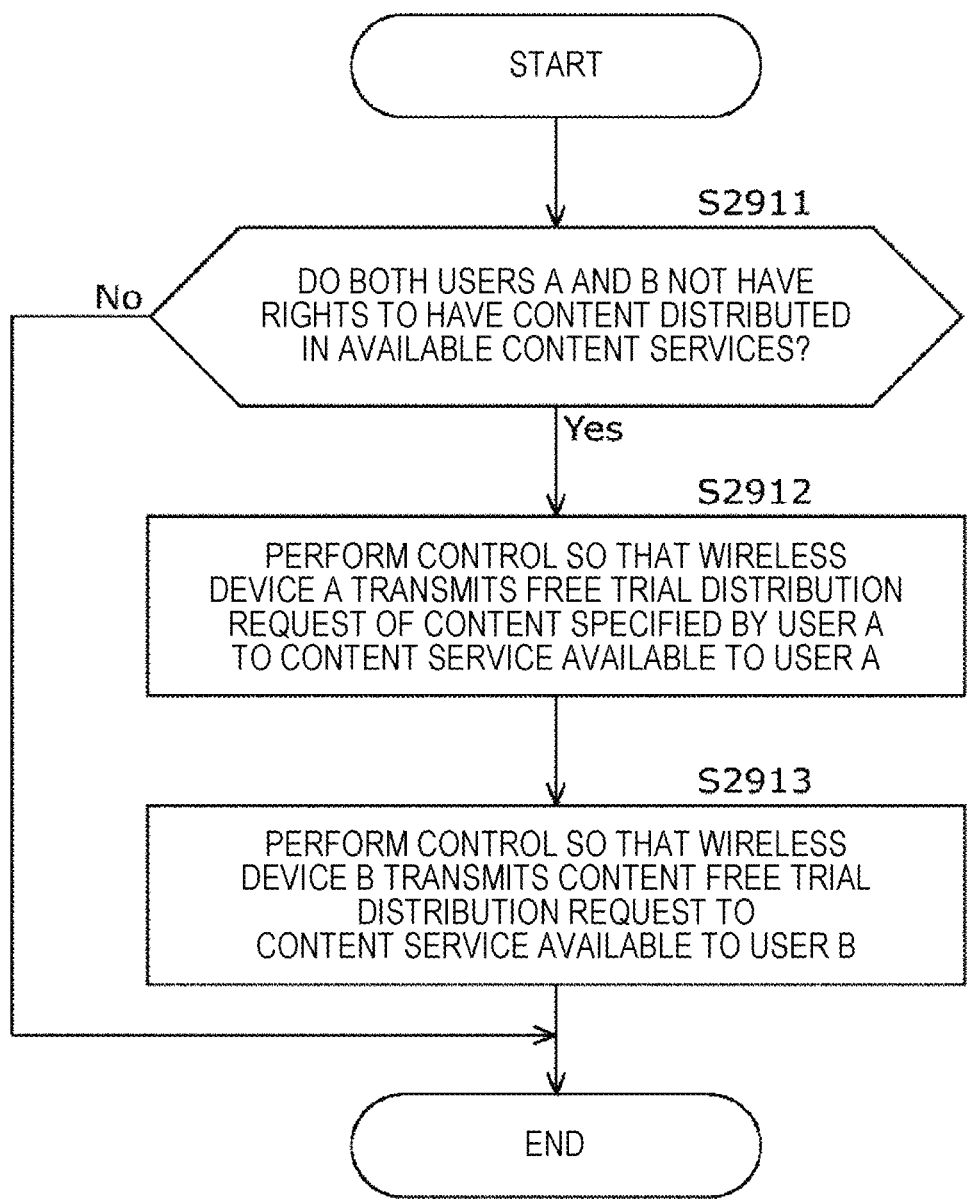
FIG. 23 is a flowchart for describing the whole image of information processing in the second embodiment.

The information processing illustrated in FIGS. 22 and 23 is implemented by at least cooperation of (the control unit 100 of) the management server 10, (the control unit 200 of) the service providing server 20, and (the control unit 300 of) the wireless device 30 in the information processing system 1. That is, this information processing is executed by at least one of the control unit 100, the control unit 200, or the control unit 300.

As illustrated in FIG. 22, in the information processing system 1, in the case where the users A and B belonging to a specific community (community A or the like) can use a content service, whether or not the same content service (music distribution service or the like) can be used is determined (S291).

In a case where affirmative (Yes) determination is made in the determination processing of step S291, the information processing system 1 determines whether or not billing is necessary in using the content service (S292).

In a case where negative (No) determination is made in the determination processing of step S292, billing is unnecessary, and thus the processing of steps S293 and S294 is executed. This processing corresponds to the first example of the information processing illustrated in FIG. 17.

That is, control is performed so that the wireless device 30-1 transmits the distribution request of the content specified by the user A to the content service (music distribution service A or the like) (S293). Furthermore, control is performed so that the wireless device 30-2 transmits the content distribution request to the content service (music distribution service A or the like) (S294).

Furthermore, in the case where affirmative (Yes) determination is made in the determination processing of step S292, the billing is necessary, and thus the processing of steps S295 and S296 is executed. This processing corresponds to the second example of the information processing illustrated in FIG. 18.

That is, control is performed so that the wireless device 30-1 performs not only the content distribution request but also the temporary billing processing for the content service (the music distribution service A or the like) (S295). Furthermore, control is performed so that the wireless device 30-1 transmits the content distribution request for the wireless device 30-2 to the content service (music distribution service A or the like) (S296).

Moreover, in the case where negative (No) determination is made in the determination processing of step S291, the processing of steps S297 and S298 is executed. This processing corresponds to the third example of the information processing illustrated in FIG. 19.

That is, control is performed so that the wireless device 30-1 transmits the distribution request of the content specified by the user A to the content service (music distribution service A or the like) available to the user A (S297). Furthermore, control is performed so that the wireless device 30-2 transmits the content distribution request to the content service (music distribution service B or the like) available to the user B (S298).

When the processing of step S294, S296, or S298 ends, the information processing of FIG. 22 ends.

Furthermore, as illustrated in FIG. 23, in the information processing system 1, whether or not both the users A and B belonging to the specific community (community A or the like) do not have the right to have the content distributed in the respective available content services is determined (S2911).

In the case where affirmative (Yes) determination is made in the determination processing of step S2911, both of the users A and B have not subscribed to the content service, the processing of steps S2912 and S2913 is executed. This processing corresponds to the fourth example of the information processing illustrated in FIG. 20.

That is, control is performed so that the wireless device 30-1 transmits the free trial distribution request of the content specified by the user A to the content service (music distribution service A or the like) available to the user A (S2912). Furthermore, control is performed so that the wireless device 30-2 transmits the free trial content distribution request to the content service (music distribution service A or the like) available to the user B (S2913).

Note that, in a case where the processing of step S2913 ends or negative determination is made in the determination processing of step S2911, the information processing of FIG. 23 ends.

3. Third Embodiment (Song Recommendation Method)

Next, a song recommendation method in community listening will be described.

Figure 24:
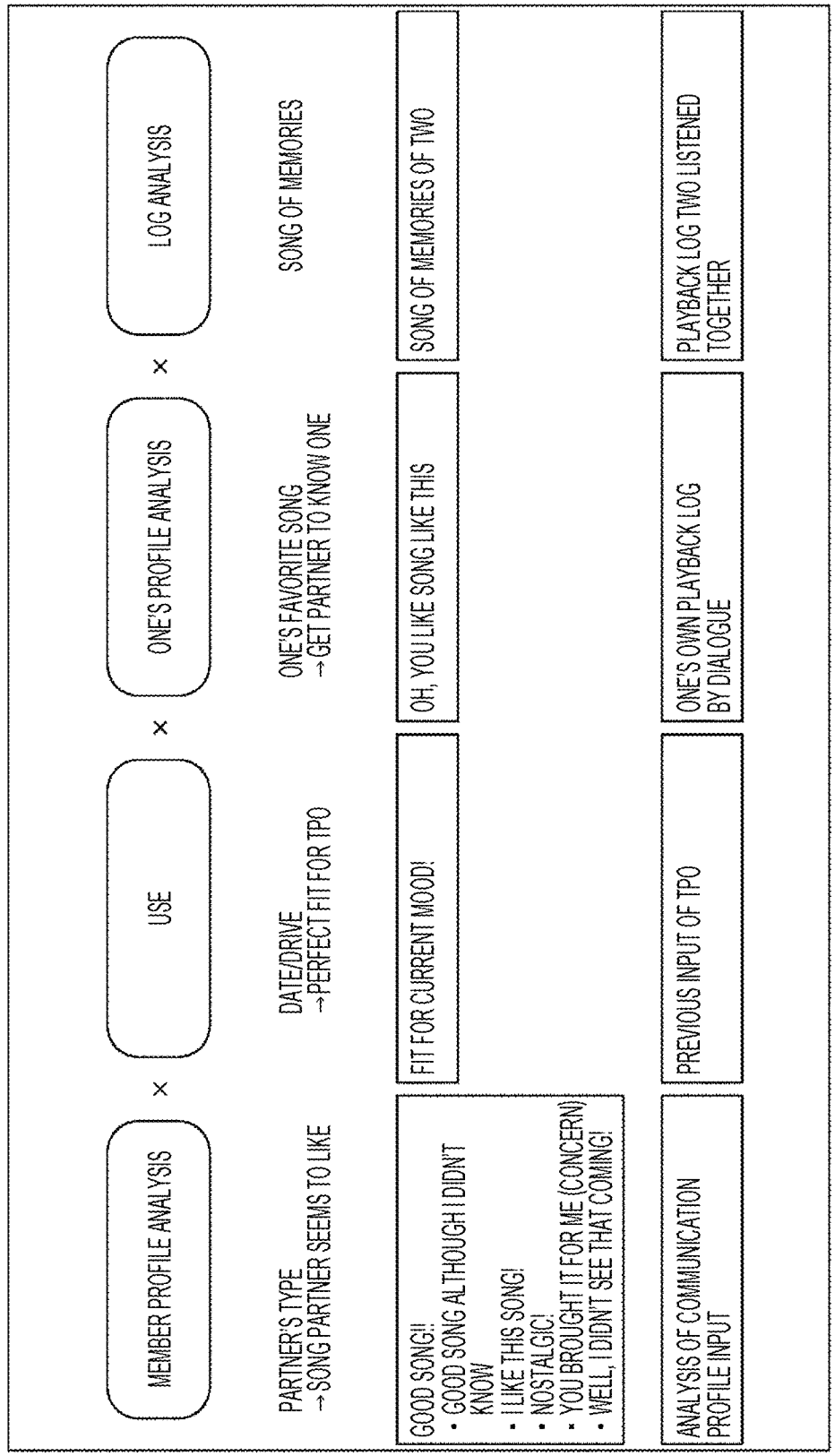
FIG. 24 is a diagram illustrating an example of a content recommendation method.

In song recommendation, as illustrated in FIG. 24, an analysis result of a profile of a member belonging to a community, use, an analysis result of one's profile, or an analysis result of a past log can be used.

In the analysis of a profile of a member, a song that a partner who stays together seems to like can be recommended by analyzing a type of the partner who stays together or the like. In this analysis, an interaction between a target member and another member may be analyzed in addition to the analysis of the input profile.

A song matching TPO, that is, a time (Time), a place (Place), and an occasion (Occasion), can be recommend according to the use such as a date or a drive. In the case of using the use, the TPO needs to be input in advance.

As the analysis of one's profile, a song that the one likes can be recommended by analyzing a playback log of the one's song, a record of dialogue, and the like. As a result, it is possible to get the partner to know the one.

In the past log analysis, a song of memories of two people can be recommended by analyzing the playback log of songs the two people listened to before.

In this way, a song can be recommended by analyzing the profile of a member or one's profile or specifying the use. Here, it is important that the target user considers the recommended song is a good song.

(Input of Community Related Information)

As such a song recommendation method, first, a method of recommending a song on the basis of input of information related to the community will be described.

Figure 25:
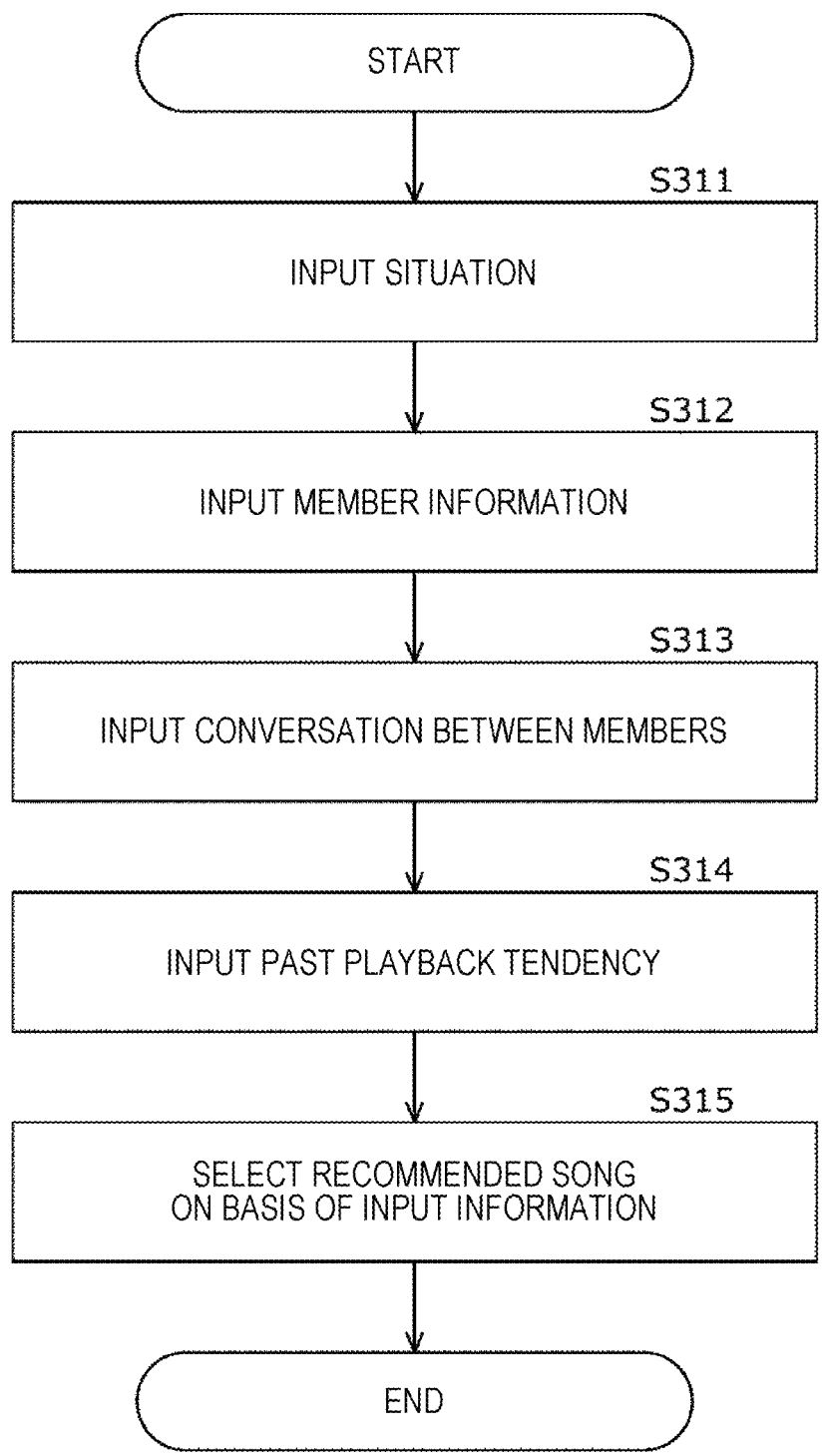
FIG. 25 is a flowchart for describing a flow of content recommendation processing corresponding to a community.

As the information related to the community, as illustrated in FIG. 25, information regarding situations, member information, conversations between members, past playback tendencies, and the like can be used.

Specifically, since a song to listen to changes depending on a situation where a member belonging to the community acts, a place to go to such as an amusement park, or use such as a date, a barbeque, or a trip is input as the situation (S311).

Furthermore, since a song to listen to changes depending on members belonging to the community, information of members such as age group, gender, and number of people is input (S312), or information of conversation between members such as exchange of messages on social media is input (S313).

Moreover, since the tendency of the song desired to listen to is known from the past playback tendency, the playback history or the like of the song listened to the end (the song other than the recommended song listened to the end, or the like) is input (S314). Note that, here, whether or not a song to which a member of the community gives "like", a song excited by everyone, a relationship between members of the community deepens, or the like may be included in the past playback tendency.

Then, when the information related to the community is input in the processing of steps S311 to S314, a recommended song is selected on the basis of the input information (S315).

Note that, here, instead of presenting all the selected recommended songs, the recommended song may be appropriately selected. Specifically, one's own recommended song may be reflected on another member of the community, or a song with high priority may be selected according to one's own analysis.

(Assistance by Agent)

Figure 26:
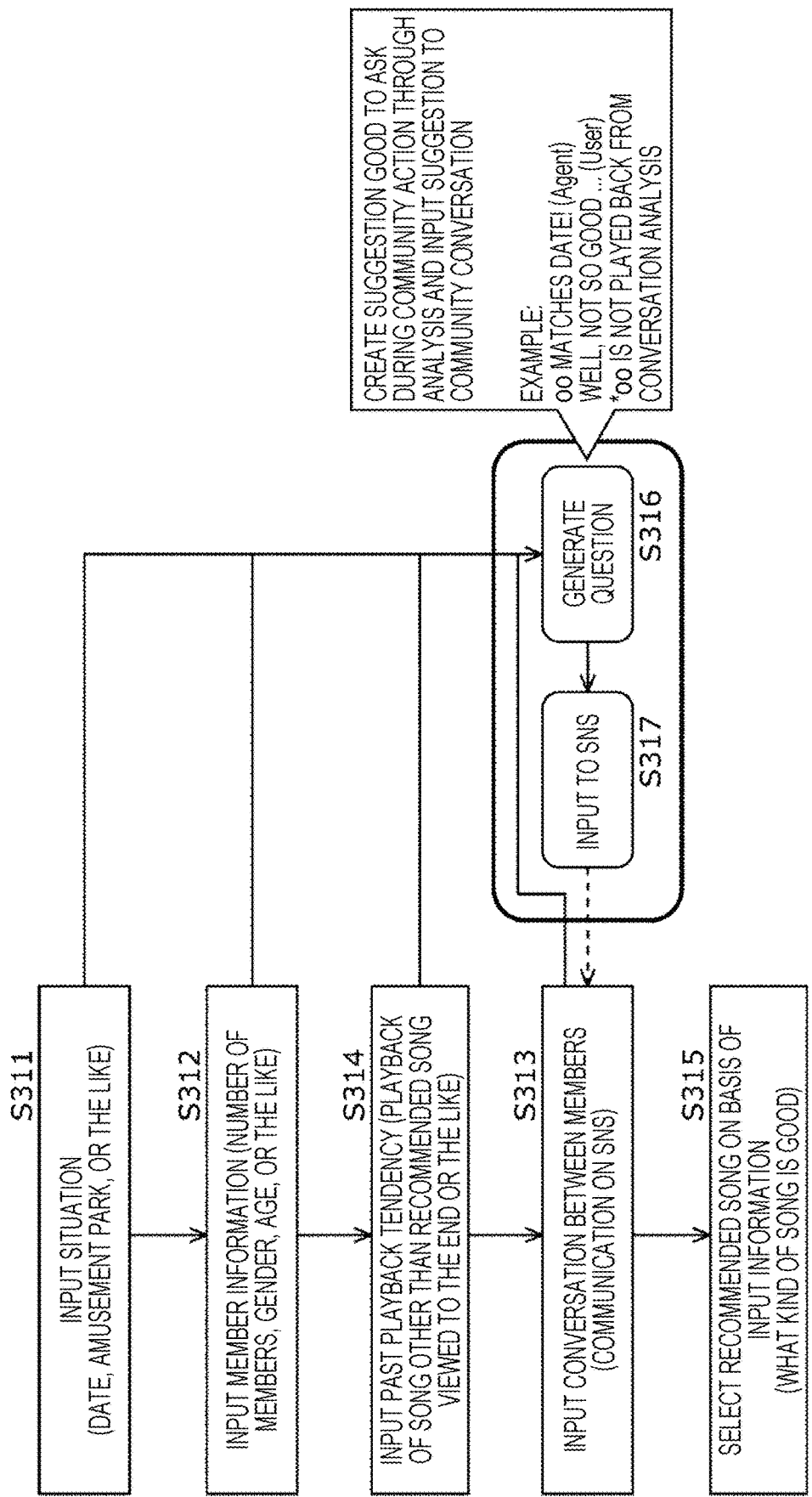
FIG. 26 is a diagram illustrating an example of information collection using an agent.

Furthermore, an agent may participate in a conversation of the community and collect the input information. FIG. 26 illustrates an example of collection of the input information using an agent. This agent is a software agent having an artificial intelligence function.

In FIG. 26, when the situation such as a date or an amusement park (S311), the information of members such as the number of people, gender, or age (S312), the past playback tendency such as a playback history of a song other than the recommended song viewed to the end (S314), or the conversation between members such as an exchange on the SNS (S313) is input, the agent participates in the conversation of social media community so that an intentional conversation is included in the conversation between members.

That is, a suggestion good to ask at the time of community action through the analysis of the input information is generated as a question (S316) and is input to the social media such as the SNS (S317). As a result, for example, a conversation (a question and an answer) is performed on the SNS as described below.

Agent: "oo matches the date!" (oo: song name)
User: "Well, not so good."

In this example, when a recommended song is selected on the basis of the input information, the song "oo" is excluded from the recommended song by analyzing the conversation on the SNS and will not be played back (S315).

(Configuration Example of System)

Figure 27:
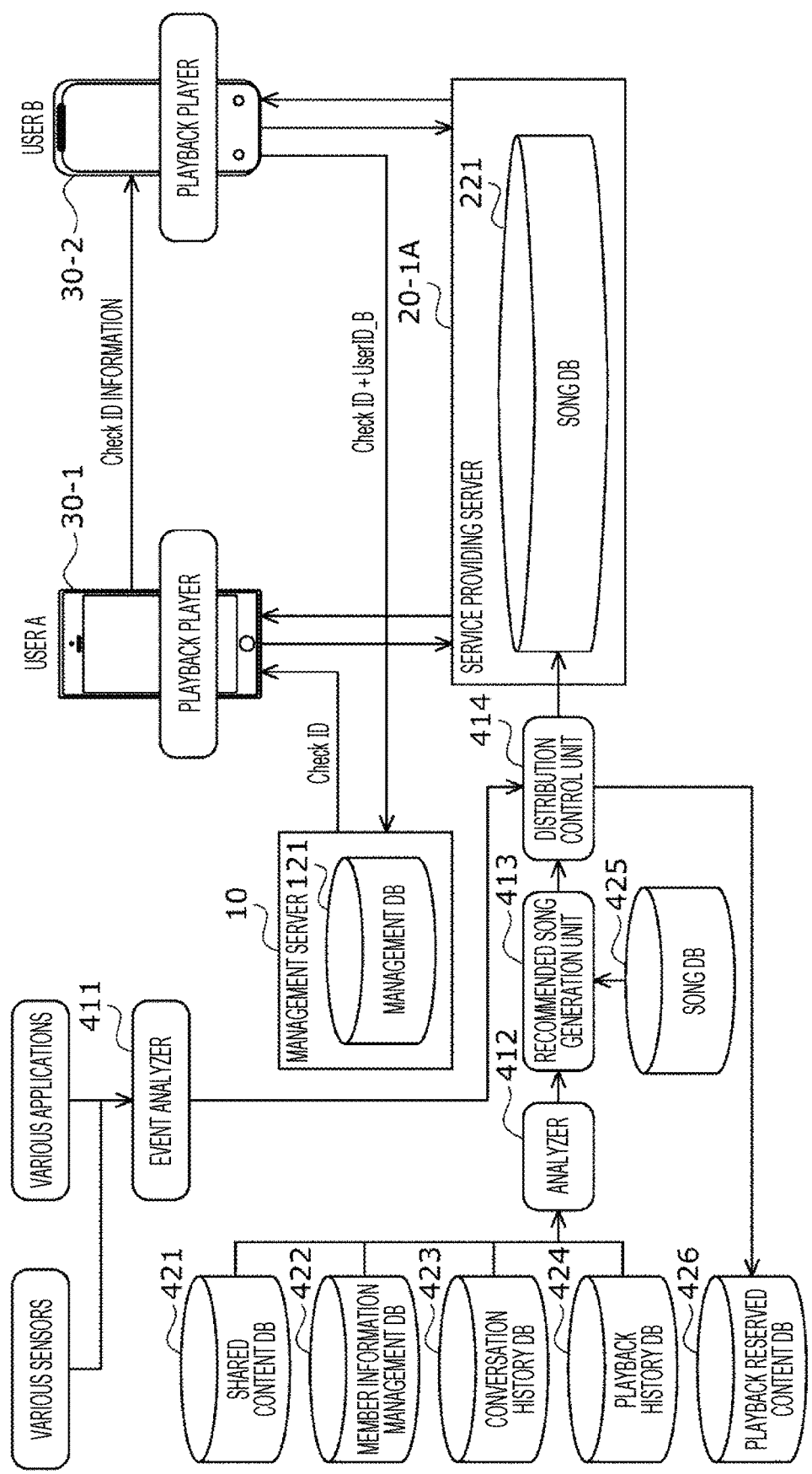
FIG. 27 is a diagram illustrating an example of a configuration of an information processing system corresponding to presentation of a recommended song.

FIG. 27 illustrates an example of a configuration of an information processing system 1 corresponding to presentation of a recommended song.

In FIG. 27, similarly to the above-described first example (FIG. 17) of the second embodiment, when a user A and a user B belonging to a community A can use a pay plan of a same music distribution service A, (a commander application 351-1 of) a wireless device 30-1 transmits a distribution request of a song A specified by the user A to a service providing server 20-1A, and (a commander application 351-2 of) a wireless device 30-2 transmits a distribution request of the same song A to the service providing server 20-1A.

Thereby, a playback player of the wireless device 30-1 and a playback player of the wireless device 30-2 play back the same song A.

At this time, as the method of recommending the recommended song, for example, there is the following method. That is, an event analyzer 411 analyzes the event and monitors whether or not the recommended song has been requested on the basis of information from various sensors and various applications of the wireless devices 30-1 and 30-2.

Furthermore, an analyzer 412 analyzes information stored in databases such as a shared content DB 421, a member information management DB 422, a conversation history DB 423, and a playback history DB 424, and supplies an analysis result to a recommended song generation unit 413.

The recommended song generation unit 413 generates a recommended song on the basis of the analysis result from the analyzer 412 and information regarding songs stored in a song DB 425, and supplies the recommended song to a distribution control unit 414.

The distribution control unit 414 provides the recommended song from the recommended song generation unit 413 to the service providing server 20-1A according to the analysis result from the event analyzer 411. Thereby, the service providing server 20-1A can distribute the recommended song to the wireless devices 30-1 and 30-2 via a network 40.

Information processing corresponding to the presentation of the recommended song may be executed by a management server 10, the service providing server 20-1A, or the like, or may be executed by a server newly provided for recommendation. Furthermore, the information processing may be executed by not only one server but also a plurality of servers in cooperation.

Note that since there is a difference in the song to be distributed between music distribution services, whether or not the recommended song can be played back may be checked for the service contracted by the member in the community before the start of playback, and in a case where there is no recommended song, recommendation may proceed to the next song.

(Example of Folder Management)

As a range of songs that can be selected by a plurality of users belonging to a community, a song can be selected for each community and a song to listen to together can be set. At this time, it is assumed that the users share a folder instead of a playlist, and a playlist and the like can be included in the folder.

Here, in the folder provided for each community, personal preferences of the users belonging to the community are not reflected, and a song that the users want to listen to when the plurality of users belonging to the community stays together is reflected. This can protect the privacy of users who do not want other users to know their music preferences.

Figure 28:
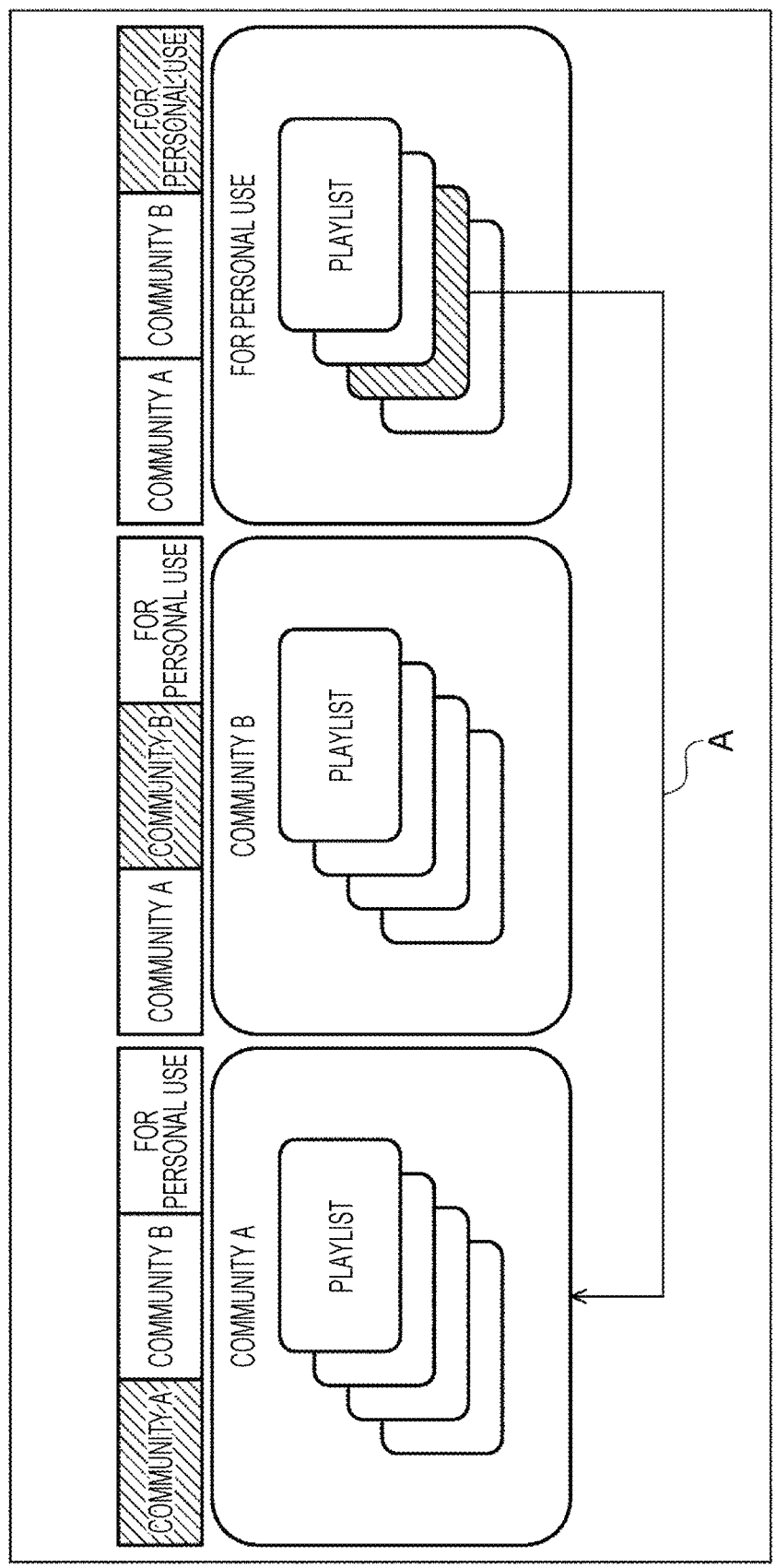
FIG. 28 is a diagram illustrating an example of folder management corresponding to a community.

FIG. 28 illustrates an example of folder management corresponding to a community. In FIG. 28, the content of the folder is illustrated for each of tabs "community A", "community B", and "personal use".

In the folder of "community A", a playlist for the community A is managed. In the folder of "community B", a playlist for the community B is managed.

In the folder of "individual use", a playlist for individual use (for each user) is managed. Here, a playlist, a song, or the like is published from the folder for personal use to the folder of a community, so that a playback list (a playlist, a song, or the like) is generated in the folder of a community (the arrow A in the drawing).

(Whole Image of Processing)

Finally, a whole image of information processing in the third embodiment will be described with reference to a flowchart in FIG. 29.

Figure 29:
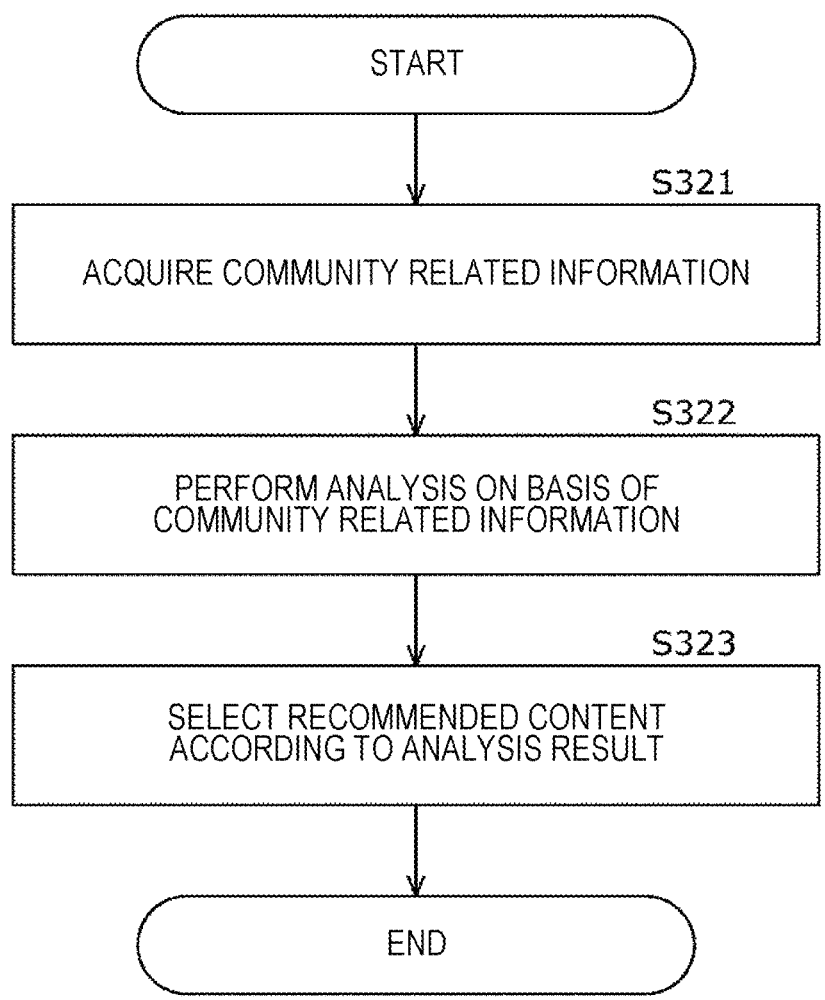
FIG. 29 is a flowchart for describing a whole image of information processing in a third embodiment.

The information processing illustrated in FIG. 29 is implemented by at least cooperation of (a control unit 100 of) the management server 10 and (a control unit 200 of) the service providing server 20 in the information processing system 1. Note that, in the case where the server for recommendation is newly provided, the processing is executed in cooperation with the server.

As illustrated in FIG. 29, the information processing system 1 acquires community related information related to the community (S321).

As the community related information, for example, any one of attribute information (age group, gender, and the like) of the plurality of users (users A and B, etc.) belonging to the specific community (community A and the like), past communication content between the plurality of users (messages on the social media and the like), content playback histories of the plurality of users (songs other than recommended songs that have been listened to the end, and the like), the situation in which content recommended by the plurality of users is played back (the place to go to such as an amusement park), and the preference of a specific user belonging to the specific community (the preference of a specific user to a specific song, and the like) is acquired.

Then, the information processing system 1 performs an analysis on the basis of the acquired community related information (S322), and selects the recommended content (recommended song or the like) according to the analysis result (S323). Thereby, in the information processing system 1, the selected recommended content is presented to the wireless device 30.

4. Fourth Embodiment

A community may be manually formed according to a user's operation or may be automatically formed at predetermined timing.

That is, a community (community C or the like) to which a user A and a user B belong can be automatically formed according to communication between a wireless device 30-1 used by the user A and a wireless device 30-2 used by the user B.

By forming the community in this way, playback of a song of the plurality of users in the community can be synchronized, and the users can listen to the same music.

At the time of playback of the song, the playback may be controlled according to the user's operation or the playback may be automatically controlled at predetermined timing.

Specifically, as the manual playback control, when an instruction on playback of a song is given by an arbitrary user among the plurality of users in the community, playback of the song in the wireless device 30 used by the user is started, and playback of the song is also started in the wireless devices 30 used by other users in the community.

That is, when one member in the community performs the song playback operation, the playback operation of all the members is performed.

Furthermore, as the automatic playback control, in a case where it is detected that the users A and B in the community move together on the basis of position information from the wireless devices 30-1 and 30-2, the same song is simultaneously distributed to the wireless devices 30-1 and 30-2. Thereby, the user A and the user B can listen to the same music while moving together.

Note that information for detecting a trigger in the automatic playback control is not limited to the position information, and other information such as sensor data acquired by the wireless device 30 may be used. By using the sensor data, a state when the eyes of the user A and the user B meet or when the user A and the user B hold hands can be detected, and playback control according to the detection result can be performed.

(Whole Image of Processing)

Figure 30:
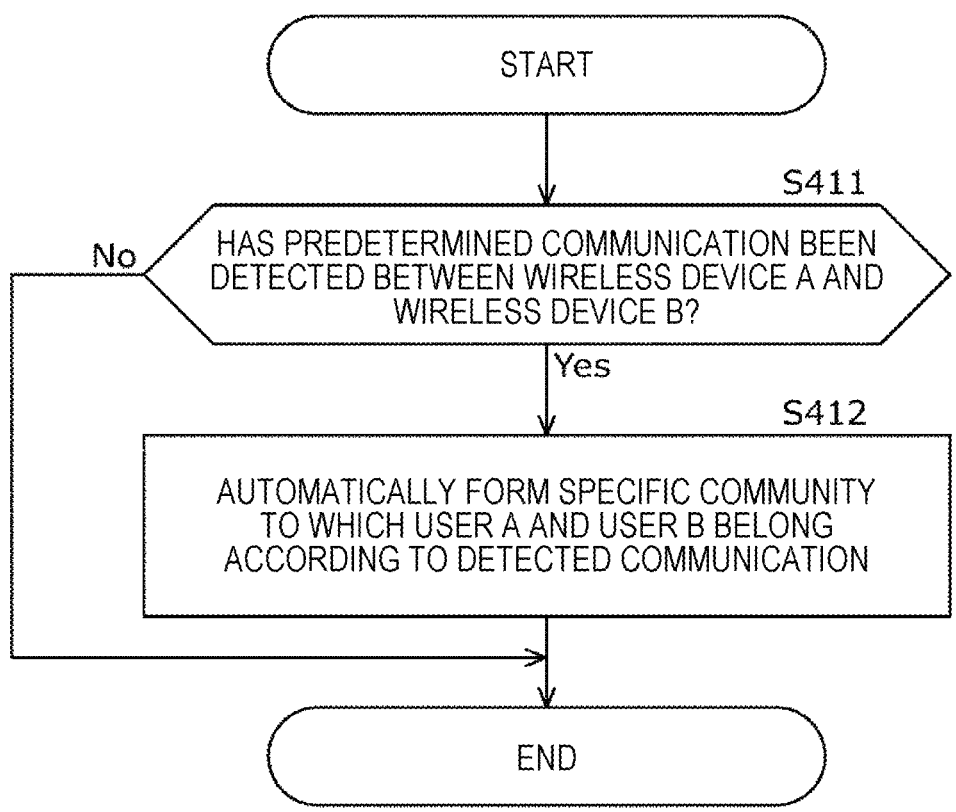
FIG. 30 is a flowchart for describing a whole image of information processing in a fourth embodiment.

FIG. 30 illustrates a whole image of the information processing in the fourth embodiment.

The information processing illustrated in FIG. 30 is implemented by at least cooperation of (a control unit 100 of) a management server 10 and (a control unit 300 of) the wireless device 30 in an information processing system 1.

As illustrated in FIG. 30, the information processing system 1 determines whether or not predetermined communication has been detected between the wireless device 30-1 used by the user A and the wireless device 30-2 used by the user B (S411).

In a case where affirmative determination is made in the determination processing of step S411, the information processing system 1 automatically forms the specific community (community C or the like) to which the user A and the user B belong according to the detected communication (S412).

Note that, in a case where the processing of step S412 ends or negative determination is made in the determination processing of step S411, the information processing of FIG. 30 ends.

5. Fifth Embodiment

In a case where members belonging to a community have a conversation, the community may be supported by assisting the conversation.

That is, as assistance of the conversation between the members, voice of a speaker can be appropriately amplified and delivered to a partner when the members have a conversation.

Specifically, in a case where a user A and a user B belonging to a community A use a wireless device 30-1 and a wireless device 30-2, respectively, and listen to a same song A, when the user A and the user B start a conversation, the voice of the user A (or the user B) can be amplified and delivered to the user B (or the user A). Note that the degree of amplification here can be appropriately adjusted according to an ambient sound or the like.

Furthermore, when the user A and the user B start a conversation, the volume of the song played back in the wireless device 30-1 and the wireless device 30-2 may be reduced.

Here, since there are two users of the user A and the user B, the volume of the wireless device 30-1 and the wireless device 30-2 may be simply reduced at a stage of detecting that one of the two users starts utterance. Thereby, the conversation between the members, such as the conversation between the user A and the user B, can be made clear.

(Whole Image of Processing)

Figure 31:
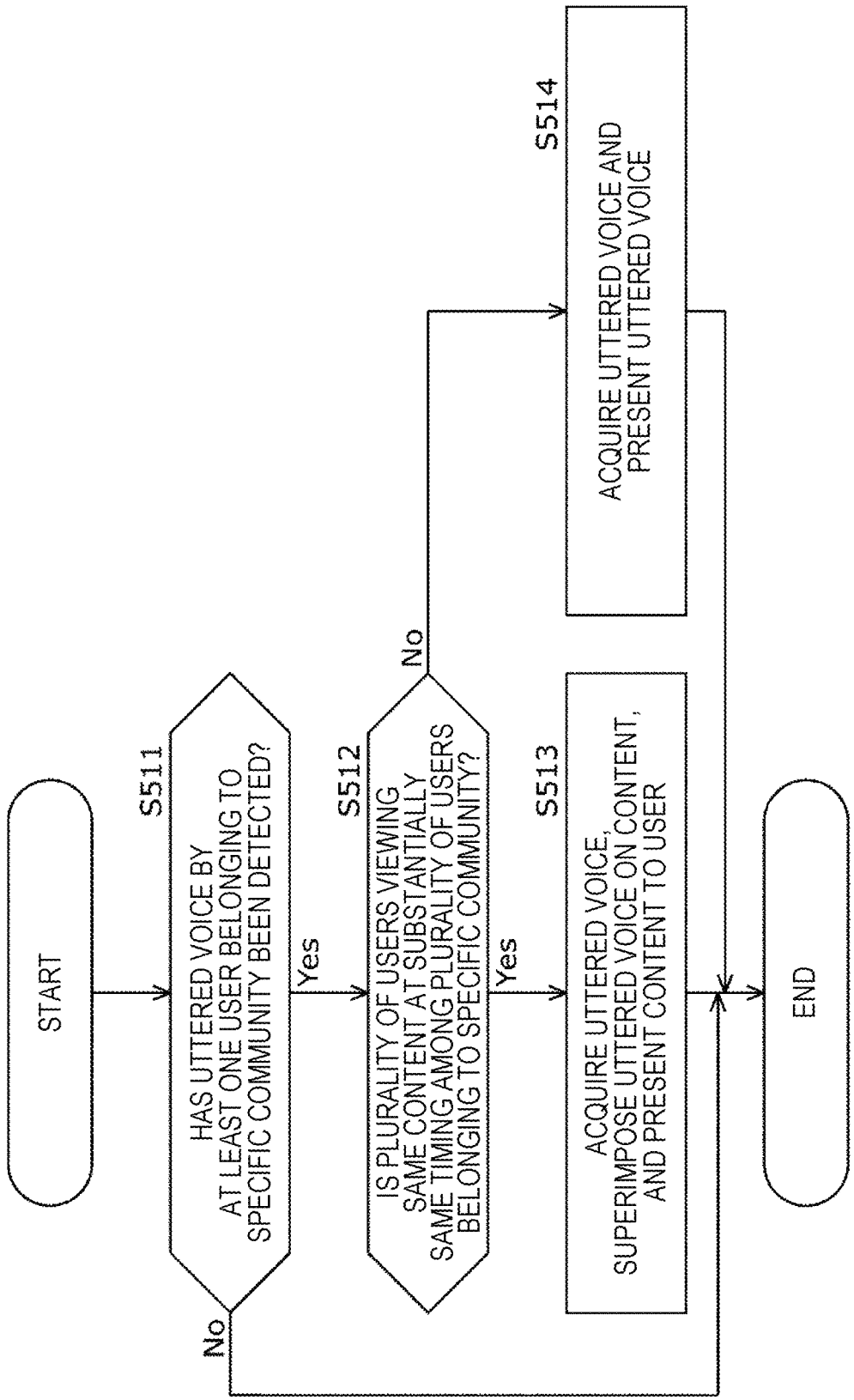
FIG. 31 is a flowchart for describing a whole image of information processing in a fifth embodiment.

FIG. 31 illustrates a whole image of information processing in the fifth embodiment.

The information processing illustrated in FIG. 31 is implemented by at least cooperation of (a control unit 100 of) a management server 10 and (a control unit 300 of) the wireless device 30 in an information processing system 1.

As illustrated in FIG. 31, in the information processing system 1, whether or not an uttered voice of at least one user (the user A, the user B, or the like) belonging to the specific community (community A or the like) has been detected is determined (S511).

In a case where affirmative determination is made in the determination processing of step S511, the information processing system 1 determines whether or not a plurality of users is viewing the same content at substantially same timing among the plurality of users belonging to the specific community (S512).

In a case where affirmative determination is made in the determination processing of step S512, the wireless device 30 acquires a voice utterance, superimposes the voice utterance on the content (song or the like) being played back, and presents the voice utterance to the user (S513). At this time, the wireless device 30 can amplify the voice utterance and lower the volume of the content.

On the other hand, in a case where negative determination is made in the determination processing of step S512, the wireless device 30 acquires the voice utterance, amplifies the voice utterance, and presents the voice utterance to the user (S514).

Note that, in a case where the processing of step S513 or S514 ends or negative determination is made in the determination processing of step S511, the information processing of FIG. 31 ends.

6. Sixth Embodiment

Furthermore, playback control suitable for an external environment may be performed. For example, in a case where a user A goes to a specific place such as a cafe or a coffee shop, it is sometimes better not to play back a song from a wireless device 30-1. Here, in particular, as an earphone 31 worn by the user A, use of an earphone enabling the user A to listen to an external sound, such as an open-ear type earphone, is assumed.

For example, in a case where the user A stays in a specific place such as a cafe for a predetermined time, when ambient music such as BGM has been detected for a certain period of time, the song being played back in a wireless device 30-1 is automatically stopped. As a result, the user A can listen to the music such as BGM played as ambient music in the cafe or the like, instead of the song (music) played back by the wireless device 30-1.

In other words, here, when a predetermined condition is satisfied while estimating an action of the user A, the song (music) being played back in the wireless device 30-1 is stopped.

Furthermore, if the playback of the song is stopped only on the condition that the ambient music is played while the user A is moving, the music may be stopped every time the ambient music played from various stores is detected when the user A is walking on a shopping street, and the user A may feel uncomfortable. Therefore, whether or not the user A has stopped or sat down for a certain period of time or stayed at a specific place for a predetermined period of time is added to the condition.

Note that the action of the user A such as whether or not the user A has stopped or sat down for a certain period of time is detected on the basis of sensor data from a sensor unit 306 built in the wireless device 30-1. Furthermore, detection of the ambient music for a certain period of time can be detected using collected sound data collected by a microphone 322 built in the wireless device 30-1.

Furthermore, in the above-described example, a case where the song being played back in the wireless device 30-1 is immediately stopped when the predetermined condition is satisfied has been described. However, a message indicating that the song being played back will be stopped may be presented on the wireless device 30-1. Then, only in a case where an instruction to allow the song being played back to be stopped is received from the user A who has checked the message, the song being played back is stopped in the wireless device 30-1.

Moreover, in a case where the user A wears the earphone 31 and listens to music, when the earphone 31 is removed from the ear, the song being played back on the wireless device 30-2 may be stopped, and the music that the user B is listening to may also be stopped at the same time. On the other hand, when the user A wears the earphone 31 again, the playback of the song in the wireless devices 30-1 and 30-2 may be resumed at the timing when the user A and the user B are ready.

(Whole Image of Processing)

Figure 32:
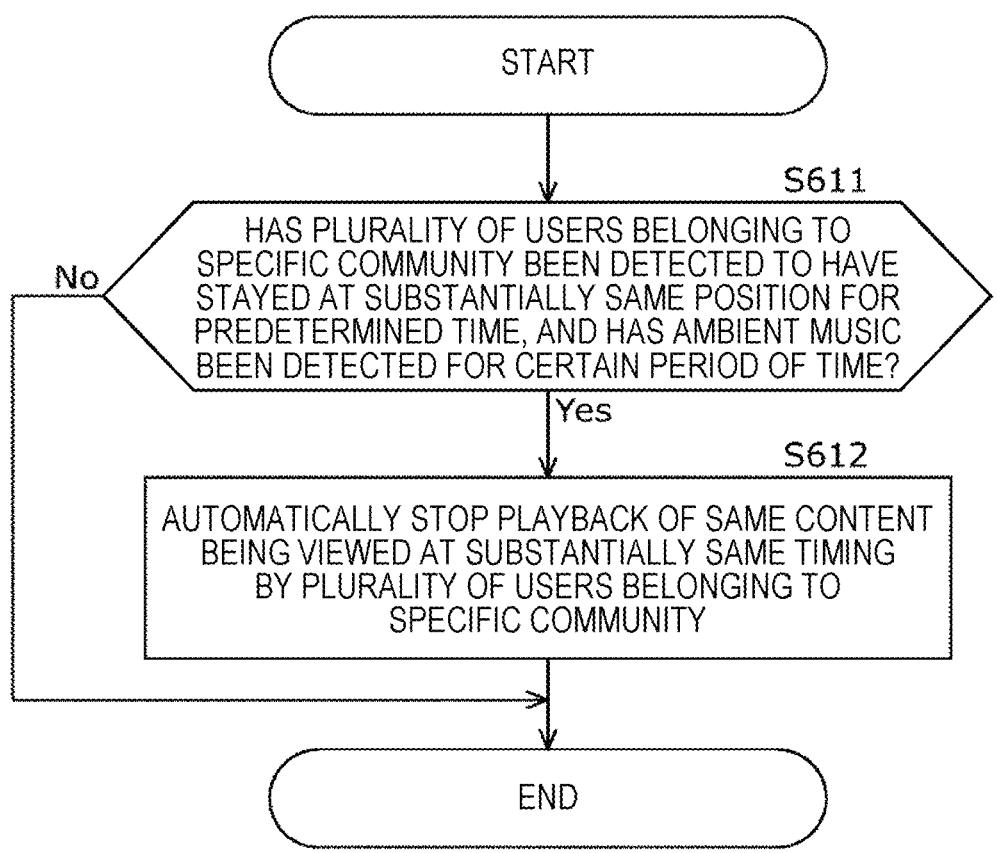
FIG. 32 is a flowchart for describing a whole image of information processing in a sixth embodiment.

FIG. 32 illustrates a whole image of the information processing in the sixth embodiment.

The information processing illustrated in FIG. 32 is implemented by at least cooperation of (a control unit 100 of) a management server 10 and (a control unit 300 of) a wireless device 30 in an information processing system 1.

As illustrated in FIG. 32, in the information processing system 1, the plurality of users (users A and B, or the like) belonging to the specific community (community A or the like) having stayed at substantially the same position for a predetermined time is detected, and whether or not the ambient music has been detected for a certain period of time is determined (S611).

In a case where affirmative determination is made in the determination processing of step S611, (the wireless device 30 of) the information processing system 1 automatically stops playback of the same content viewed at substantially the same timing by the plurality of users belonging to the specific community (S612).

Note that, in a case where the processing of step S612 ends or negative determination is made in the determination processing of step S611, the information processing of FIG. 32 ends.

7. Seventh Embodiment

Support of a community may be performed by generating a slideshow from a captured image captured by a member belonging to the community and music the member was listening to and posting the slideshow on social media.

(Slideshow Generation)

First, generation of a slideshow will be described. Specifically, a case in which a user A and a user B belonging to a community A go to a certain place and capture an image with a wireless device 30 such as a smartphone while listening to a same song is assumed.

In this case, by assigning metadata regarding "when", "where", "with whom", "for what", and the like to the viewed song, it is possible to generate a slideshow by collecting the captured images together with the music being listened to at that time on the basis of information such as time information and position information.

Furthermore, in generating a slideshow, a plurality of still images and moving images captured when members belonging to the community act together, a song obtained by mixing a plurality of songs played at that time, and the like can be included. Note that, when selecting a song to be used in the slideshow from a plurality of songs, it is possible to preferentially select a song that is "liked" by an arbitrary member or a specific member in the community.

Figure 33:
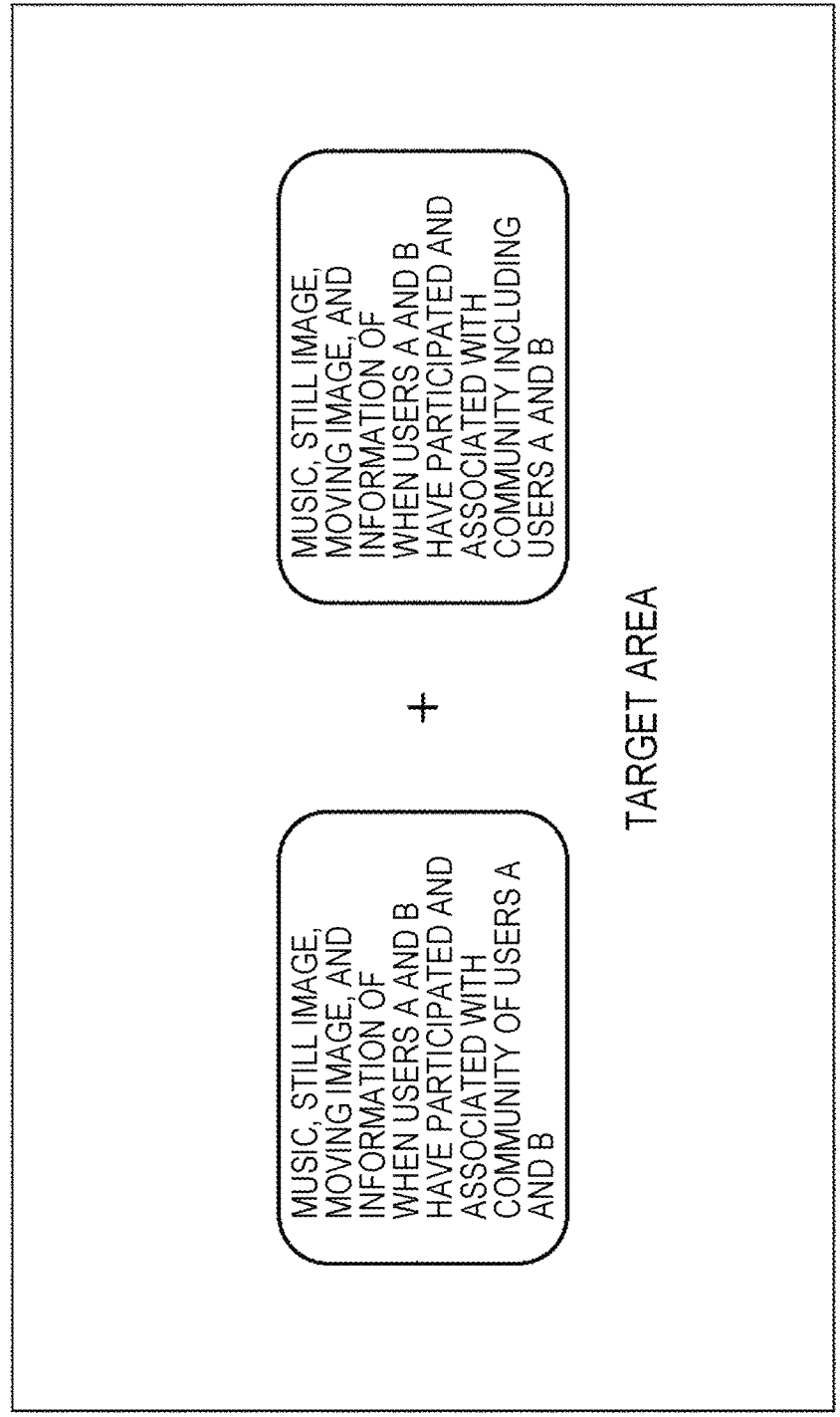
FIG. 33 is a diagram illustrating an example of a target area of content at the time of generation of a slideshow.

In other words, as illustrated in FIG. 33, all of music, still images, moving images, and other information at the time of participation of the user A and the user B and associated with the community A of the user A and the user B are set as target areas, and the slideshow is generated on the basis of the information included in the target areas.

Thereby, the user A and the user B can record the generated slideshow as memories of the song listened to at a certain place at that time, and can recall the memories by viewing the slideshow or can listen to the song of memories again at the place. That is, when music, a still image, or a moving image is viewed, memories of actions in the community can be added.

Furthermore, as a method of presenting this slideshow, various presentation forms can be used.

For example, by collecting a conversation between the user A and the user B, the conversation can be given to the slideshow as character information.

Note that, in a case where the community is discarded, the still images and moving images related to the community may be prevented from being played back. Furthermore, at the time of playing back the song when the members were acting in the community, the still images and moving images captured at the time of the action may be simultaneously presented.

Furthermore, the above-described "like" can be given to the song that both the two users A and B consider good. The "like" may be given in a case where a predetermined operation is performed by the users A and B, or may be automatically given in a case where information such as a heart rate is quantified on the basis of sensor data, threshold determination is performed, and both the two users are presumed to consider the song is good. As a result, empathy of the users A and B can be produced.

Furthermore, the timing at which "like" is given to the song may be timing at which the user A utters "like" between the users A and B. Note that a predetermined notification (notification of sound, display, or the like) may be made when the song that has been separately "liked" by the two users A and B is played. With this notification, one user can recognize the other user's favorite song and empathize with it.

(Posting to Social Media)

Next, posting to social media will be described. Specifically, a case in which the user A and the user B belonging to the community A go to a certain place and listen to a same song is assumed.

In this case, since it is possible to recognize that the user A and the user B stay together from the position information of wireless devices 30-1 and 30-2 or the like, it is possible to associate information with an event of the two.

Figure 34:
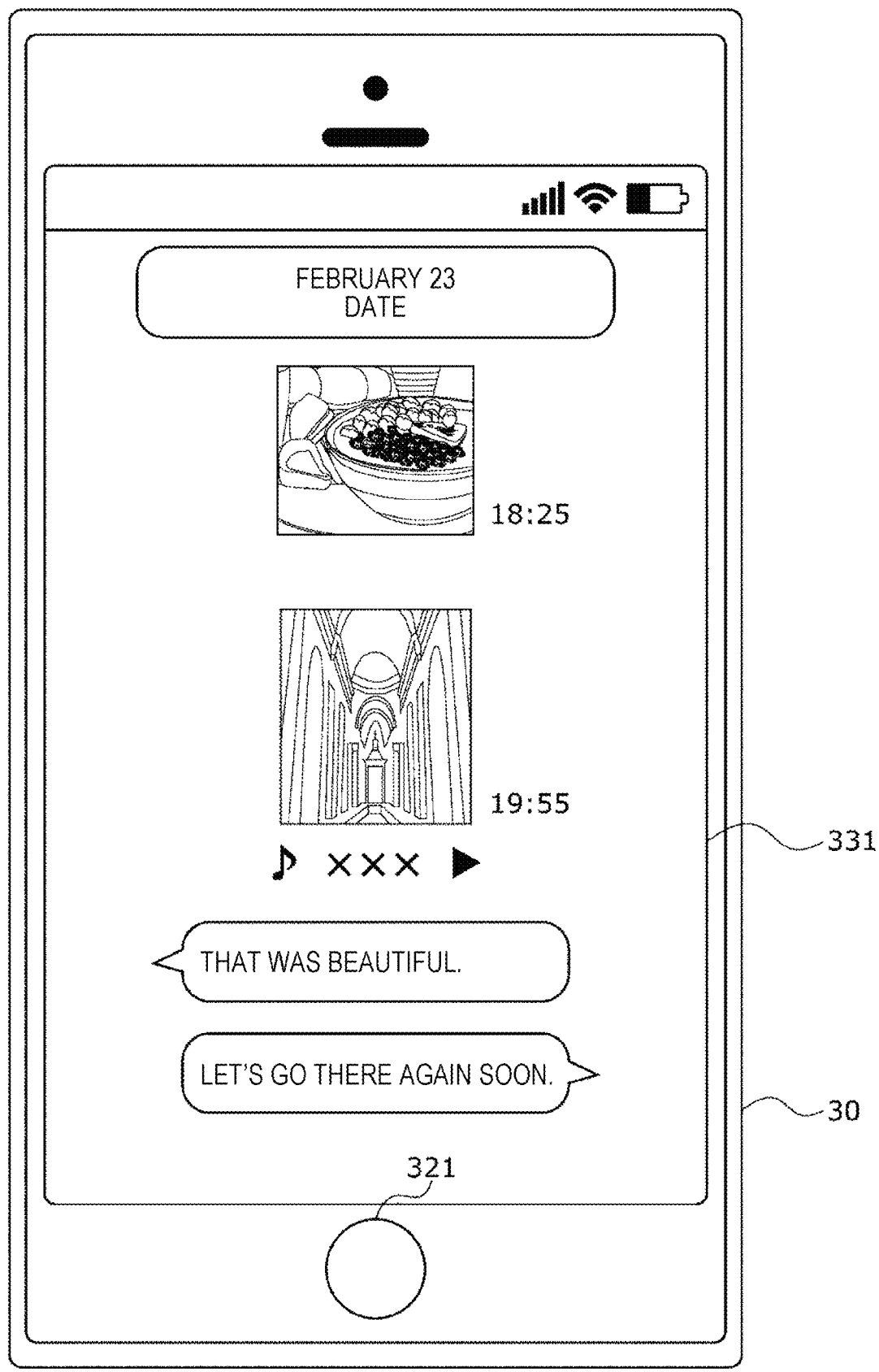
FIG. 34 is a diagram illustrating an example of posting content on social media.

FIG. 34 illustrates an example of a case where the users A and B post content generated during activities in the community A on social media such as an SNS.

In FIG. 34, an SNS application is activated in the wireless device 30, and information regarding a date set by the user A and the user B on February 23 is displayed.

That is, a state of a meal by the two is captured at 18:25, and then a building that the two went to see is captured at 19:55. Thus, still images thereof are displayed. Furthermore, since the user A and the user B listen to the same song while looking at the building, a history of the played back song "XXX" is also displayed.

Moreover, since the user A and the user B have exchanged text messages after the date, the messages are displayed as post-comments.

In this manner, the captured still images and moving images, the history of the played back song, the post-comments, and the position information of the visited place are posted on the social media such as the SNS, and the memories of the two users A and B can be collectively shared.

Thereby, the user A and the user B can access the social media and look back on the memories as if looking at an album. Furthermore, it is possible to reconfirm the song that has been unknown when listening to but has impressed the users by the history of the play backed song. Furthermore, it is also possible to collectively play back the played back song thereafter or to register the song as one's favorite.

Furthermore, if all the captured images such as the still images and moving images are posted, subsequent editing may be complicated, and thus the captured images to be posted may be selected. For example, as for a captured image for which the wireless device 30 automatically detects the presence or absence of camera shake and determines the presence of a certain level of camera shake, the user may be asked whether or not to post the captured image, such as "are you sure to post the captured image?".

Figure 35:
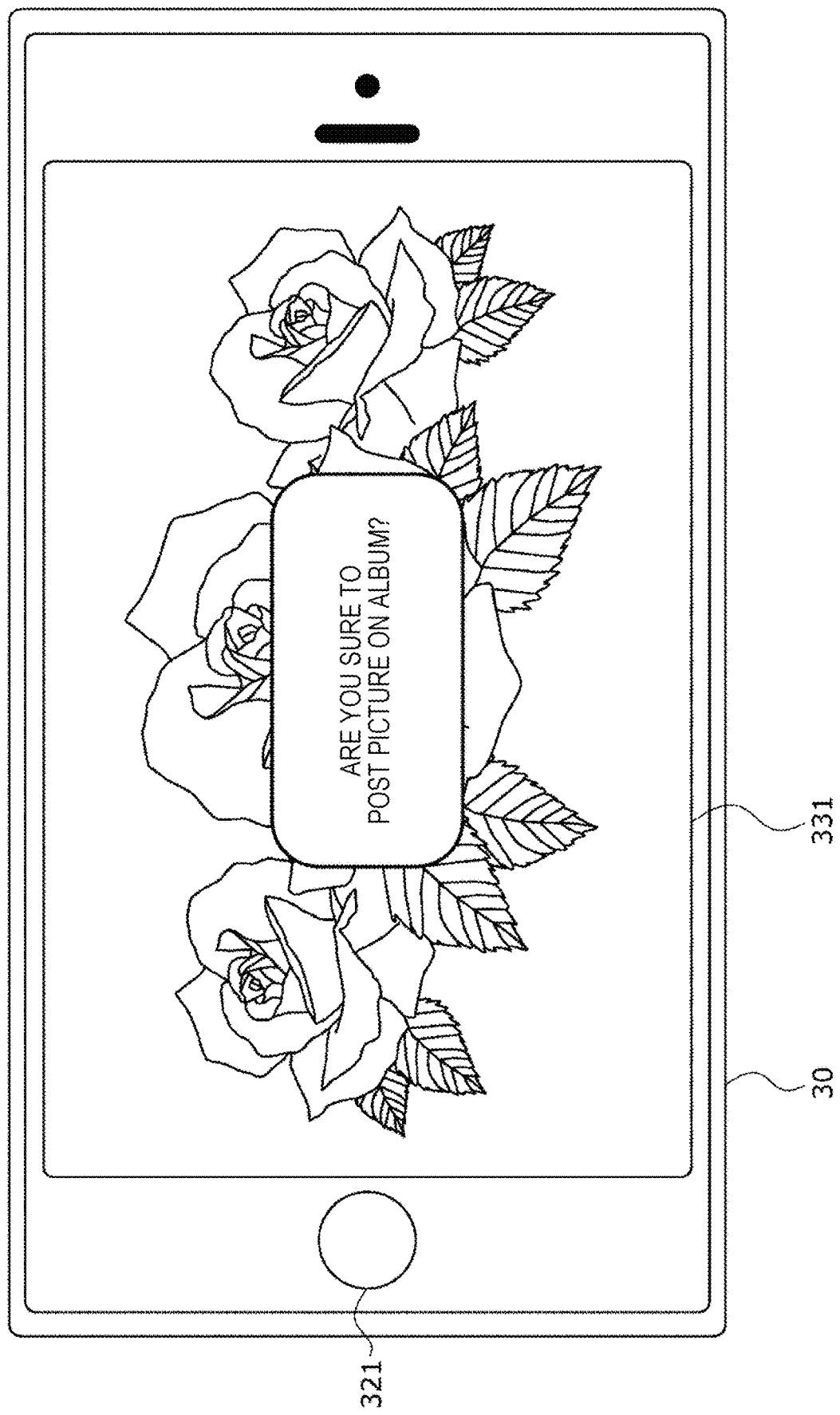
FIG. 35 is a diagram illustrating an example of posting a captured image on social media.

FIG. 35 illustrates an example of posting a captured image on the social media. FIG. 35 illustrates a message for confirming whether or not to post the captured image on the social media when an object is captured by the wireless device 30 such as a smartphone.

The user can post the captured image by confirming the message and performing a posting action. The posting action includes selecting "Yes" with a button or touch panel operation, making a gesture such as nodding, or shaking the wireless device 30 itself. On the other hand, when "No" is selected by the button or touch panel operation, the captured image is not posted.

Note that, in a case where the captured image satisfies a predetermined condition such as the two users A and B being included in the captured image, using face image recognition processing, the captured image may be automatically posted. For example, since face information for unlocking is recorded in the wireless device 30, whether or not the two users are captured can be determined by comparing the face information with (a predetermined area of) the captured image in the face image recognition processing.

Figure 36:
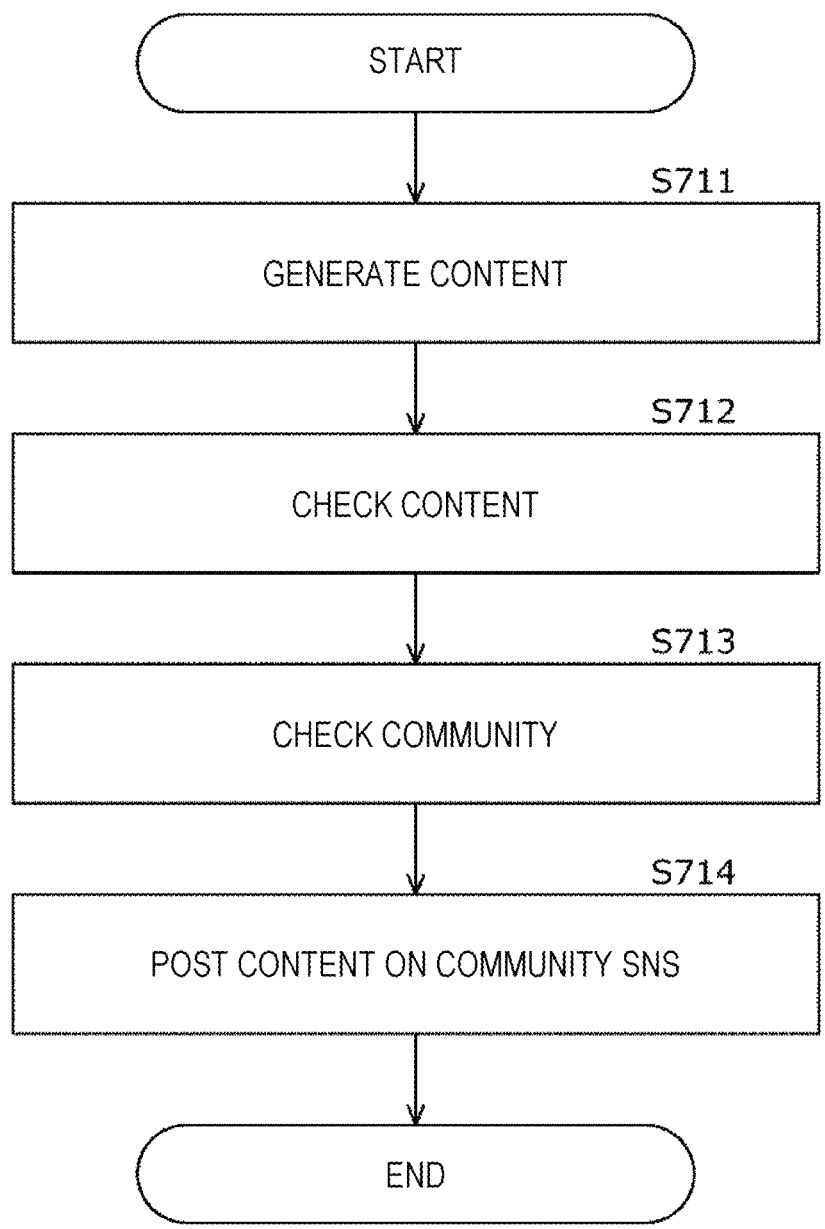
FIG. 36 is a diagram illustrating an outline of posting of content on a community SNS.

Next, a flow of content posting processing will be described with reference to a flowchart of FIG. 36. Furthermore, FIG. 37 illustrates a whole image of posting content on the SNS of the community, and will be described with appropriate reference.

In the wireless device 30, a camera application or the like processes image data of the object captured by a camera unit 307 to generate content such as a still image or a moving image (S711), and the content is checked (S712).

Furthermore, the wireless device 30 inquires of a management server 10 to check the community of the posting destination of the content (S713).

Figure 37:
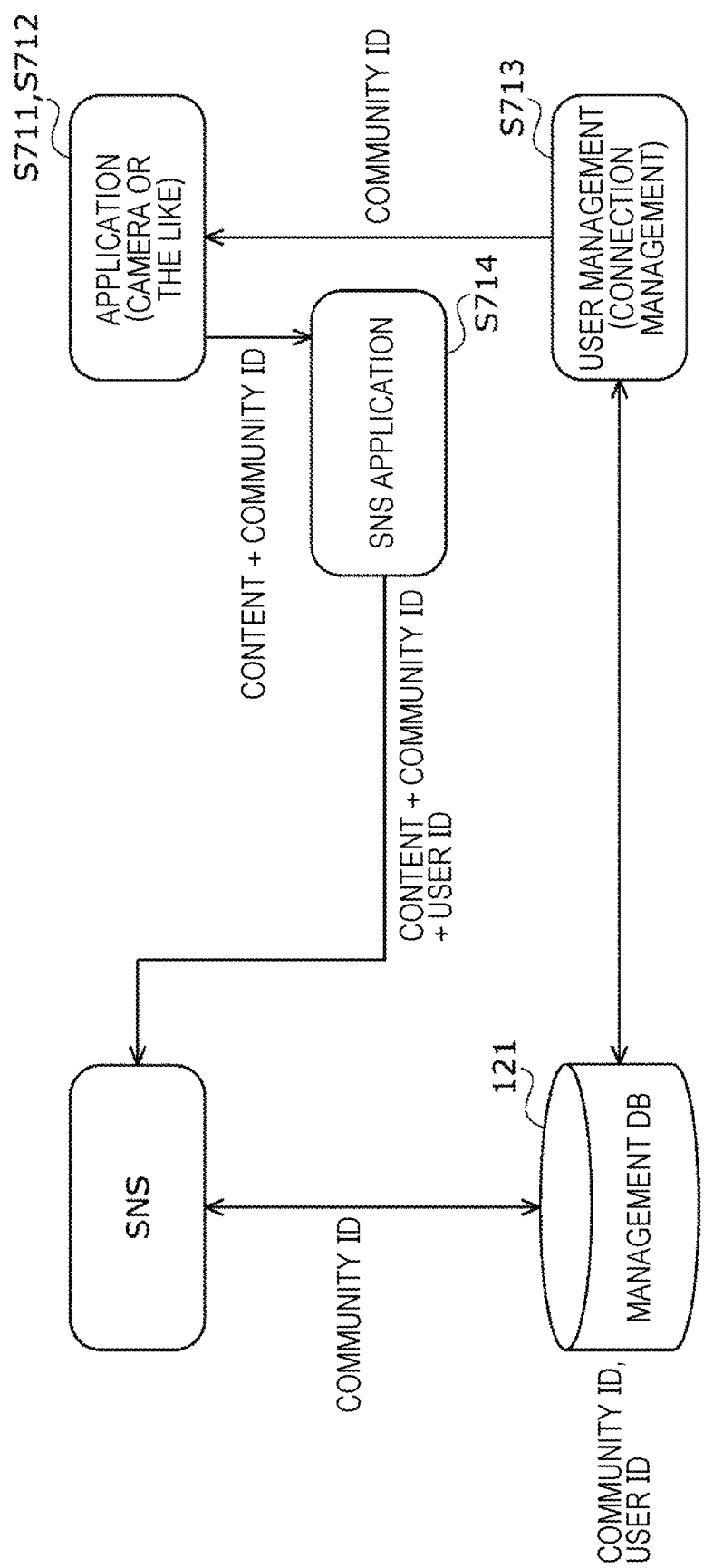
FIG. 37 is a flowchart for describing a flow of community SNS posting processing.

That is, in the management server 10, user management is performed on the basis of a community ID and user IDs stored in a management DB 121, and in which community the two users A and B are currently acting is managed (connection management) (FIG. 37). Thereby, the management server 10 provides notification of the community ID of the community A in which the users A and B are currently acting in response to the inquiry from the wireless device 30 (FIG. 37).

The wireless device 30 posts content such as a still image on the SNS of the community A created on a service providing server 20-3 that provides the SNS service (S714).

That is, in the wireless device 30, the content such as the still image and the community ID are supplied from the camera application to an SNS application. Then, the SNS application transmits the content such as the still image and the community ID together with the user ID to the service providing server 20-3 via a network 40 (FIG. 37). Note that, here, information such as the history of the played back song and the position information can be transmitted together with the content such as the still image.

Thereby, the captured still images and moving images, the history of the played back song, the post-comments, and the position information of the visited place can be posted on the social media such as the SNS, and can be shared by the members of the community.

(Whole Image of Processing)

Finally, a whole image of the information processing in the seventh embodiment will be described with reference to flowcharts in FIGS. 38 and 39.

Figure 38:
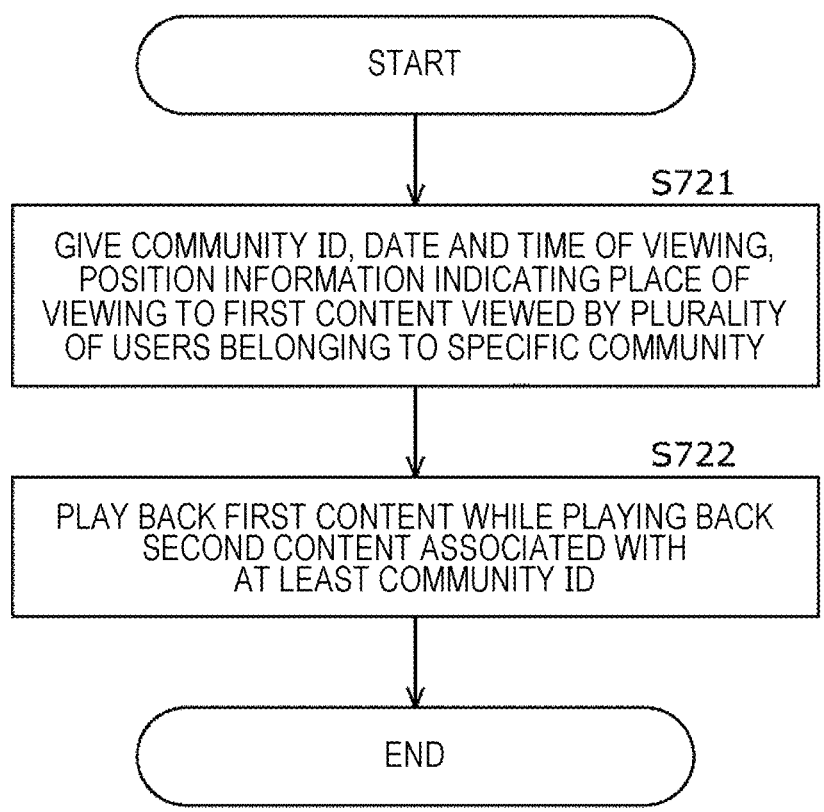
FIG. 38 is a flowchart for describing a whole image of information processing in a seventh embodiment.
Figure 39:
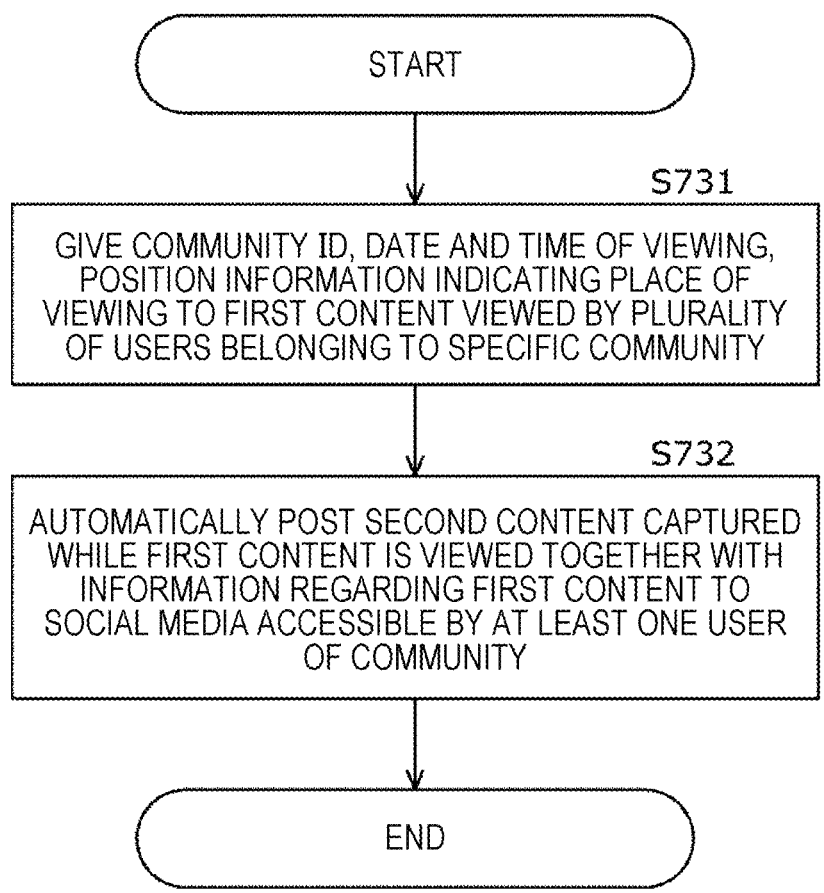
FIG. 39 is a flowchart for describing the whole image of information processing in the seventh embodiment.

The information processing illustrated in FIGS. 38 and 39 is implemented by at least cooperation of (the control unit 100 of) the management server 10, (the control unit 200 of) the service providing server 20, and (the control unit 300 of) the wireless device 30 in the information processing system 1.

As illustrated in FIG. 38, in the information processing system 1, the community ID (community ID), date and time of viewing, and position information indicating a place of viewing are given to first content (a song or the like) viewed by the plurality of users (users A and B, and the like) belonging to the specific community (community A or the like) (S721). Note that, here, it is sufficient to give at least the community ID and whether or not to give the time information and position information is arbitrary.

Then, in (the wireless device 30 of) the information processing system 1, the first content (song or the like) is played back (played back with a slideshow) while playing back second content (still image, moving image, or the like) associated with at least the community ID (S722).

Thereby, the user can experience the memories of actions of the members belonging to the specific community by the slideshow.

Furthermore, as illustrated in FIG. 39, in the information processing system 1, processing of step S732 may be executed after information regarding the community ID, the date and time of viewing, and the position of viewing is given to the first content (song or the like) viewed by the plurality of users belonging to the specific community in the processing of step S731, similarly to the above-described processing of step S721. Note that, here, it is sufficient to give at least the community ID to the first content and whether or not to give the time information and position information is arbitrary.

That is, in (the wireless device 30 of) the information processing system 1, the second content (still image, moving image, or the like) captured when the first content (song or the like) is viewed is automatically posted together with the information regarding the first content (song or the like) (information such as the history of the played back song or the like) on an account of the social media (SNS or the like) accessible by at least one user of the specific community (S732).

Thereby, the user can experience the memories of actions of the members belonging to the community on the social media.

8. Eighth Embodiment

As described above, "like" can be given to a song or the like that both of two users A and B belonging to a community A consider good. Then, when listening to the song that has obtained a positive evaluation such as "like", notification of an MC such as "you two like" may be provided. Note that, here, not limited to the positive evaluation, in a case where some evaluation such as a negative evaluation has been made, notification of the fact may be provided.

Note that, as this type of MC, various variations are assumed, and examples can be given as follows.

In other words, in a case where a song is directly specified, an MC using a playback reason such as "with XXXX's request" can be inserted before playback of the song is started. Furthermore, in a case of the two user's favorite, an MC such as "you two love" may be inserted.

Moreover, when Tokyo Tower is captured in a still image, a moving image, or the like, an MC such as "while looking at Tokyo Tower" may be inserted, and moreover, an MC such as "fit for Tokyo Tower in the evening" may be inserted in consideration of a time zone. Furthermore, when playing back a song that seems to be liked by all the members of the community, an MC such as "everyone loves" may be inserted.

(Whole Image of Processing)

Figure 40:
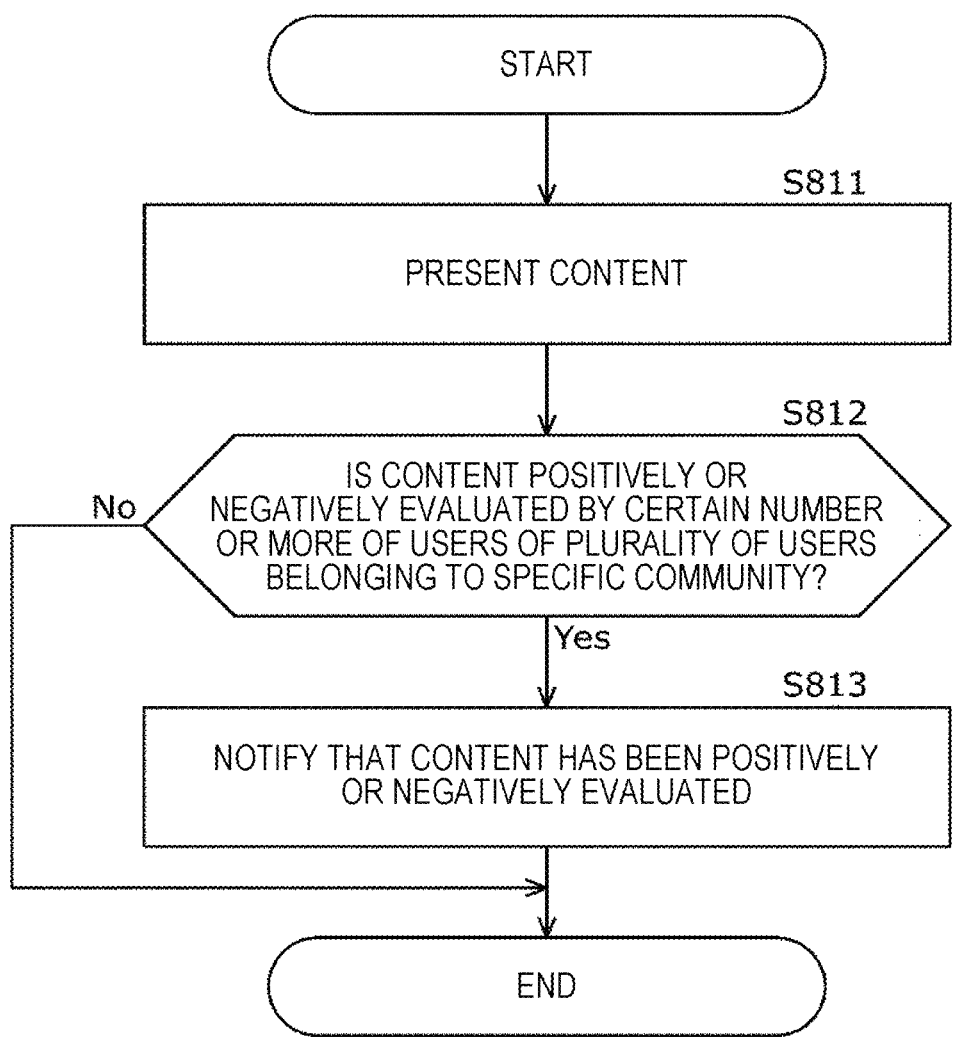
FIG. 40 is a flowchart for describing a whole image of information processing in an eighth embodiment.

FIG. 40 illustrates a whole image of information processing in the eighth embodiment.

The information processing illustrated in FIG. 40 is implemented by at least cooperation of (a control unit 100 of) a management server 10 and (a control unit 300 of) a wireless device 30 in an information processing system 1.

As illustrated in FIG. 40, in the information processing system 1, when presenting content (song or the like), whether or not the content (song or the like) is evaluated to be positive or negative by a certain number of members of the plurality of users (users A and B, and the like) belonging to the specific community (community A or the like) is determined (S812).

In a case where affirmative determination is made in the determination processing of step S812, (a wireless device 30 of) the information processing system 1 is notified that the content is evaluated to be positive or negative while the content (song or the like) is viewed (S813). In this notification, the MC such as "you two love" may be included.

Note that, in a case where the processing of step S813 ends or negative determination is made in the determination processing of step S812, the information processing of FIG. 40 ends.

9. Ninth Embodiment

In a case where members belonging to a community act together, a case where some members become unable to act together for some reason is assumed. For example, there is also a case where a certain user strays or temporarily takes another action.

Here, as a method of determining when some members become unable to act together, determination can be made according to whether or not the members are separated by a certain distance. Alternatively, when the members meet at a predetermined place, it is also possible to determine that a member who is not located within a certain distance from the predetermined place at scheduled meeting time becomes unable to act together.

Figure 41:
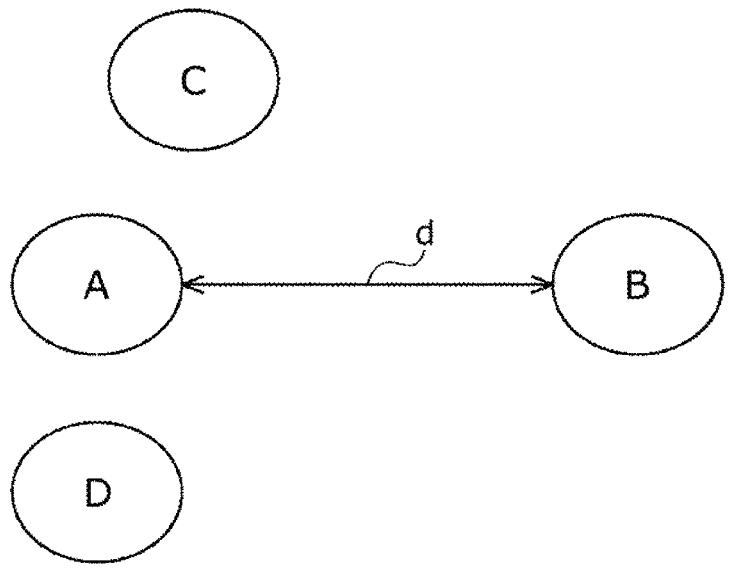
FIG. 41 is a diagram schematically illustrating a case where some users in a community are separated by a certain distance.

For example, as illustrated in FIG. 41, in a case where users A to D (ellipses in the drawing) belonging to a community act together, a case where only the user B is away by a distance d is assumed. Here, in a case where the distance d exceeds a threshold value, the user B is determined to be separated by a certain distance or more, and it becomes a state in which a call can be started between the user B, and the users A, C, and D.

Here, the state in which a call can be started can be, for example, the following state. In other words, when the user B strays among the users A to D, a state in which the user A has made a call using a wireless device 30 in order to make a call in the community can be set to the state in which a call can be started.

Alternatively, when the user B strays and the user A makes a call using the wireless device 30, the call cannot be started if the incoming call is not accepted (not accepted) by each of the wireless devices 30 of the users B to D. Therefore, a state in which each of the wireless devices 30 of the users B to D automatically accepts the call from the wireless device 30 of the user A to start the call may be set as the state in which a call can be started.

As a result, even if the user B strays or temporarily takes another action, the users A, C, and D can know the reason why the user B is separated by a certain distance or more by the call among the users. That is, although voices reach the users A, C, and D who are together, the voices do not reach the user B separated by a certain distance or more, and thus, a conversation can be performed via a predetermined communication path.

Furthermore, in the determination processing as to whether or not the members are separated by a certain distance, whether or not radio waves become unable to reach the wireless devices 30 may be detected, or whether or not the wireless devices 30 are out of geofences assigned to the respective wireless devices 30 may be detected, for example, in addition to grasping the distance between the wireless devices 30 using the position information from the wireless devices 30 possessed by the users.

Note that, during a call between the users, a call using earphones 31 can be made instead of a call using the wireless devices 30 such as smartphones. Moreover, the earphones 31 worn by the users may perform wireless communication with each other, and a conversation between the users may be performed.

Furthermore, in a crowded place or shop, it is assumed that voice does not reach the members even if the members are nearby, and thus, a threshold value used for threshold determination of the distance d may be adjusted. Moreover, when the user B is separated by a certain distance or more, navigation information to a place where the members can join together at the shortest time may be specified for the wireless devices 30 and the like of the members (users A to D) who have been acting together. Accordingly, re-joining of the members can be smoothly performed.

(Whole Image of Processing)

Figure 42:
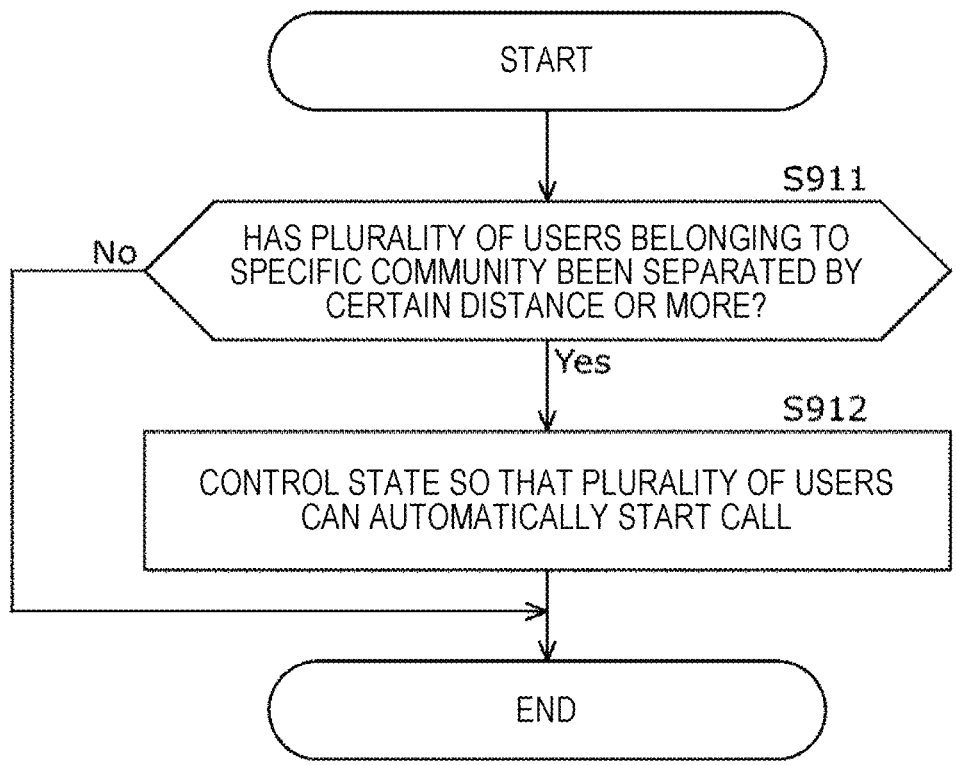
FIG. 42 is a flowchart for describing a whole image of information processing in a ninth embodiment.

FIG. 42 illustrates a whole image of information processing in the ninth embodiment.

The information processing illustrated in FIG. 42 is implemented by at least cooperation of (the control unit 100 of) the management server 10 and (the control unit 300 of) the wireless device 30 in the information processing system 1.

As illustrated in FIG. 42, in an information processing system 1, whether or not the plurality of users (user A, user B, and the like) belonging to the specific community (community A or the like) has been separated by a certain distance or more is determined on the basis of the position information from the wireless devices 30 or the like (S911).

In a case where affirmative determination is made in the determination processing of step S911, the information processing system 1 performs control such that the wireless devices 30 of the users can automatically start a call among the plurality of users (S912).

That is, since voices reach the users located nearby, the users can have a conversation on the spot, but since the voices do no reach the user who is separated by a certain distance or more, a call using devices such as the wireless devices 30 or the earphones 31 is enabled via a predetermined communication path.

Furthermore, in the processing of step S911, when enabling a call between the plurality of users, a call voice between the plurality of users is localized to a sound image according to a relative positional relationship between the plurality of users so as to enable the user who makes a call to identify the position of the user on the other end of the call.

Note that, in a case where the processing of step S912 ends or negative determination is made in the determination processing of step S911, the information processing of FIG. 42 ends.

10. Tenth Embodiment

By the way, in the above description, a case where the members belonging to the community share the same song has been mainly described, but an image (AR information) corresponding to augmented reality (AR) may be shared.

(AR Information Sharing)

Figure 43:
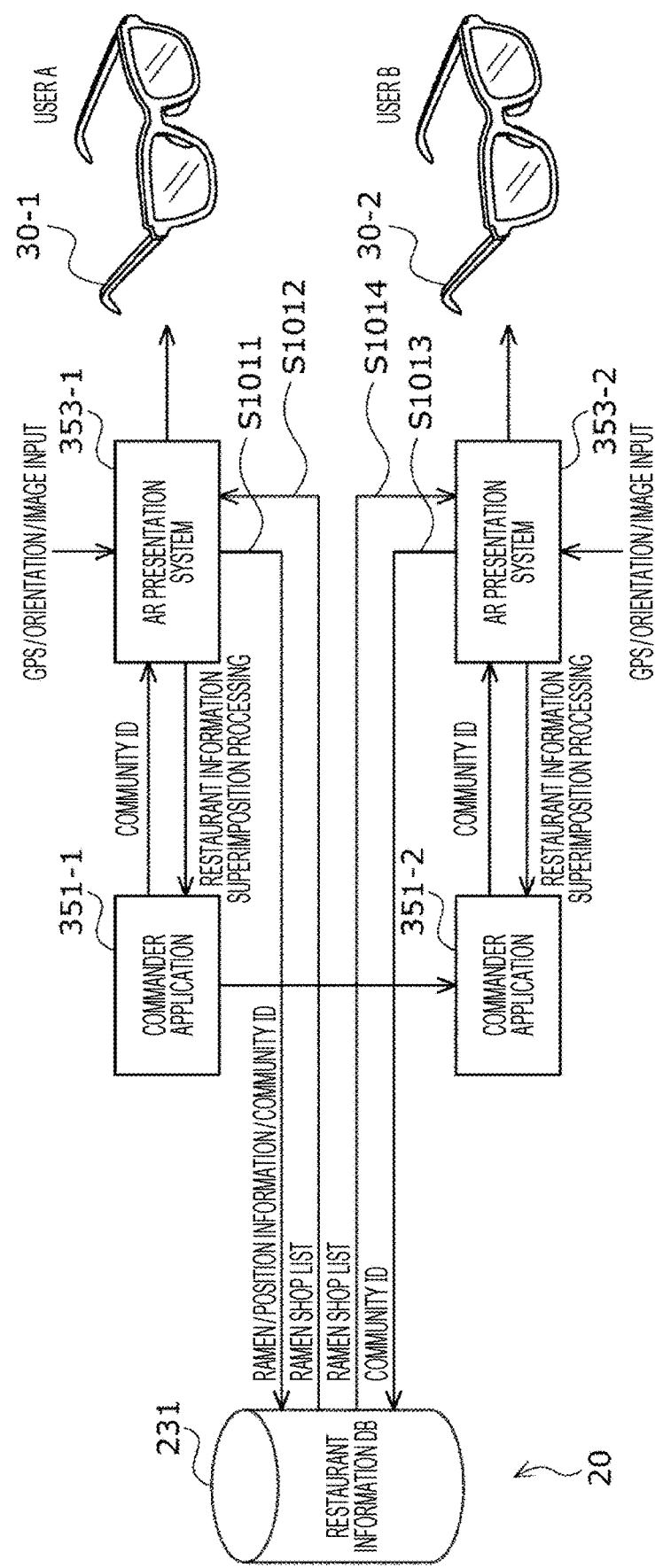
FIG. 43 is a diagram illustrating an example of a configuration in a case where AR information is shared.

FIG. 43 illustrates an example of a configuration in a case where AR information is shared.

In FIG. 43, a wireless device 30-1 used by a user A and a wireless device 30-2 used by a user B are configured as augmented reality (AR) compatible glasses-type devices, that is, AR compatible devices such as AR headsets or AR glasses.

The wireless device 30-1 includes a commander application 351-1 and an AR presentation system 353-1. The wireless device 30-2 includes a commander application 351-2 and an AR presentation system 353-2. The AR presentation systems 353-1 and 353-2 perform processing for presenting AR information on the basis of information such as position information and orientation information of GPS or the like input thereto and image data.

In this example, in a case where the user A searches for a desired ramen shop between the users A and B belonging to a community A, a search result is displayed on the wireless device 30-1 as AR information.

At this time, by using a community detection function, the same AR information can be displayed on the AR glasses of all the other members belonging to the community A. Thereby, the search result of the ramen shop for which a search condition is specified by the user A is displayed as the AR information on the wireless device 30-2.

Specifically, in the wireless device 30-1, the AR presentation system 353-1 transmits a request including the search condition (ramen), position information, and a community ID to a service providing server 20 via a network 40 according to the control from the commander application 351-1 (S1011).

The service providing server 20 searches for information regarding restaurants stored in a restaurant information DB 231 on the basis of the search condition (ramen) and the position information from the wireless device 30-1, and generates a ramen shop list regarding ramen shops near the current location of the user A.

A response including the ramen shop list is transmitted to the wireless device 30-1 via the network 40 (S1012). Furthermore, in the service providing server 20, this ramen shop list is held in association with the community ID of the community A.

In the wireless device 30-1, the commander application 351-1 and the AR presentation system 353-1 cooperatively perform processing on the basis of the ramen shop list from the service providing server 20, whereby presenting the AR information.

At this time, (the commander application 351-1 of) the wireless device 30-1 and (the commander application 351-2 of) the wireless device 30-2 cooperate with each other via a management server 10, and the wireless device 30-2 also performs the processing of presenting the same AR information.

That is, in the wireless device 30-2, the AR presentation system 353-2 transmits the request including the community ID to the service providing server 20 via the network 40 according to the control from the commander application 351-2 (S1013).

Since the ramen shop list associated with the community ID of the community A is held in the service providing server 20, a response including the ramen shop list is transmitted in response to the request from the wireless device 30-2 (S1014).

In the wireless device 30-2, the commander application 351-2 and the AR presentation system 353-2 cooperatively perform the processing on the basis of the ramen shop list from the service providing server 20, whereby presenting the AR information.

In this manner, the user A and the user B belonging to the community A can know the information regarding the ramen shops around the current position by viewing the same AR information presented on the wireless devices 30-1 and 30-2 such as the AR headsets.

Furthermore, at this time, a conversation between the user A and the user B may be composed. That is, since the management server 10 grasps that the user A and the user B belonging to the community A are connected, the conversation between the user A and the user B can be acquired and composed, and meaning thereof can be analyzed.

In this analysis, it is possible to acquire utterance content of the users A and B wearing the devices such as the AR headsets or AR glasses by picking up only the voices of the users A and B using a voiceprint analysis. Note that it is also possible to detect whether or not the user is speaking, using vibration of the AR headset or the like.

Figure 44:
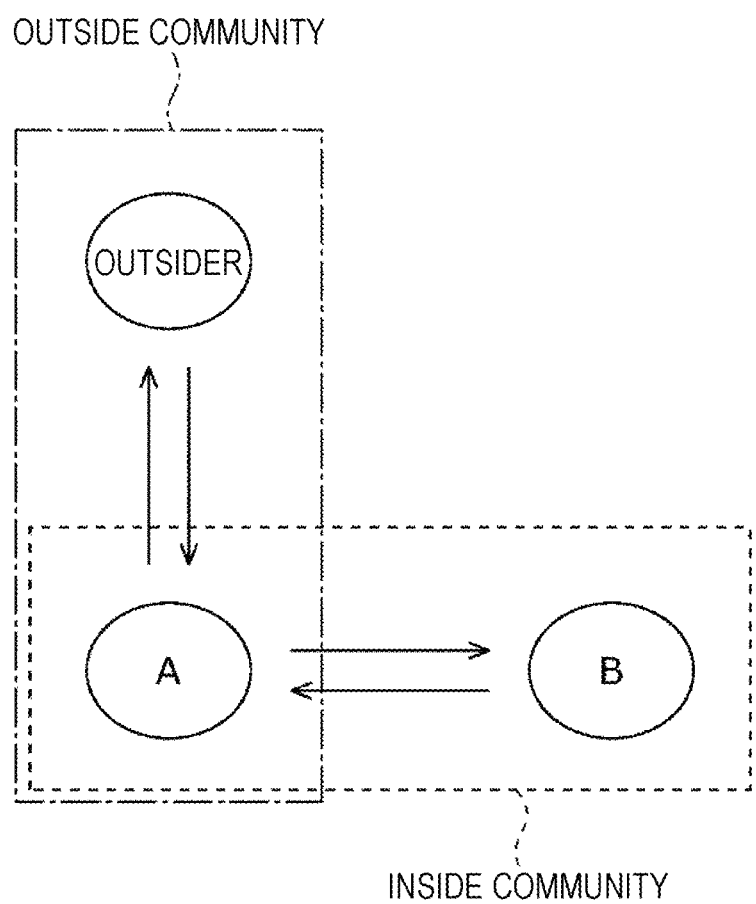
FIG. 44 is a diagram schematically illustrating an example of a conversation with users inside and outside a community.

Furthermore, as illustrated in FIG. 44, there may be a case where a conversation between the members belonging to the community A and a conversation with an outsider other than the members need to be distinguished.

FIG. 44 illustrates a conversation (within the broken line in FIG. 44) between the user A and the user B belonging to the community A, and a conversation (one-dot chain line in FIG. 44) between the user A belonging to the community A and an outsider not belonging to the community A.

First Example

In the first example, a conversation between the user A and the user B in the broken line in FIG. 44 is illustrated.
User A: "Do you want to eat ramen?"
User B: "Yes!"
In the first example, since the conversation between the user A and the user B belonging to the community can be acquired, the same AR information according to the ramen shop list can be presented to the wireless devices 30-1 and 30-2 by composing the conversation and analyzing the meaning (set as a search condition).

Second Example

In the second example, a conversation between the user A and an outsider in the one-dot chain line in FIG. 44 is illustrated.
User A: "How much is it?"
Outsider (salesclerk): "it's 980 yen"
In this second example, in a case where there is no utterance of the user B and if the user B is in conversation with another person, it is assumed that the user B makes an utterance before the user A finishes the utterance or does not speak the same thing. Therefore, such conversation can be distinguished from the conversation with an outsider. In this case, it is not necessary to present the same AR information.

Note that, in a conversation, a response may be made without utterance. For example, it is also possible to distinguish the conversation from a conversation with an outsider who does not belong to the community A by acquiring nodding (agreement or the like) or head shaking (denial or refusal or the like) from sensor data or the like.

(Whole Image of Processing)

Figure 45:
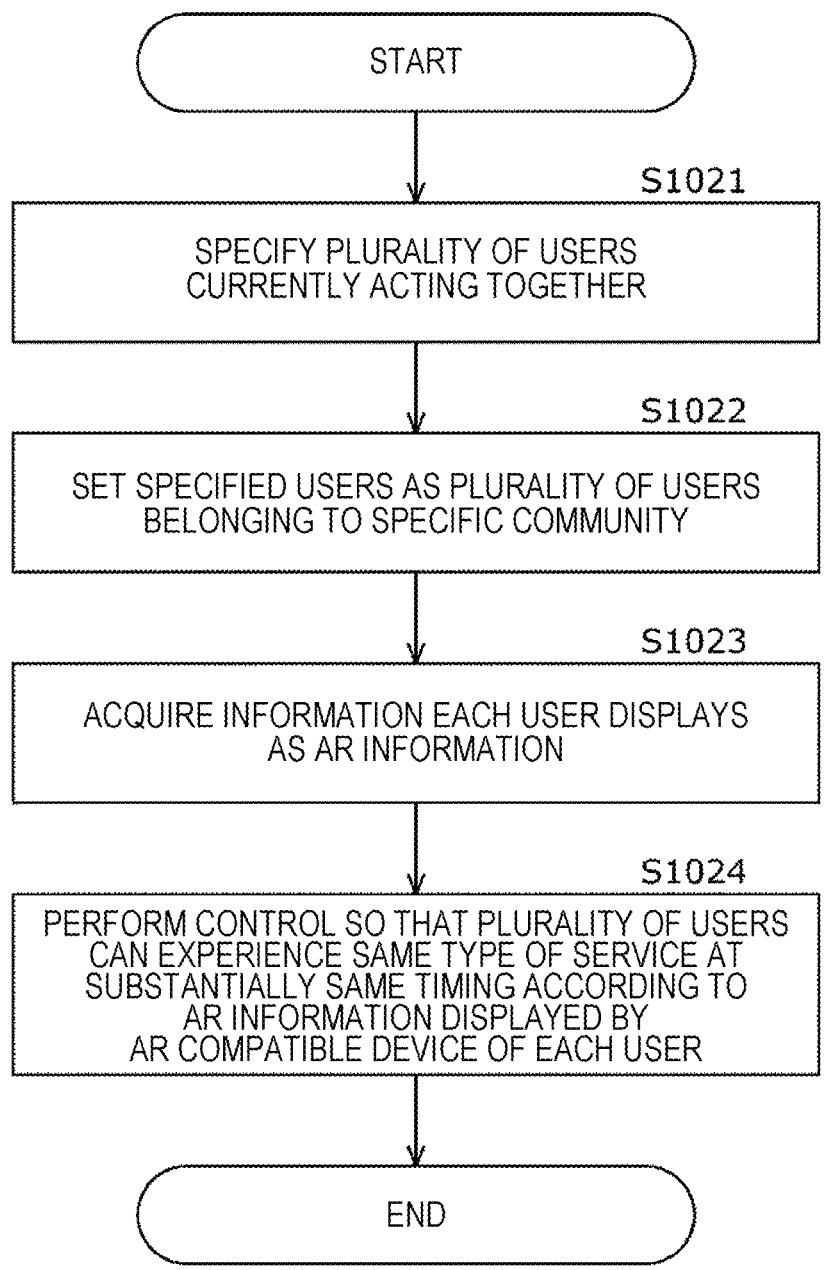
FIG. 45 is a flowchart for describing a whole image of information processing in a tenth embodiment.

FIG. 45 illustrates a whole image of information processing in the tenth embodiment.

The information processing illustrated in FIG. 45 is implemented by at least cooperation of (a control unit 100 of) the management server 10 and (a control unit 300 of) the wireless device 30 in the information processing system 1.

As illustrated in FIG. 45, in the information processing system 1, the plurality of users (users A and B, and the like) who is currently acting together is specified (S1021), and the specified plurality of users is set as a plurality of users belonging to the specific community (community A or the like) (S1022).

Furthermore, in the information processing system 1, the information (ramen shop list or the like) displayed as the AR information by each user is acquired (S1023), and control is performed so that the plurality of users can experience the same type of service at substantially the same timing by the AR information displayed by the AR compatible devices (AR headsets, AR glasses, or the like) corresponding to the respective users on the basis of the acquired information (S1024).

11. Eleventh Embodiment

A playlist of songs may be generated through a conversation of members belonging to a community. That is, a playlist collaborated by members of the community can be created. At this time, content of a conversation with an agent on an SNS application may be added to the playlist.
(Generation of Playlist)

Figure 46:
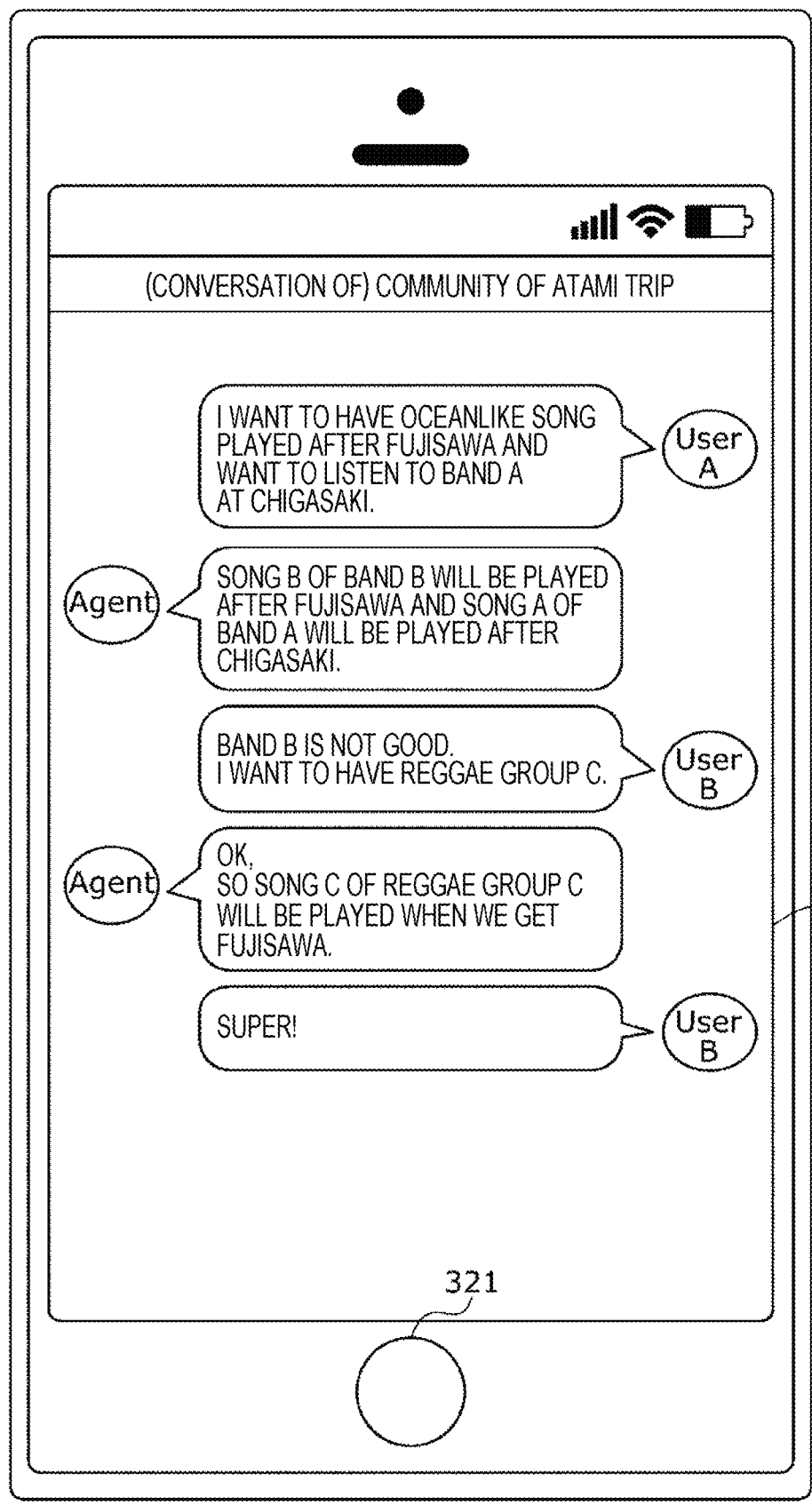
FIG. 46 is a diagram illustrating an example of generating a playlist according to a conversation in a community.

FIG. 46 illustrates an example of generating the playlist according to a conversation in the community.

In this example, each of a user A and a user B belonging to a community B (community of Atami trip) has a conversation by posting a message regarding a song to be listened to during the trip to the SNS application activated by wireless device 30 such as a smartphone.

Furthermore, the conversation also includes an agent's message, and the agent proposes a song suitable for the situation according to the message from the user A and corrects the proposed song according to a request from the user B.

A playlist (so-called community listening playlist) is generated in consideration of such conversation exchange in the SNS application.

Then, on the day of the trip, the song is played back on wireless devices 30-1 and 30-2 on the basis of the playlist. Therefore, the user A and the user B can listen to the specified song together in the situation specified in the previous conversation.
(Whole Image of Processing)

Figure 47:
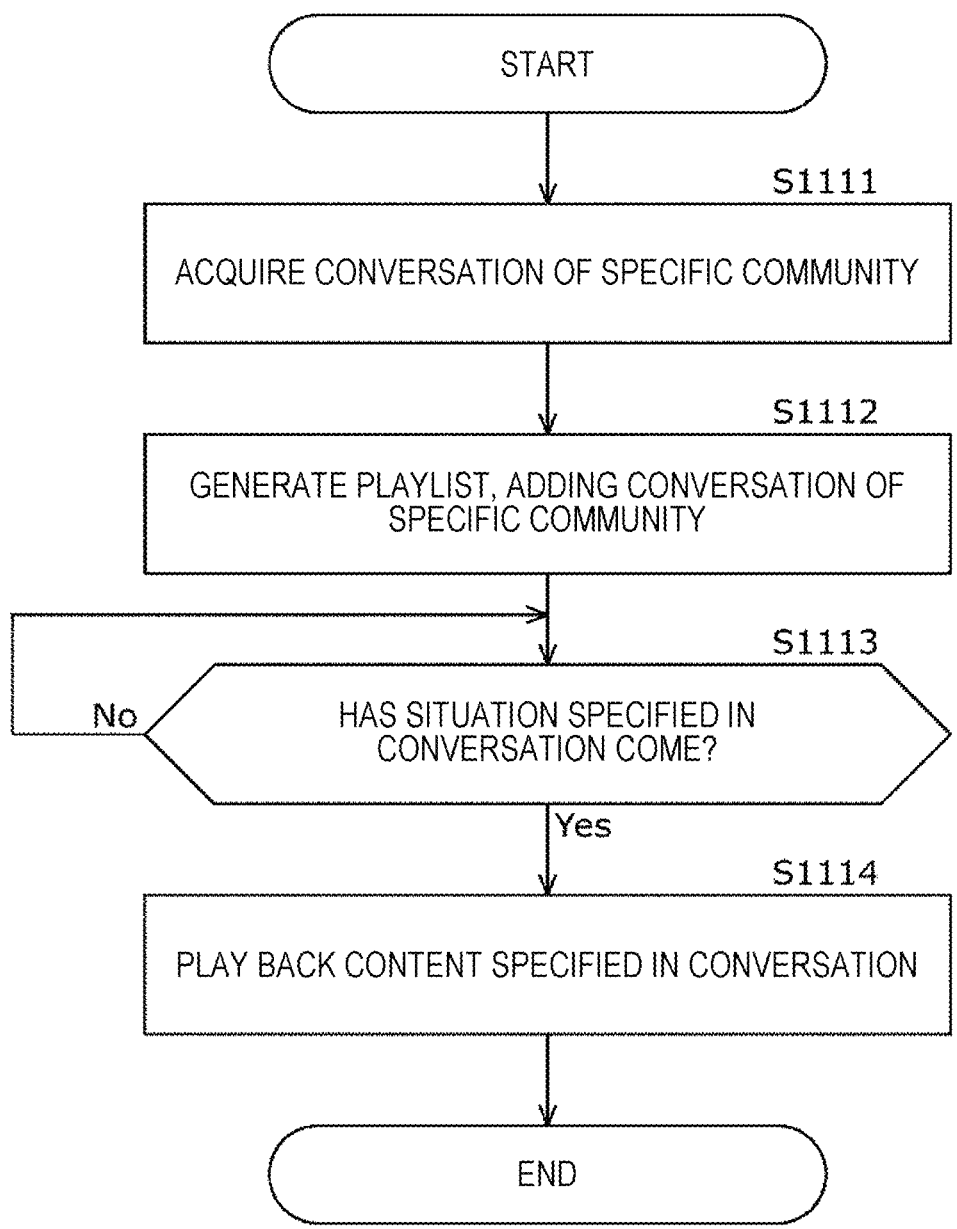
FIG. 47 is a flowchart for describing a whole image of information processing in an eleventh embodiment.

FIG. 47 illustrates a whole image of information processing in the eleventh embodiment.

The information processing illustrated in FIG. 47 is implemented by at least cooperation of (a control unit 100 of) a management server 10, (a control unit 200 of) a service providing server 20, and (a control unit 300 of) a wireless device 30 in an information processing system 1.

As illustrated in FIG. 47, in the information processing system 1, a conversation of the plurality of users (users A and B, and the like) belonging to the specific community (community B or the like) is acquired (S1111). The conversation of the specific community is not limited to the conversation between the plurality of users in the SNS application, and the conversation with the agent can be included.

Furthermore, the information processing system 1 generates the playlist in consideration of the acquired conversation of the specific community (S1112). Here, playback of the specified content (song or the like) in the specified situation is taken into consideration as the content of the conversation.

When the playlist is generated in the processing of step S1112, the processing proceeds to step S1113. Then, the information processing system 1 determines whether or not the situation specified in the conversation has come (S1113).

In a case where affirmative determination is made in the determination processing of step S1113, (the wireless device 30 of) the information processing system 1 plays back the content (song or the like) specified in the conversation on the basis of the generated playlist.

As a result, the users can view the desired content played back when the condition specified in the previous conversation of the members belonging to the specific community is satisfied.

12. Modification (Playback of Different Content)

When the user A and the user B belonging to the community A are together, the wireless device 30-1 and the wireless device 30-2 play back the same song, but when they take individual actions, it is not always necessary to play back the same song.

Figure 48:
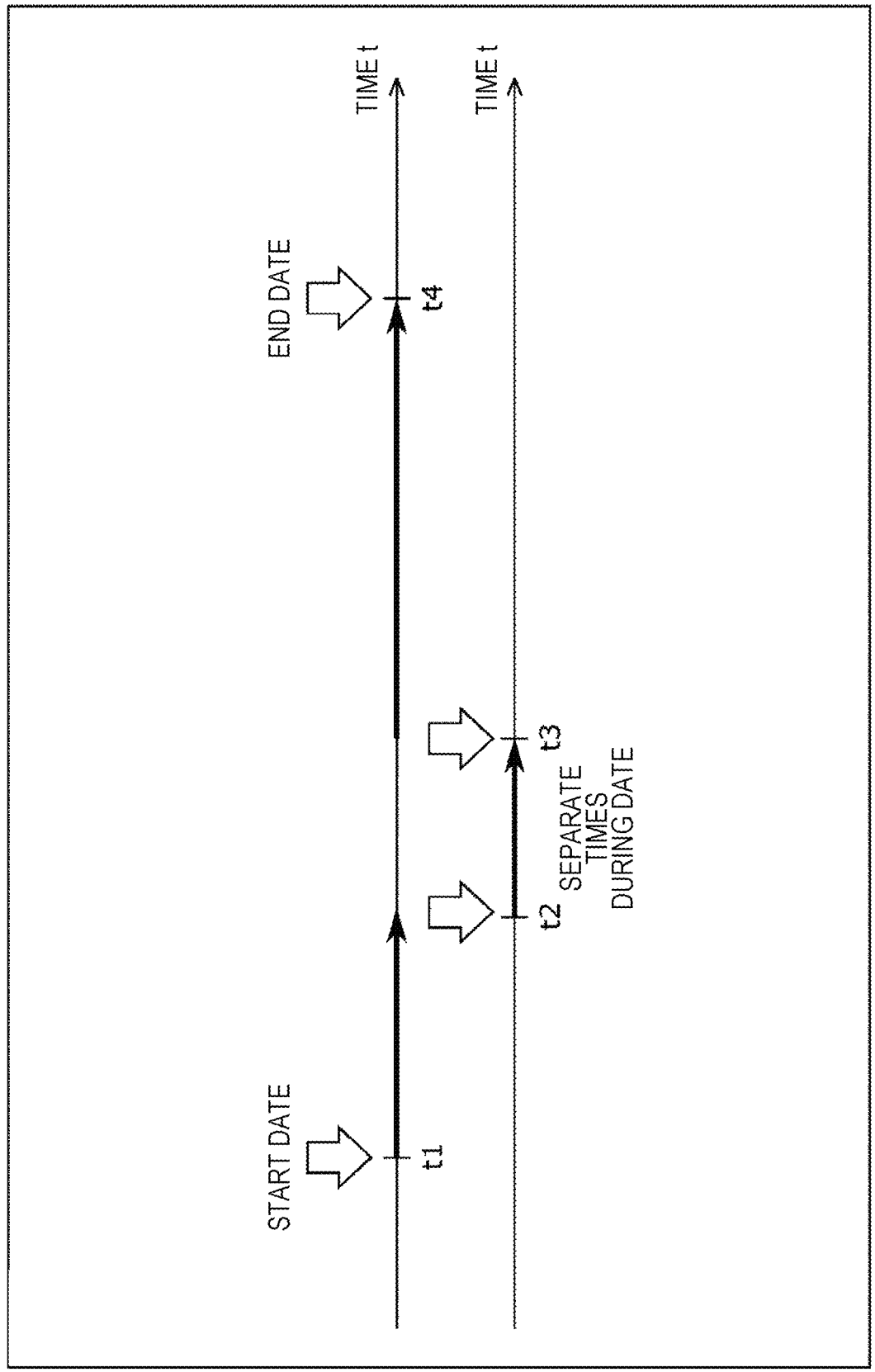
FIG. 48 is a diagram illustrating an example of behavior at the time when users in a community take individual actions.

FIG. 48 illustrates an example of behavior when the user A and the user B belonging to the community A take individual actions.

FIG. 48 assumes a case where the user A and the user B are on a date. Here, in the time during the date from time t1 to time t4, the user A and the user B take individual actions in the time from time t2 to time t3.

At this time, since the user A and the user B are together from the time t1 to the time t2 and from the time t3 to the time t4, the same song A is played back. Meanwhile, since the user A and the user B are not together between the time t2 and the time t3, different songs B and C may be played back.

Note that, even in the case where the user A and the user B belonging to the community A are together, a case to secure a private time is assumed, and thus in such a case, the synchronization of the song playback between the wireless device 30-1 and the wireless device 30-2 can be canceled. Furthermore, in the case where the wireless device 30-1 and the wireless device 30-2 are synchronized with a plurality of services including a music distribution service, synchronization of some services may be canceled
(Use of User Connection)

Since the management server 10 grasps that the members belonging to the community act together, information generated during that time may be shared or priority of a communication path may be determined using the information.

Figure 49:
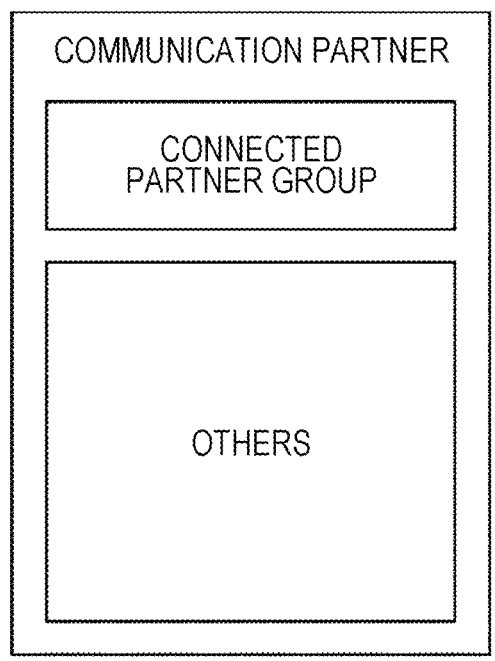
FIG. 49 is a diagram illustrating an example of display of a user connection.

FIG. 49 illustrates an example of display of a user connection. In FIG. 49, a selection display order of a potential contact partner (connected partner group) among the members belonging to the community is raised and displayed. Note that, in a case where the earphones 31 directly communicate with each other, information regarding switching of a connection destination community or the like may be displayed.
(Bill-Splitting in Community)

In the above-described first embodiment (second example), the bill-splitting processing when the payment is made by the member belonging to the community has been described. However, even in a case where the payment is made with a two-dimensional code such as a QR code (registered trademark), the bill-splitting processing can be similarly performed.

That is, when a reader reads the two-dimensional code displayed on a screen of the wireless device 30 such as the smartphone and makes a payment, when a "bill-splitting in community button" is pressed and the payment is made, a bill-splitting request can be sent to the members in the community.
(Analysis of Log for Each Community)

In a case where two or more people are listening to music, the use is different and the tendency of the music preference changes from a case where one person listens to music alone. Therefore, the playback history of songs in a range where the two or more people are listening to music is analyzed for each community and optimum music can be recommended on the basis of the analysis result. Meanwhile, the playback history of songs listened to by two or more people is not added to the playback history of music when one person listens to music alone.

However, in the case where the user gives a positive evaluation such as "like" to the song listened to by two or more people, the playback history of the song may be added as the playback history of the music of when one person listens to music alone.

Another Configuration Example

In the above description, a case where the information processing system 1 includes the management server 10, the service providing server 20, and the wireless device 30 has been described. However, for example, another configuration such as addition of another device or server may be used.

Specifically, the management server 10 as one information processing device may be configured as a plurality of information processing devices by being divided into a server that manages a community, a database server, and the like. Similarly, the service providing server 20 or the wireless device 30 may be configured not only as one information processing device but also as a plurality of information processing devices.

Furthermore, in the information processing system 1, which device includes the configuration element (control unit) constituting each device of the management server 10, the service providing server 20, or the wireless device 30 is arbitrary. For example, some processing of the information processing by the management server 10 may be executed by the service providing server 20 or may be executed by an edge server connected to (a peripheral unit of) a network close to the wireless device 30, using an edge computing technology.

That is, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one housing are both systems.

Furthermore, a communication form of each configuration element is also arbitrary. In other words, each configuration element may be connected via a local network (local area network (LAN) or wide area network (WAN)) in addition to a communication line such as the Internet or a mobile phone network as the network 40. Moreover, each configuration element may be connected by wire or wirelessly.

As described above, in the present technology, a plurality of users acting together can experience the same type of service at substantially the same timing by each wireless device of each user according to the same type of service available to each user.

Note that Patent Documents 1 and 2 described above disclose a system capable of simultaneously distributing a karaoke song to a plurality of mobile phone terminals. Moreover, Patent Document 3 described above discloses a service providing apparatus that simultaneously transmits data according to a request to an apparatus belonging to the same group so that a plurality of users can simultaneously play the same music data.

Furthermore, Patent Literature 4 described above discloses a portable terminal device that, when receiving an identification signal including identification information of a device, sounds music in order to provide notification of approach of the device. Moreover, Patent Document 5 described above discloses a television receiver having a volume control function to reduce the volume of a program being viewed to a predetermined volume when detecting user's voice.

Furthermore, Patent Document 6 described above discloses a service that automatically groups a plurality of users satisfying a predetermined condition and enables information sharing in the group when automatically presenting or grouping users matching behavior, hobby, taste, or the like in the SNS.

However, it is difficult to say that a good user experience can be provided when a service is provided to a plurality of users who is acting together using a device possessed by each user even if the techniques disclosed in Patent Documents 1 to 6 are used, and it has been demanded to provide a better user experience.

Therefore, in the present technology, a plurality of users who is acting together is enabled to experience the same type of service at substantially the same timing by each wireless device of each user according to the same type of service available to each user, so that a better user experience can be provided.

13. Configuration of Computer

Figure 50:
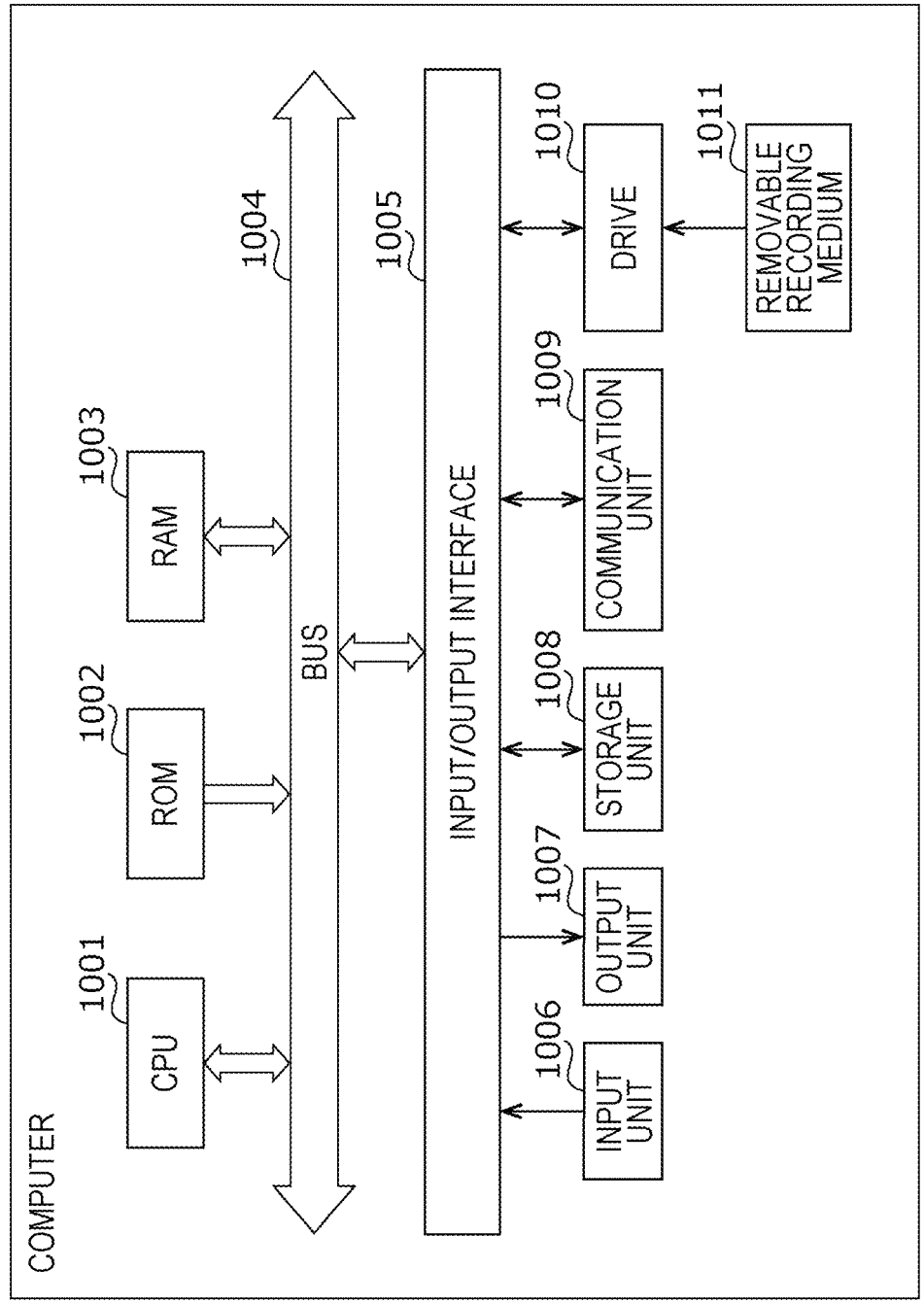
FIG. 50 is a diagram illustrating an example of a configuration of a computer.

The above-described series of processing (for example, the information processing illustrated in FIG. 12 and the like) can be executed by hardware or can be executed by software. In the case of executing the series of processing by software, a program that configures the software is installed in a computer of each device. FIG. 50 is a diagram illustrating a configuration example of hardware of the computer that executes the above-described series of processing by a program.

In a computer, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The storage unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer configured as described above, the CPU 1001 loads the program recorded in the ROM 1002 or the storage unit 1008 to the RAM 1003 via the input/output interface 1005 and the bus 1004 and executes the program, so that the above-described series of processing is performed.

The program to be executed by the computer (CPU 1001) can be recorded on the removable recording medium 1011 as a package medium or the like, for example, and provided. Furthermore, the program can be provided via a wired or wireless transmission medium such as a local area network, the Internet, or digital satellite broadcasting.

In the computer, the program can be installed to the storage unit 1008 via the input/output interface 1005 by attaching the removable recording medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object). Furthermore, the program may be processed by one computer (processor) or distributed in and processed by a plurality of computers.

Note that embodiments of the present technology are not limited to the above-described embodiments, and various modifications can be made without departing from the gist of the present technology.

Furthermore, the steps of the information processing illustrated in FIG. 12 and the like can be executed by one device or can be shared and executed by a plurality of devices. Moreover, in a case where a plurality of processes is included in one step, the plurality of processes included in the one step can be executed by one device or can be shared and executed by a plurality of devices.

Note that the present technology can employ the following configurations.

(1)
An information processing system including
a control unit configured to:
set a plurality of users who is currently acting together as a plurality of users belonging to a specific community; and
perform control so as to enable the plurality of users to experience a same type of service at substantially same timing by each wireless device corresponding to each user according to the same type of service available to the each user.

(2)
The information processing system according to (1), in which
when a first user and a second user who belong to the specific community are able to use a same content service,
the control unit
performs control so that a first wireless device corresponding to the first user transmits a content distribution request specified by the first user to the content service, and
performs control so that a second wireless device corresponding to the second user transmits the content distribution request to the content service.

(3)
The information processing system according to (2), in which
when the first user has a right to have the content distributed in the available content service, and
the second user needs billing processing in order to have a right to have the content distributed in the available content service,
the control unit
performs control so that the first wireless device performs not only the content distribution request but also temporary charging processing and transmits, to the content service, the content distribution request to the second wireless device.

(4)
The information processing system according to (1), in which
when content services available to a first user and a second user who belong to the specific community are different,
the control unit
performs control so that a first wireless device corresponding to the first user transmits a content distribution request specified by the first user to the content service available to the first user, and
performs control so that a second wireless device corresponding to the second user transmits the content distribution request to the content service available to the second user.

(5)
The information processing system according to any one of (1) to (4), in which
when the plurality of users belonging to the specific community is viewing same content at substantially same timing,
the control unit switches the service at timing at which a wireless device corresponding to one of the plurality of users performs camera capture.

(6)
The information processing system according to (1), in which
when both a first user and a second user who belong to the specific community do not have a right to have content distributed in available content services,
the control unit
performs control so that a first wireless device corresponding to the first user transmits a free trial distribution request of content specified by the first user to the content service available to the first user, and
performs control so that causes a second wireless device corresponding to the second user to transmit transmits the free trial distribution request of content to the content service available to the second user.

(7)
The information processing system according to (1), in which
when a first user belonging to the specific community is not able to use a specific service,
the control unit prompts a first wireless device corresponding to the first user to use the specific service.

(8)
The information processing system according to (7), in which
the control unit performs control so as to enable the first wireless device to receive the specific service.

(9)
The information processing system according to (1), in which
when use of a specific service is executed in a wireless device corresponding to one user belonging to the specific community, the control unit requests a wireless device corresponding to another user belonging to the specific community to use the specific service.

(10)
The information processing system according to any one of (1) to (6), in which
the control unit selects recommended content according to any one of attribute information of the plurality of users belonging to the specific community, past communication content between the plurality of users, a content playback history of the plurality of users, a situation in which the plurality of users plays back recommended content, and a preference of a specific user belonging to the specific community.

(11)
The information processing system according to (10), in which
the control unit
manages an ID of the corresponding recommended content in a folder for the each specific community, and generates a playlist for the specific community on the basis of the ID of the recommended content stored in the folder corresponding to the specific community.

(12)

The information processing system according to (10), in which the control unit acquires an answer related to any of questions from a user belonging to the specific community by asking the user the question or supporting the question, and selects the recommended content on the basis of the answer.

(13)

The information processing system according to any one of (1) to (12), in which the control unit forms the specific community to which a first user corresponding to a first wireless device and a second user corresponding to a second wireless device belong in accordance with communication between the first wireless device and the second wireless device.

(14)

The information processing system according to any one of (1) to (13), in which when detecting a voice utterance of at least one user belonging to the specific community, the control unit acquires the voice utterance and performs control to present the voice utterance to the user.

(15)

The information processing system according to (14), in which when the plurality of users belonging to the specific community is viewing same content at substantially same timing, when detecting a voice utterance of at least one user belonging to the specific community, the control unit acquires the voice utterance and performs control to superimpose the voice utterance on the content.

(16)

The information processing system according to any one of (1) to (13), in which when the plurality of users belonging to the specific community is viewing same content at substantially same timing, the control unit stops playback of the content when detecting that the plurality of users belonging to the specific community stays at a substantially same position for a predetermined time and detecting ambient music for a certain period of time.

(17)

The information processing system according to (1), in which the control unit assigns at least an ID of the specific community to first content viewed by the plurality of users belonging to the specific community, and plays back the first content while playing back second content associated with at least the ID of the specific community.

(18)

The information processing system according to (1), in which the control unit assigns at least an ID of the specific community to first content viewed by the plurality of users belonging to the specific community, and posts second content captured while the first content is viewed, together with information regarding the first content, to a social media account accessible by at least one user of the specific community.

(19)

The information processing system according to (1), in which the control unit provides notification that a certain number or more of users among the plurality of users belonging to the specific community give positive or negative evaluation to content while viewing the content.

(20)

The information processing system according to any one of (1) to (13), in which when the plurality of users belonging to the specific community is separated by a certain amount or more, the control unit performs control so as to enable the plurality of users to start a call.

(21)

The information processing system according to (20), in which the control unit localizes a call voice between the plurality of users to a sound image according to a relative positional relationship between the plurality of users so as to enable a user who makes a call to identify a position of a user on the other end of the call.

(22)

The information processing system according to any one of (1) to (21), in which the same type of service includes a music distribution service, and the control unit performs control so as to enable the plurality of users to experience the music distribution service at substantially same timing by music output from an earphone corresponding to each user and enabling listening to an external sound.

(23)

The information processing system according to (1), in which the control unit performs control so as to enable the plurality of users to experience the same type of service at substantially same timing according to AR information displayed by an AR-compatible device corresponding to each user.

(24)

The information processing system according to (1), in which the control unit acquires a conversation of the specific community, generates a playlist for the specific community in consideration of the conversation of the specific community, and plays back content specified in the conversation on the basis of the playlist when a situation specified in the conversation of the specific community comes.

(25)

An information processing method including:

by an information processing system, setting a plurality of users who is currently acting together as a plurality of users belonging to a specific community; and performing control so as to enable the plurality of users to experience a same type of service at substantially same timing by each wireless device corresponding to each user according to the same type of service available to the each user.

(26)

A recording medium recording a program for causing a computer to function as a control unit configured to:

set a plurality of users who is currently acting together as a plurality of users belonging to a specific community; and perform control so as to enable the plurality of users to experience a same type of service at substantially same timing by each wireless device corresponding to each user according to the same type of service available to the each user.

REFERENCE SIGNS LIST

1 Information processing system
10 Management server
20, and 20-1 to 20-N Service providing server
21 Application distribution server
30, and 30-1 to 30-M Wireless device
31 Earphone
40 Network
100 Control unit
101 Input unit
102 Output unit
103 Storage unit
104 Communication unit
121 Management DB
151 Execution schedule planning unit
152 Joint management unit
153 Community management unit
200 Control unit
201 Input unit
202 Output unit
203 Control unit
204 Communication unit
221 Song DB
231 Restaurant information DB
251 Execution processing unit
252 Synchronization processing unit
300 Control unit
301 Input unit
302 Output unit
303 Storage unit
304 Communication unit
305 Wireless communication unit
306 Sensor unit
307 Camera unit
308 Power supply unit
321 Button
322 Microphone
331 Display
332 Speaker
351, 351-1, 351-2 Commander application
352, 352-1, 352-2 Execution processing unit
353-1, 353-2 AR presentation system
361 Detection unit
362 Execution management unit
1001 CPU

The invention claimed is:

1. An information processing system comprising processing circuitry configured to:
 set a plurality of users who is currently acting together as a plurality of users belonging to a specific community;
 perform control so as to enable the plurality of users to experience a same type of service at substantially same timing by each wireless device corresponding to each user according to the same type of service available to the each user; and
 when a first user belonging to the specific community is not able to use a specific service, prompt a first wireless device corresponding to the first user to use the specific service.

2. The information processing system according to claim 1, wherein
 when the first user and a second user belonging to the specific community are able to use a same content service,
 the processing circuitry is configured to:
  perform control so that the first wireless device corresponding to the first user transmits a content distribution request specified by the first user to the content service, and
  perform control so that a second wireless device corresponding to the second user transmits the content distribution request to the content service.

3. The information processing system according to claim 2, wherein
 when the first user has a right to have content distributed by an available content service, and
 the second user needs billing processing in order to have a right to have the content distributed by the available content service,
 the processing circuitry is configured to:
  perform control so that the first wireless device performs not only the content distribution request but also temporary billing processing and transmits, to the available content service, the content distribution request of the second wireless device.

4. The information processing system according to claim 1, wherein
 when content services available to the first user and a second user whe belonging to the specific community are different,
 the processing circuitry is configured to:
  perform control so that the first wireless device corresponding to the first user transmits a content distribution request specified by the first user to the content service available to the first user, and
  perform control so that a second wireless device corresponding to the second user transmits the content distribution request to the content service available to the second user.

5. The information processing system according to claim 1, wherein
 when the plurality of users belonging to the specific community is viewing same content at substantially same timing,
 the processing circuitry is configured to switch a service at a timing at which a wireless device corresponding to one of the plurality of users performs a camera capture.

6. The information processing system according to claim 1, wherein
 when both the first user and a second user belonging to the specific community do not have a right to have content distributed in available content services,
 the processing circuitry is configured to:
  performs control so that the first wireless device corresponding to the first user transmits a free trial distribution request of content specified by the first user to a content service available to the first user, and
  performs control so that a second wireless device corresponding to the second user transmits the free trial distribution request of content to a content service available to the second user.

7. The information processing system according to claim 1, wherein the processing circuitry is configured to perform control so as to enable the first wireless device to receive the specific service.

8. The information processing system according to claim 1, wherein
when use of a specific service is executed in a wireless device corresponding to one user belonging to the specific community,
the processing circuitry is configured to request a wireless device corresponding to another user belonging to the specific community to use the specific service.

9. The information processing system according to claim 1, wherein the processing circuitry is configured to select recommended content according to any one of attribute information of the plurality of users belonging to the specific community, past communication content between the plurality of users, a content playback history of the plurality of users, a situation in which the plurality of users plays back recommended content, and a preference of a specific user belonging to the specific community.

10. The information processing system according to claim 9, wherein the processing circuitry is configured to:
manage an ID of corresponding recommended content in a folder for each specific community, and
generate a playlist for the specific community on a basis of the ID of the recommended content stored in the folder corresponding to the specific community.

11. The information processing system according to claim 9, wherein the processing circuitry is configured to:
acquire an answer related to any of questions from a user belonging to the specific community by asking the user a question or supporting the question, and
select the recommended content on a basis of the answer.

12. The information processing system according to claim 1, wherein the processing circuitry is configured to form the specific community to which the first user corresponding to the first wireless device and a second user corresponding to a second wireless device belong in accordance with communication between the first wireless device and the second wireless device.

13. The information processing system according to claim 1, wherein
when detecting a voice utterance of at least one user belonging to the specific community,
the processing circuitry is configured to:
acquire the voice utterance, and
perform control to present the voice utterance to the at least one user.

14. The information processing system according to claim 13, wherein
when the plurality of users belonging to the specific community is viewing same content at substantially same timing, and
when detecting the voice utterance of the at least one user belonging to the specific community,
the processing circuitry is configured to:
acquire the voice utterance, and
perform control to superimpose the voice utterance on the content.

15. The information processing system according to claim 1, wherein
when the plurality of users belonging to the specific community is viewing same content at substantially same timing,
the processing circuitry is configured to stop playback of the content when detecting that the plurality of users belonging to the specific community stays at a substantially same position for a predetermined time and detecting ambient music for a certain period of time.

16. The information processing system according to claim 1, wherein the processing circuitry is configured to:
assign at least an ID of the specific community to first content viewed by the plurality of users belonging to the specific community, and
play back the first content while playing back second content associated with at least the ID of the specific community.

17. The information processing system according to claim 1, wherein the processing circuitry is configured to:
assign at least an ID of the specific community to first content viewed by the plurality of users belonging to the specific community, and
post second content captured while the first content is viewed, together with information regarding the first content, to a social media account accessible by at least one user of the specific community.

18. The information processing system according to claim 1, wherein the processing circuitry is configured to provide notification that a certain number or more of users among the plurality of users belonging to the specific community give a positive or a negative evaluation to content while viewing the content.

19. The information processing system according to claim 1, wherein
when the plurality of users belonging to the specific community is separated by a certain amount or more,
the processing circuitry is configured to perform control so as to enable the plurality of users to start a call.

20. The information processing system according to claim 19, wherein the processing circuitry is configured to localize a call voice between the plurality of users to a sound image according to a relative positional relationship between the plurality of users so as to enable a user who makes a call to identify a position of a user on the other end of the call.

21. The information processing system according to claim 1, wherein
the same type of service includes a music distribution service, and
the processing circuitry is configured to perform control so as to enable the plurality of users to experience the music distribution service at substantially same timing by music output from an earphone corresponding to each user and enable listening to an external sound.

22. The information processing system according to claim 1, wherein the processing circuitry is configured to perform control so as to enable the plurality of users to experience the same type of service at substantially same timing according to AR information displayed by an AR-compatible device corresponding to each user.

23. The information processing system according to claim 1, wherein the processing circuitry is configured to:
acquire a conversation of the specific community,
generate a playlist for the specific community in consideration of the conversation of the specific community, and play back content specified in the conversation on a basis of the playlist when a situation specified in the conversation of the specific community comes.

24. An information processing method comprising:
setting, via processing circuitry, a plurality of users who is currently acting together as a plurality of users belonging to a specific community;
performing, via the processing circuitry, control so as to enable the plurality of users to experience a same type of service at substantially same timing by each wireless device corresponding to each user according to the same type of service available to the each user; and
as a first user belonging to the specific community is not able to use a specific service, prompting, via the processing circuitry, a first wireless device corresponding to the first user to use the specific service.

25. A non-transitory recording medium storing a program for causing a computer to perform a method, the method comprising:
setting a plurality of users who is currently acting together as a plurality of users belonging to a specific community;
performing control so as to enable the plurality of users to experience a same type of service at substantially same timing by each wireless device corresponding to each user according to the same type of service available to the each user; and
when a first user belonging to the specific community is not able to use a specific service, prompting, a first wireless device corresponding to the first user to use the specific service.

* * * * *